(12) United States Patent
Wang et al.

(10) Patent No.: US 12,341,656 B2
(45) Date of Patent: Jun. 24, 2025

(54) INFORMATION PROCESSING METHOD, APPARATUS, DEVICE AND COMPUTER READABLE STORAGE MEDIUM

(71) Applicant: Samsung Electronics Co., Ltd., Suwon-si (KR)

(72) Inventors: Jiankang Wang, Beijing (CN); Jiajia Wang, Beijing (CN); Xiaohui Yang, Beijing (CN); Yi Zhao, Beijing (CN); Zhichun Shen, Beijing (CN); Lin Li, Beijing (CN); Min Mao, Beijing (CN); Qixin Huang, Beijing (CN); Shoufeng Wang, Beijing (CN); Xiaoyu Li, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 467 days.

(21) Appl. No.: 17/727,196

(22) Filed: Apr. 22, 2022

(65) Prior Publication Data

US 2022/0247634 A1 Aug. 4, 2022

Related U.S. Application Data

(63) Continuation of application No. PCT/KR2021/009111, filed on Jul. 15, 2021.

(30) Foreign Application Priority Data

Jul. 15, 2020 (CN) .......................... 202010682573.2

(51) Int. Cl.
*H04L 41/0823* (2022.01)
*H04L 41/08* (2022.01)
(Continued)

(52) U.S. Cl.
CPC ........ *H04L 41/0836* (2013.01); *H04L 41/082* (2013.01); *H04L 41/0886* (2013.01); *H04L 41/0894* (2022.05)

(58) Field of Classification Search
CPC ............... H04L 41/0836; H04L 41/082; H04L 41/0886; H04L 41/0894; H04W 4/70;
(Continued)

(56) References Cited

U.S. PATENT DOCUMENTS 9,860,870 B2 1/2018 Sundberg et al.
10,080,244 B2 9/2018 Lei et al.
(Continued)

FOREIGN PATENT DOCUMENTS

CN 106412964 A 2/2017
CN 110226359 A 9/2019
(Continued)

OTHER PUBLICATIONS

Chinese Office Action dated Jun. 11, 2024, issued in Chinese Application No. 202010682573.2.
(Continued)

*Primary Examiner* — Kan Yuen
(74) *Attorney, Agent, or Firm* — Jefferson IP Law, LLP

(57) ABSTRACT

A method, an apparatus, device, and a computer-readable storage medium for processing information are provided. The method is used in a first network device, and includes receiving information related to a second network device, determining a first resource configuration corresponding to a coverage classification related to the second network device based on the information, and transmitting the first resource configuration to the second network device. The method may obtain the first resource configuration through making prediction and calculation analysis based on the information, which may achieve dynamic configurations of
(Continued)

different coverage classifications, save energy consumption, and improve system capacity and performance at the same time.

20 Claims, 34 Drawing Sheets

(51) Int. Cl.
*H04L 41/082* (2022.01)
*H04L 41/0894* (2022.01)

(58) Field of Classification Search
CPC ... H04W 4/50; H04W 4/022; H04W 52/0229; H04W 52/0254; H04W 52/0203; H04W 64/00; H04W 16/10; H04W 24/02; H04W 52/0245; H04W 52/0212; H04W 72/53
See application file for complete search history.

(56) References Cited

U.S. PATENT DOCUMENTS

| | | | |
|---|---|---|---|
| 10,917,917 B2 | 2/2021 | Kazmi et al. | |
| 11,218,905 B2 | 1/2022 | Sai | |
| 2014/0022976 A1 | 1/2014 | Chao et al. | |
| 2015/0045043 A1 | 2/2015 | Chou | |
| 2016/0183295 A1 | 6/2016 | Liu et al. | |
| 2018/0035398 A1 | 2/2018 | Lee et al. | |
| 2018/0139760 A1 | 5/2018 | Lee et al. | |
| 2019/0089436 A1 | 3/2019 | Wei et al. | |
| 2019/0239170 A1 | 8/2019 | Thangarasa et al. | |
| 2019/0261428 A1 | 8/2019 | Awad | |
| 2020/0228990 A1* | 7/2020 | Xu | H04L 41/5054 |
| 2020/0245168 A1* | 7/2020 | Ketonen | H04W 24/08 |
| 2020/0337045 A1* | 10/2020 | Chen | H04W 72/21 |
| 2021/0092584 A1* | 3/2021 | Zou | H04W 4/029 |
| 2021/0321233 A1* | 10/2021 | Mach | H04B 17/318 |
| 2023/0362725 A1* | 11/2023 | Condoluci | H04W 4/70 |
| 2023/0363008 A1 | 11/2023 | Sharma et al. | |
| 2024/0008064 A1* | 1/2024 | Lee | H04W 74/004 |

FOREIGN PATENT DOCUMENTS

| | | |
|---|---|---|
| JP | 5529306 B1 | 6/2014 |
| JP | 2020-065192 A | 4/2020 |
| KR | 10-1632386 B1 | 7/2016 |
| KR | 10-2017-0049044 A | 5/2017 |
| KR | 10-2019-0078722 A | 7/2019 |
| KR | 10-2019-0133678 A | 12/2019 |
| KR | 10-2108292 B1 | 5/2020 |
| WO | 2018/178249 A1 | 10/2018 |

OTHER PUBLICATIONS

Ericsson, NB-IoT—NPDSCH resource allocation, R1-161826, 3GPP TSG-RAN1—Ad Hoc NB-IoT, Sophia Antipolis, France, Mar. 22-24, 2016.

Fatang et al., Analysis and design of uplink resource scheduling in narrow band Internet of things, Journal of Computer Applications, Dec. 14, 2018.

Chafii et al., Enhancing Coverage in Narrow Band-IoT Using Machine Learning, 2018 IEEE Wireless Communications and Networking Conference, Apr. 18, 2018.

Extended European Search Report dated Oct. 17, 2023, issued in European Application No. 21842384.6-1218.

* cited by examiner

INFORMATION PROCESSING METHOD, APPARATUS, DEVICE AND COMPUTER READABLE STORAGE MEDIUM

CROSS-REFERENCE TO RELATED APPLICATION(S)

This application is a continuation application, claiming priority under § 365(c), of an International application No. PCT/KR2021/009111, filed on Jul. 15, 2021, which was based on and claimed the benefit of a Chinese patent application number 202010682573.2, filed on Jul. 15, 2020, in the Chinese Intellectual Property Office, the disclosure of which is incorporated by reference herein in its entirety.

BACKGROUND

1. Field

The disclosure relates to the field of wireless communication technology. More particularly, the disclosure relates to a method, an apparatus, a device for processing information, and computer-readable storage medium.

2. Description of Related Art

As an important scenario of fifth generation (5G) mobile communication technology, massive internet of things (MIoT) relies on a powerful connection capabilities of 5G to realize the interconnection of everything through the integration of vertical industries, which extends the communication between humans to the full-scene connection of human-thing, thing-thing. For the MIoT scenario, third generation partnership project (3GPP) defines a super-scale connection requirement of 1 million connections per square kilometer. In addition, MIoT service applications also put forward higher requirements for low cost, low power consumption, and deep coverage.

The above information is presented as background information only to assist with an understanding of the disclosure. No determination has been made, and no assertion is made, as to whether any of the above might be applicable as prior art with regard to the disclosure.

SUMMARY

In the current network, the division of the internet of things (IoT) coverage level (CL) and parameters thereof substantially use a manually unified initial configuration. In the actual network operation, a specific problem will be analyzed after it occurs, and the parameters are adjusted manually. This manual and semi-static adjustment method is not only time-consuming and laborious, but also easy to cause mismatch between the parameters and the actual network environment.

Fixed CL division cannot adapt to the time-varying distribution of IoT terminals, which results in access congestion and waste of resources.

The traditional methods of manual initial configuration or post-adjustment cannot adapt to changing network environment and IoT service distribution in actual network operation.

Aspects of the disclosure are to address at least the above-mentioned problems and/or disadvantages and to provide at least the advantages described below. Accordingly, an aspect of the disclosure is to provide a method, an apparatus, a device for processing information, and a computer-readable storage medium to solve the problem of how to save energy consumption and improve system capacity and performance.

Additional aspects will be set forth in part in the description which follows and, in part, will be apparent from the description, or may be learned by practice of the presented embodiments.

In accordance with an aspect of the present disclosure, an information processing method is provided. The method is used in a first network device, and includes receiving information related to a second network device, determining a first resource configuration corresponding to a coverage classification related to the second network device based on the information, and transmitting the first resource configuration to the second network device.

Optionally, the determining the first resource configuration corresponding to the coverage classification related to the second network device based on the information includes determining a service distribution related information of a user equipment (UE) respectively corresponding to coverage characteristic during a first period based on the information, wherein the UE is included in the second network device, based on the service distribution related information of the UE during the first period, predicting or calculating the service distribution related information of the UE during a second period after the first period to determine the service distribution related information of the UE during the second period, and determining the first resource configuration corresponding to the coverage classification related to the second network device based on the service distribution related information of the UE during the second period.

Optionally, before determining the service distribution related information of the UE respectively corresponding to the coverage characteristic during the first period based on the information, the method further includes receiving service information transmitted by an external server, wherein the service information includes location information of the UE and feature information of the UE, the location information includes at least one of location parameters of the UE provided by a positioning server and flight trajectory parameters provided by the positioning server, the feature information includes at least one of service period and periodic reporting time, and the determining the service distribution related information of the UE corresponding to the coverage characteristic during the first period based on the information, includes determining the service distribution related information of the UE respectively corresponding to the coverage characteristic during the first period based on the information and the service information.

Optionally, the information includes at least one of measurement information of the second network device and configuration information of the second network device, the measurement information includes at least one of signal strength data, service data, and performance data, the configuration information includes at least one of coverage classification threshold configuration used for dividing coverage classification, and resource configuration parameters corresponding to the coverage classification, and the coverage classification threshold configuration is a coverage characteristic index value that is used to divide the coverage area into different coverage classifications.

Optionally, the determining the service distribution related information of the UE respectively corresponding to the coverage characteristic during the first period based on the information, includes based on the service data and the service information, determining the distribution information of the UE that has a service to be transmitted and a need to access the second network device during the first period, and based on the performance data and the configuration information, determining an access capacity of the random access channel (RACH) corresponding to different configuration information, and the service distribution related information includes the distribution information and the access capacity of the RACH corresponding to the different configuration information.

Optionally, based on the service distribution related information of the UE during the first period, predicting or calculating the service distribution related information of the UE during the second period after the first period to determine the service distribution related information of the UE during the second period, includes inputting the service distribution related information of the UE during N service periods into a preset prediction model, predicting the service distribution related information of the UE during the second period after the first period through the prediction model, and obtaining capacity distribution of the service over time corresponding to the coverage characteristic within a first service period (i.e., the N+1 service period) after the N service periods, wherein the first period includes N service periods, the second time period includes the first service period, and the service distribution related information of the UE during the first period is used to characterize the capacity distribution of the service over time corresponding to the coverage characteristic within the N service periods, and the service distribution related information of the UE during the second period is used to characterize the capacity distribution of the service over time corresponding to the coverage characteristic within the first service period, the N is a positive integer.

Optionally, the determining the first resource configuration corresponding to the coverage classification related to the second network device based on the service distribution related information of the UE during the second period, includes determining the coverage classification thresholds respectively to the coverage classification based on the service distribution related information of the UE during the second period, and determining the first resource configuration corresponding to the coverage classification related to the second network device based on the service distribution related information of the UE during the second period and the coverage classification threshold respectively corresponding to the coverage classifications.

Optionally, the determining the first resource configuration corresponding to the coverage classification related to the second network device based on the service distribution related information of the UE during the second period and the coverage classification threshold respectively corresponding to the coverage classifications, includes based on the coverage classification threshold respectively corresponding to the coverage classifications, determining the number of repetitions for transmission of resources of the UEs respectively corresponding to the coverage classifications, the modulation and coding scheme (MCS) configuration of the resource, the resource includes at least one of a physical downlink control channel (PDCCH), a physical downlink shared channel (PDSCH), a physical uplink shared channel (PUSCH), and uplink control information (UCI), based on the service distribution related information of the UE during the second period and the coverage classification threshold respectively corresponding to the coverage classifications, determining the number of the coverage classifications and the number of the UEs respectively corresponding to the coverage classifications, and based on the number of the UEs respectively corresponding to the coverage classifications and the access capacity of the RACH corresponding to the configuration information of the second network device included in the information, determining a second resource configuration of the RACH respectively corresponding to the coverage classifications, wherein the first resource configuration corresponding to the coverage classification includes the coverage classification threshold of the UE respectively corresponding to the coverage classification, the number of repetitions for transmission of the resource, the MCS configuration of the resource, and the second resource configuration of the RACH respectively corresponding to the coverage classifications, and wherein the second resource configuration of the RACH includes at least one of the number of repetitions for transmission of a random access preamble, the number of RACH subcarriers, and the RACH period.

Optionally, when the number of the coverage classifications and the coverage classification threshold respectively corresponding to the coverage classification change, adjusting the number of repetitions for transmission of the resource of the UE corresponding to the coverage classification and the modulation and coding scheme (MCS) configuration of the resource, or after determining the number of the coverage classifications and the coverage classification threshold respectively corresponding to the coverage classification, adjusting the number of repetitions for transmission of the resource of the UE corresponding to the coverage classification and the modulation and coding scheme (MCS) configuration of the resource.

Optionally, the adjusting the number of repetitions for transmission of the resource of the UE corresponding to the coverage classification, includes at least one of the following, adjusting the number of repetitions for transmission of the PDCCH, which includes adjusting the number of repetitions for transmission of at least one of message msg2, message msg3, and message msg4 in the common search space, and the number of repetitions for transmission of the dedicated search space, adjusting the number of repetitions for transmission of the PDSCH, which includes adjusting at least one of the number of repetitions for transmission of the PDSCH carrying the message msg2, the number of repetitions for transmission of the PDSCH carrying the message msg4, and the number of repetitions for transmission of the PDSCH carrying downlink signaling and data in the connected state, adjusting the number of repetitions for transmission of the PUSCH, which includes adjusting at least one of: the number of repetitions for transmission of the PUSCH carrying the message msg3, and the number of repetitions for transmission of the PUSCH carrying uplink signaling and data in the connected state, and adjusting the number of repetitions for transmission of the uplink control information (UCI), which comprising adjusting at least one of the number of repetitions for transmission of the PUSCH carrying downlink transmission acknowledgment (ACK) and/or negative acknowledgment (NACK), and the number of repetitions for transmission of the PUCCH carrying downlink transmission ACK and/or NACK.

Optionally, the adjusting the MCS configuration of the resource of the UE corresponding to the coverage classification, includes at least one of the following, adjusting the MCS configuration of the PDSCH, which includes adjusting at least one of the MCS configuration of the PDSCH carrying the message msg2, the MCS configuration of the PDSCH carrying the message msg4, and the MCS configuration of the PDSCH carrying the downlink signaling and data in the connected state, and adjusting the MCS configuration of the PUSCH, which includes adjusting at least one of the MCS configuration of the PUSCH carrying the message msg3, and the MCS configuration of the PDSCH carrying the uplink signaling and data in the connected state.

Optionally, the receiving information related to the second network device includes at least one of the following, receiving the information related to the second network device transmitted by a service management and orchestration (SMO), receiving the information related to the second network device transmitted by the near-real-time RAN intelligent controller (Near-RT RIC), wherein the information related to the second network device is obtained by the Near-RT RIC from the second network device.

Optionally, the transmitting the first resource configuration to the second network device includes one of the following, transmitting the first resource configuration to the second network device, transmitting the first resource configuration to the Near-RT RIC, wherein the first resource configuration is transmitted to the second network device by the Near-RT RIC, or transmitting the first resource configuration to the second network device through the Near-RT RIC.

Optionally, the first network device is a non-real-time RAN intelligent controller (Non-RT RIC) or a near-real-time RAN intelligent controller (Near-RT RIC).

In accordance with another aspect of the disclosure, an information processing apparatus used in a first network device is provided. The information processing apparatus includes a first processing module configured to receive information related to a second network device transmitted by the second network device, a second processing module configured to determine a first resource configuration corresponding to a coverage classification related to the second network device based on the information, and a third processing module configured to transmit the first resource configuration to the second network device.

In accordance with another aspect of the disclosure, an electronic device is provided. The electronic device includes a processor, a memory, and a bus, the bus is used to connect the processor and the memory, the memory is used to store operation instructions, the processor is configured to execute the information processing method of an aspect according to the disclosure by invoking the operation instructions.

In accordance with another aspect of the disclosure, a computer-readable storage medium storing a computer program is provided. The computer program is used to execute the information processing method of an aspect according to the present disclosure.

The technical solutions provided by embodiments of this disclosure have at least the following beneficial effects, obtaining the first resource configuration through making prediction and calculation analysis based on the information, which may achieve dynamic configurations of different coverage classifications, save energy consumption, and improve system capacity and performance at the same time.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
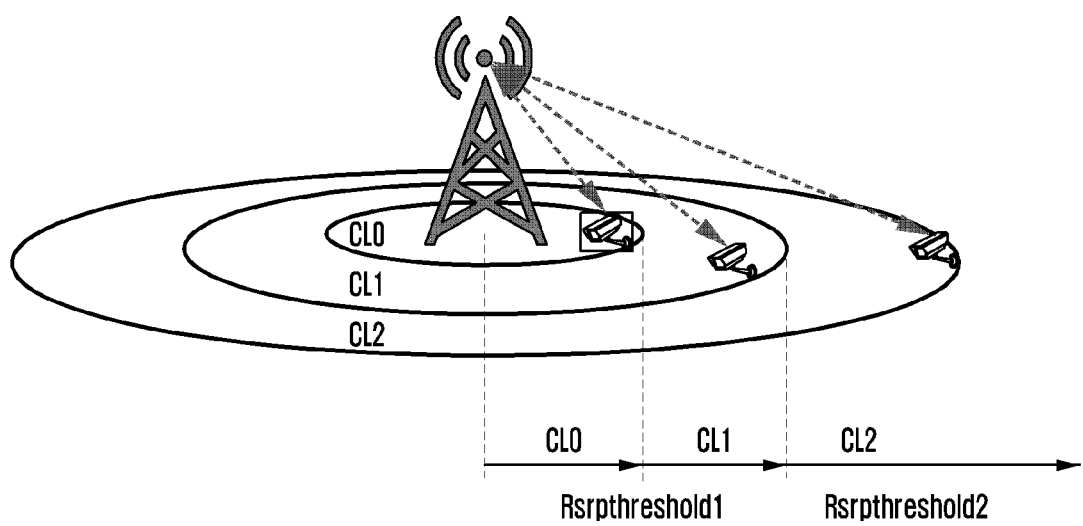
FIG. 1 is a schematic diagram of 3GPP Narrow Band IoT (NB-IoT) coverage level (CL) according to the related art.

The following description with reference to the accompanying drawings is provided to assist in a comprehensive understanding of various embodiments the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The various operations, methods, steps, measures, and solutions in the process that have been discussed in this disclosure may be alternated, changed, combined, or deleted. The various steps and various solutions in this disclosure may be combined; some steps in an embodiment of this disclosure may also be combined into a new solution, and all the steps in this embodiment are not required.

Those skilled in the art should understand that the singular forms "a," "an," "said" and "the" include plural referents unless the context clearly dictates otherwise. It should be further understood that the expression "comprising" or "include" used in the specification of the disclosure means the existence of the features, integers, steps, operations, elements and/or components, but does not preclude the existence or addition of one or more other features, integers, steps, operations, elements, components and/or combinations thereof. It should be understood when an element is referred to as being "connected to" or "coupled to" another element, it may be directly connected or coupled to the other element, or an intervening element may be present. Furthermore, the terms "connected" or "coupled" used herein may include a wireless connection or a wireless coupling. The phrase "and/or" used herein includes all or any one and all combinations of one or more of the associated listed items.

In order to better understand and explain the solutions of the embodiments of the disclosure, some technologies involved in the embodiments of the disclosure are briefly described below.

Coverage classification may include or be referred to as coverage level, coverage class, and so on.

The coverage characteristics may include RSRP, signal to interference plus noise ratio (SINR), reference signal receiving quality (RSRQ), or other indicators that indicate the coverage classification. According to the current 3GPP protocol, based on the division of coverage levels, NB-IoT supports up to 3 coverage levels and enhanced machine type communication (eMTC) supports up to 4 coverage levels. The maximum number of coverage levels may change in other wireless communication systems or future 3GPP protocol.

According to the current 3GPP protocol, different coverage levels are determined by defining reference signal receiving power (RSRP) thresholds. In the future 3GPP protocol or in other wireless communication systems, the division of coverage classifications may be determined by defining other threshold indicators, including SINR, RSRQ, or other indicators that identify coverage differences. In this case, RSRP is taken as an example.

The resource configuration (a set of parameters affected by RSRP threshold) for each coverage level may include random access resource configuration, which includes time domain/frequency domain resources for transmitting the preamble (msg1) and the number of repetitions of the preamble.

Where, time domain resources include time domain periods, frequency domain resources include the number of subcarriers, the number of repetitions of preamble represents the number of repetitions for transmission required for transmitting a preamble, scheduling resource configuration includes the number of repetitions for transmission and/or modulation and coding scheme (MCS) configuration for physical downlink control channel (PDCCH), physical downlink shared channel (PDSCH), physical uplink shared channel (PUSCH), physical uplink control channel (PUCCH).

Specifically, the IoT terminal may compare the measured signal strength (RSRP) with the RSRP threshold to determine the coverage level (CL) where it is located, and then use the corresponding (random access channel (RACH) resource to initiate random access, a base station selects the corresponding resource configuration based on the CL that the UE accesses. For example, for a CL with a good signal strength, the transmission requirement can be met without setting the number of repetitions or with a small amount of repetitions while ensuring a higher data transmission rate, for a CL with a poor signal strength, the coverage characteristics can be met by setting a larger number of repetitions.

The open radio access network (O-RAN) focuses on the needs of network intelligence, interface openness, open source software and hardware white box, which is intended to promote the openness of wireless device interfaces, and realize intelligent wireless networks by introducing new technologies such as artificial intelligence, thereby to raise the openness of the next generation wireless communication network to a new level.

Figure 5:
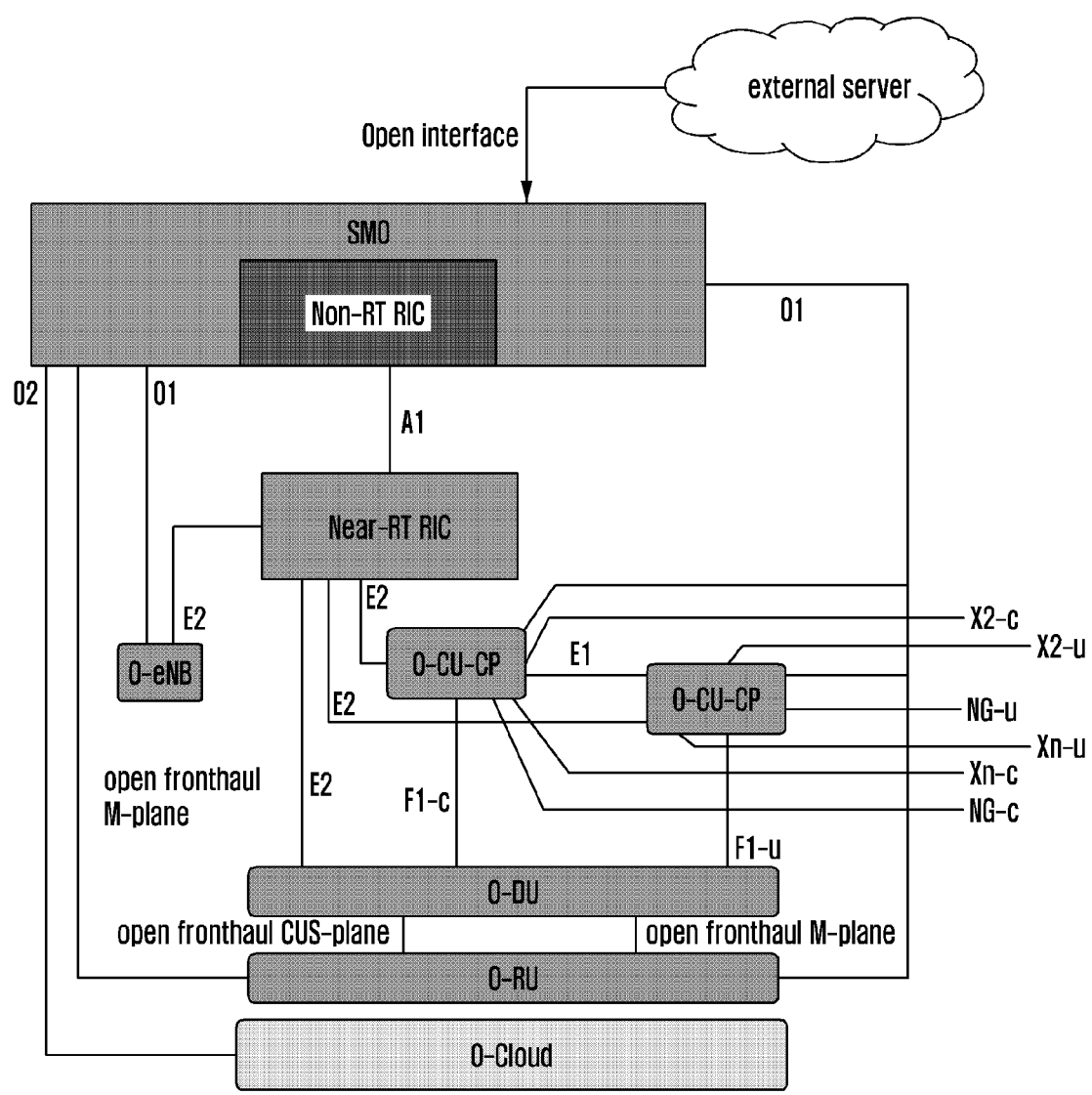
FIG. 5 is a schematic diagram of an open radio access network (O-RAN) logical architecture according to an embodiment of the disclosure.

FIG. 5 is a schematic diagram of an O-RAN logical architecture according to an embodiment of the disclosure.

Referring to FIG. 5, according to an open radio access network (O-RAN) specification, a logical architecture of an open radio access network (O-RAN) is shown. The entities of wireless side may include a Near-RT RIC, an O-RAN control unit control plane (O-CU-CP), an O-RAN control unit user plane (O-CU-UP), an O-RAN data unit (O-DU), and an O-RAN evolved node B (O-eNB).

Service management and orchestration (SMO) entities may provide a variety of management services and network management functions, such as RAN management, core network management, transmission management, and end-to-end slice management.

Non-real time RAN intelligent controller (Non-RT RIC) is a logical entity built into SMO, which supports non-real-time control and optimization of RAN network elements and resources, artificial intelligence (AI)/machine learning (ML) model establishing, reasoning and updating, RAN is optimized through data analysis and AI/ML training/reasoning, and it provides strategic guidance and ML model management to the near-real Time RAN intelligent controller (Near-RT RIC) through the AI interface.

The Near-RT RIC logical entity may support near-real-time control and optimization of RAN network elements and resources, and may include artificial intelligence (AI)/machine learning (ML) model training, reasoning and updating, and strategy guidance. The Near-RT RIC provides network optimization instructions to the E2 node through the E2 interface.

E2 node: which may include O-RAN control unit control plane (O-CU-CP), O-RAN control unit user plane (O-CU-UP), O-RAN data unit (O-DU), O-eNB and other entities, where O-CU-CP, O-CU-UP, and O-DU are used for 5G new radio (NR) access, O-eNB is used for evolved universal mobile telecommunications system (UMTS) terrestrial radio access (E-UTRA) access. Compared with the CU-CP, CU-UP and DU of the non-O-RAN system, the E2 node adds support for the E2 interface.

O-eNB: which is eNB or ng-eNB supporting O-RAN architecture.

O-Cloud: which is O-RAN cloud computing platform.

External server: which is a server for various application APP, etc., and may provide SMO with rich data.

The O-RAN architecture mainly includes four interfaces:

A1: which is located between Non-RT RIC and near-RT RIC, and supports strategy management, rich information and ML model management services.

E2: which is used to connect the near-RT RIC and E2 node. One E2 node can only be connected to one near-RT RIC. The Near-RT RIC entity can collect the near-real-time information (UE-level or cell-level) measured by respective functional entity of the wireless network through the E2 interface, and can also issue control command words to the base station through the E2 interface, and finally the E2 interface may control the behavior of the base station.

O1: which is an interface located between the O-RAN managed entity (near-RT RIC, E2 node) and the O-RAN management entity (SMO), and supports operation and management, including network fault/configuration/accounting/performance/security (F CAPS) management, physical network function (PNF) software management and file management.

O2: which connects SMO and O-Cloud to support O-RAN virtualization.

Open fronthaul M-plane interface: which is located between SMO and O-RAN radio unit (O-RU) to support O-RU management.

In order to make the objectives, technical solutions, and advantages of the disclosure clear, the implementations of the disclosure will be further described in detail below in conjunction with the accompanying drawings.

To support large-scale connections, 3GPP has proposed two cellular IoT protocol standards of Narrow Band IoT (NB-IoT) and enhanced machine type communication (eMTC). In the protocol, 3GPP introduced the concept of coverage level (CL).

FIG. 1 is a schematic diagram of 3GPP NB-IoT coverage level (CL) according to the related art.

Referring to FIG. 1, CL is divided by defining a signal strength threshold (rsrpThreshold), and differentiated resource configurations are defined for respective coverage levels to achieve requirements of coverage, capacity, and management for a large number of terminals.

CL division is mainly achieved by defining reference signal receiving power (RSRP) threshold. In actual networks, the RSRP threshold is generally determined based on the maximum and deepest coverage of the cell. However, since IoT services are mostly transmitted infrequently, in fact, the distribution of IoT terminals that truly have service transmitting and receiving requirements in the cell has time-varying characteristics.

Figure 2:
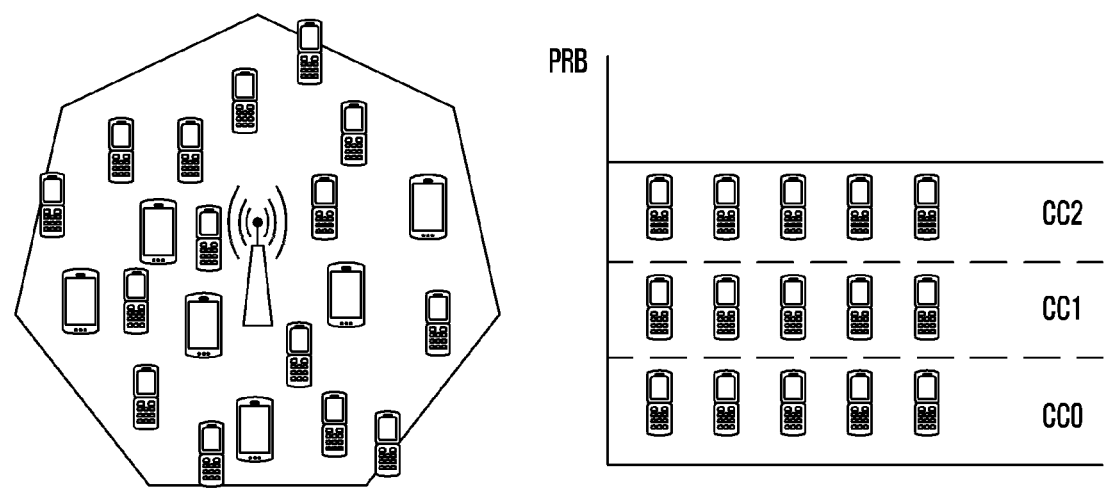
FIG. 2 is a schematic diagram of a distribution of IoT terminals during a day according to the related art.

FIG. 2 is a schematic diagram of a distribution of IoT terminals during a day according to the related art.

Figure 3:
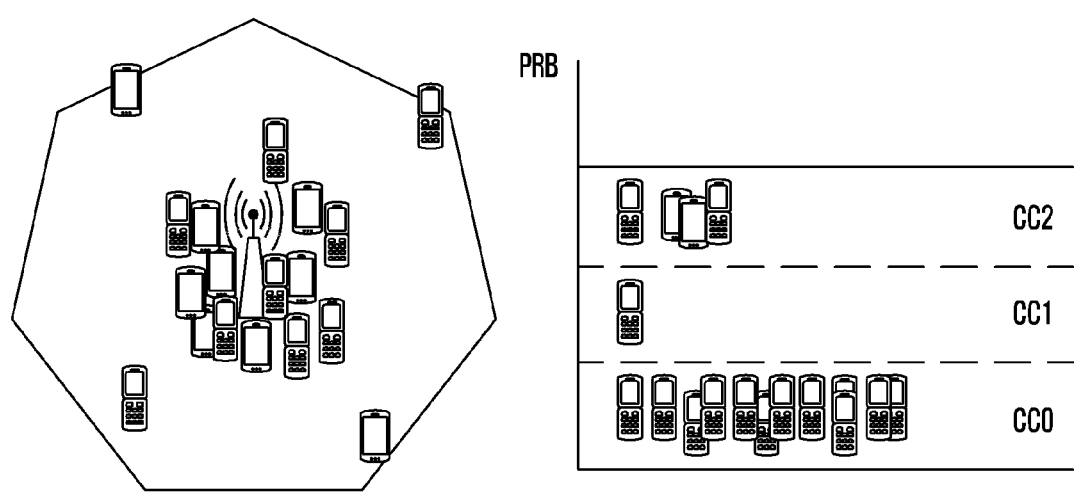
FIG. 3 is a schematic diagram of a distribution of IoT terminals during a night according to the related art.

FIG. 3 is a schematic diagram of a distribution of IoT terminals during a night according to the related art.

Referring to FIGS. 2 and 3, for example, IoT terminals are distributed evenly during the day, but at night, most of the terminals that transmit IoT services fall into a range of strong signal strength. In this case, a fixed division of three CLs and a fixed resource configuration may lead to insufficient resources for CL0, which may cause access congestion; at the same time, the resources reserved for CL1 and CL2 may be wasted since the actual number of users is small, thereby reducing resource utilization.

The semi-static resource configuration cannot adapt to the time-varying distribution of IoT terminals, which results in an increased power consumption and a decreased system capacity.

As mentioned above, the distribution of IoT terminals that truly have service transmitting and receiving requirements in the cell has time-varying characteristics. The CL-based semi-static resource configuration cannot adapt to the time-varying characteristics of terminal distribution, and may allocate a larger number of repetitions, which not only wastes terminal power, but also causes unnecessary resource waste, thereby reducing system capacity.

Figure 4:
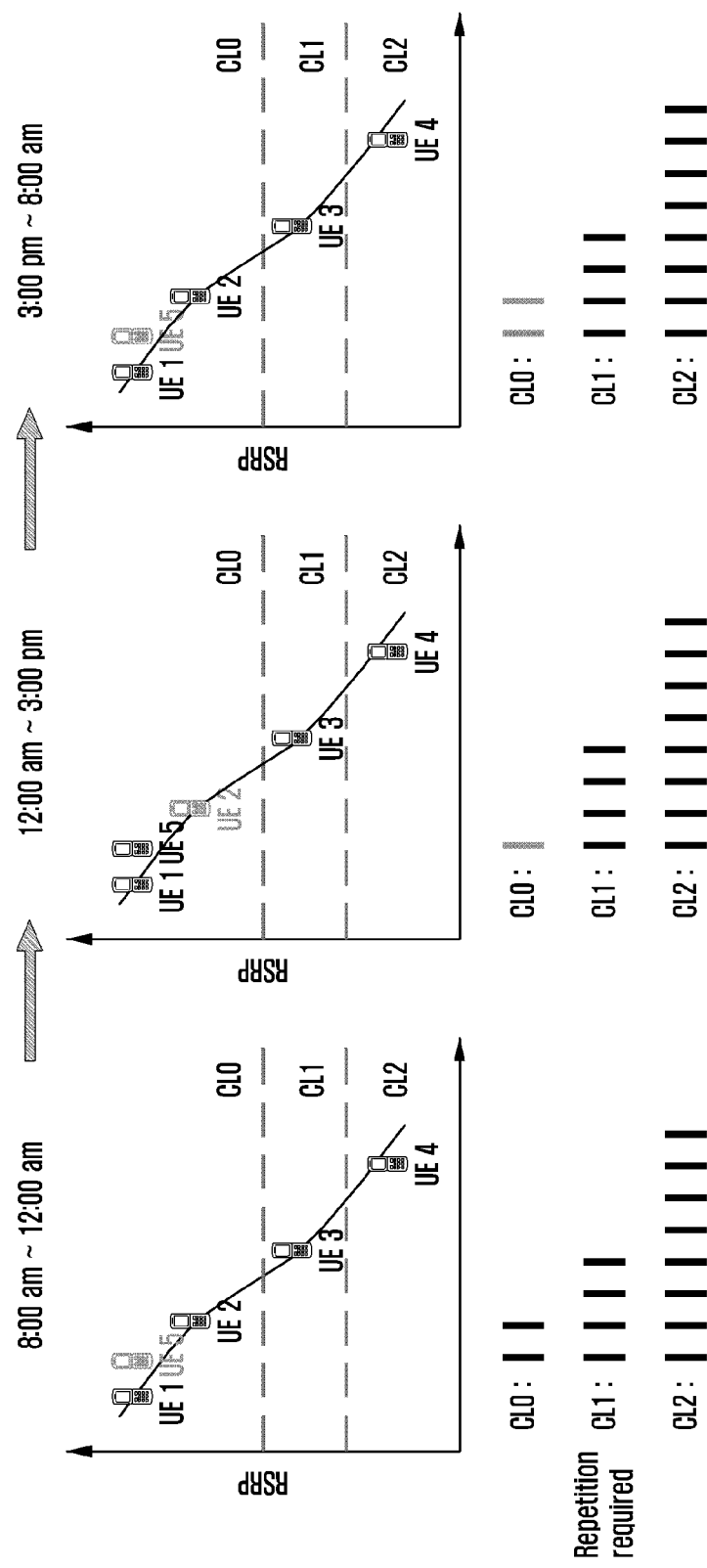
FIG. 4 is a schematic diagram of distribution characteristics of IoT terminals according to the related art.

FIG. 4 is a schematic diagram of distribution characteristics of IoT terminals according to the related art.

Referring to FIG. 4, during the morning time period, an actual effective terminal of CL0 in the area is UE1/UE2, during the noon time period, the actual effective terminal of CL0 is UE1/UE5, and during the afternoon time period, the actual effective terminal of CL0 is UE1/UE2. Where, UE1/UE5 have higher RSRP, it may meet transmission requirement that the number of repetitions is 1, UE2 has lower RSRP, and the number of repetitions is 2. In this case, if it uses the semi-static configuration that the number of repetitions is 2, the number of repetitions for UE1 and UE5 would be too high during the noon time period, which results in an increased resource occupation.

An information processing method is provided according to an embodiment of the present disclosure, which is used in a first network device.

Figure 6:
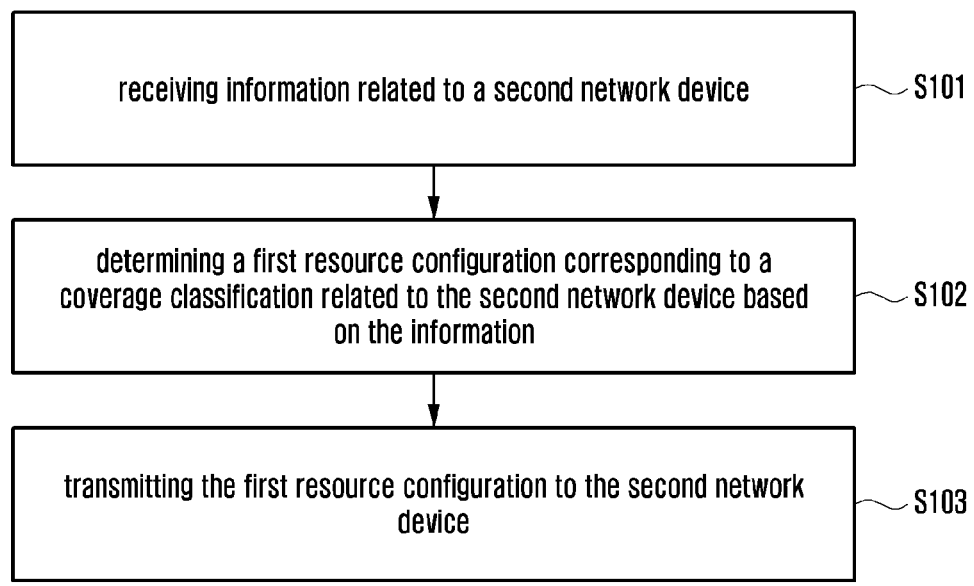
FIG. 6 is a schematic flowchart of an information processing method according to an embodiment of the disclosure.

FIG. 6 is a schematic flowchart of a method according to an embodiment of the disclosure, and the method may include the following operations.

Operation S101: receiving information related to a second network device.

Operation S102: determining a first resource configuration corresponding to a coverage classification related to the second network device based on the information.

Operation S103: transmitting the first resource configuration to the second network device.

Optionally, the determining the first resource configuration corresponding to the coverage classification related to the second network device based on the information includes determining a service distribution related information of a user equipment (UE) respectively corresponding to coverage characteristic during a first period based on the information, wherein the UE is included in the second network device, based on the service distribution related information of the UE during the first period, predicting or calculating the service distribution related information of the UE during a second period after the first period to determine the service distribution related information of the UE during the second period, and determining the first resource configuration corresponding to the coverage classification related to the second network device based on the service distribution related information of the UE during the second period.

Optionally, the coverage classification is a coverage area with different location information, the coverage characteristic is a reference quantity, the reference quantity reflects a feature of the coverage location, and the reference quantity is used to distinguish different coverage classifications.

Optionally, the coverage classification may include coverage level, coverage area, and so on, the coverage characteristic may include reference signal received power (RSRP), signal-to-interference plus noise ratio (SINR), reference signal received quality (RSRQ), other indicators that identify coverage classifications, and so on.

Optionally, service distribution related information may include the time distribution of the number of terminal connections under the coverage characteristic, the distribution of service delay performance under the coverage characteristic, the distribution of service throughput capacity under the coverage characteristic, the distribution of service location information under the coverage characteristic, and the periodic distribution characteristics of service occurrence under the coverage characteristics, and service capacity performance reference under the coverage characteristics. The capacity performance reference is the access capacity of the corresponding random access channel RACH under various configuration information. According to an embodiment of disclosure, the time distribution of the number of terminal connections and the service capacity performance reference under the coverage characteristics are taken as examples for illustration.

Figure 7:
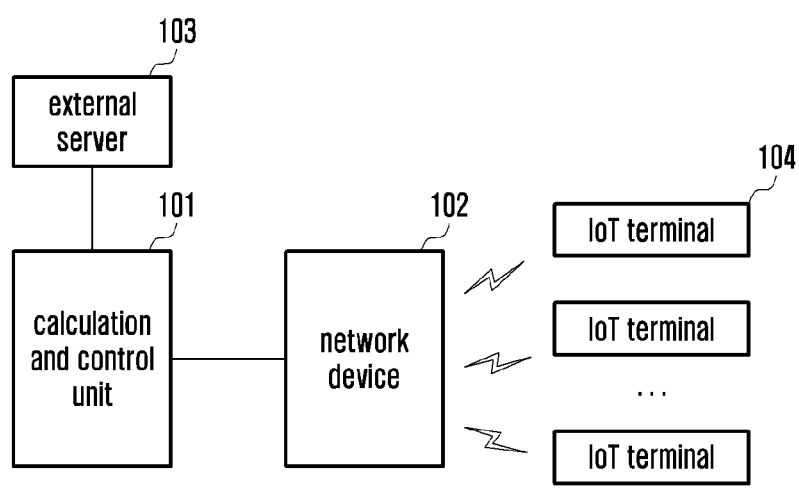
FIG. 7 is a schematic diagram of a massive IoT intelligent dynamic optimization system according to an embodiment of the disclosure.

FIG. 7 is a schematic diagram of a massive IoT intelligent dynamic optimization system according to an embodiment of the disclosure.

Optionally, referring to FIG. 7, a massive IoT intelligent dynamic optimization system includes a calculation and control unit 101, a network device 102, an external server 103 and an IoT terminal 104. The calculation and control unit 101 is mainly responsible for data analysis and dynamic configuration, judgment, and control operations, the calculation and control unit 101 is the first network device. The network device 102 may be a conventional fourth generation (4G) base station, 5G base station, enhanced 4G/5G base station, such as O-RAN architecture-based O-eNB, O-CU, O-DU, or the like, or future network device, such as a sixth generation (6G) network device, the second network device includes the network device 102. The external server 103 may provide auxiliary information, and the external server 103 may be a positioning server, a vertical industry service server, and the like. The IoT terminal 104 may refer to a terminal that supports services of the internet of things, such as a meter reading terminal, a positioning terminal, a temperature or humidity sensor node, and so on, the second network device also includes a user equipment (UE), and the user equipment is the IoT terminal 104.

Optionally, the calculation and control unit 101 may be located in a newly-added entity, or may be located in an existing entity, such as the network device 102, the RIC entity under the O-RAN architecture, and so on.

Optionally, before determining the service distribution related information of the UE respectively corresponding to the coverage characteristic during the first period based on the information, the method further includes receiving service information transmitted by an external server, wherein the service information includes location information of the UE and feature information of the UE, the location information includes at least one of location parameters of the UE provided by a positioning server and flight trajectory parameters provided by the positioning server, the feature information includes at least one of service period and periodic reporting time.

The determining the service distribution related information of the UE corresponding to the coverage characteristic during the first period based on the information, includes determining the service distribution related information of the UE respectively corresponding to the coverage characteristic during the first period based on the information and the service information.

Optionally, the information includes at least one of measurement information of the second network device and configuration information of the second network device, the measurement information includes at least one of signal strength data, service data, and performance data, the configuration information includes at least one of coverage classification threshold configuration used for dividing coverage classification, and resource configuration parameters corresponding to the coverage classification, and the coverage classification threshold configuration is a coverage characteristic index value that is used to divide the coverage area into different coverage classifications.

Optionally, the coverage classification threshold configuration may include RSRP, SINR, RSRQ, and other indicators for identifying coverage classifications.

Optionally, the determining the service distribution related information of the UE respectively corresponding to the coverage characteristic during the first period based on the information, includes, based on the service data and the service information, determining the distribution information of the UE that has a service to be transmitted and need to access the second network device during the first period, and based on the performance data and the configuration information, determining an access capacity of the random access channel (RACH) corresponding to different configuration information, and the service distribution related information includes the distribution information and the access capacity of the RACH corresponding to the different configuration information.

Optionally, based on the service distribution related information of the UE during the first period, predicting or calculating the service distribution related information of the UE during the second period after the first period to determine the service distribution related information of the UE during the second period, includes inputting the service distribution related information of the UE during N service periods into a preset prediction model, predicting the service distribution related information of the UE during the second period after the first period through the prediction model, and obtaining capacity distribution of the service over time corresponding to the coverage feature within a first service period (i.e., the N+1 service period) after the N service periods, wherein the first period includes N service periods, the second time period includes the first service period, and the service distribution related information of the UE during the first period is used to characterize the capacity distribution of the service over time corresponding to the coverage feature within the N service periods, and the service distribution related information of the UE during the second period is used to characterize the capacity distribution of the service over time corresponding to the coverage feature within the first service period, the N is a positive integer.

Optionally, the determining the first resource configuration corresponding to the coverage classification related to the second network device based on the service distribution related information of the UE during the second period, includes determining the coverage classification thresholds respectively to the coverage classification based on the service distribution related information of the UE during the second period; and determining the first resource configuration corresponding to the coverage classification related to the second network device based on the service distribution related information of the UE during the second period and the coverage classification threshold respectively corresponding to the coverage classifications.

Optionally, the determining the first resource configuration corresponding to the coverage classification related to the second network device based on the service distribution related information of the UE during the second period and the coverage classification threshold respectively corresponding to the coverage classifications, includes, based on the coverage classification threshold respectively corresponding to the coverage classifications, determining the number of repetitions for transmission of resources of the UEs respectively corresponding to the coverage classifications, the modulation and coding scheme (MCS) configuration of the resource, the resource includes at least one of a physical downlink control channel (PDCCH), a physical downlink shared channel (PDSCH), a physical uplink shared channel (PUSCH), and uplink control information (UCI), based on the service distribution related information of the UE during the second period and the coverage classification threshold respectively corresponding to the coverage classifications, determining the number of the coverage classifications and the number of the UEs respectively corresponding to the coverage classifications, and based on the number of the UEs respectively corresponding to the coverage classifications and the access capacity of the RACH corresponding to the configuration information of the second network device included in the information, determining a second resource configuration of the RACH respectively corresponding to the coverage classifications, wherein the first resource configuration corresponding to the coverage classification includes the coverage classification threshold of the UE respectively corresponding to the coverage classification, the number of repetitions for transmission of the resource, the MCS configuration of the resource, and the second resource configuration of the RACH respectively corresponding to the coverage classifications, and wherein the second resource configuration of the RACH includes at least one of the number of repetitions for transmission of a random access preamble, the number of RACH subcarriers, and the RACH period.

Optionally, when the number of the coverage classifications and the coverage classification threshold respectively corresponding to the coverage classification change, it may adjust the number of repetitions for transmission of the resource of the UE corresponding to the coverage classification and the modulation and coding scheme (MCS) configuration of the resource, or after determining the number of the coverage classifications and the coverage classification threshold respectively corresponding to the coverage classification, it may adjust the number of repetitions for transmission of the resource of the UE corresponding to the coverage classification and the modulation and coding scheme (MCS) configuration of the resource.

Optionally, the adjusting the number of repetitions for transmission of the resource of the UE corresponding to the coverage classification, includes at least one of the following, adjusting the number of repetitions for transmission of the PDCCH, which includes adjusting the number of repetitions for transmission of at least one of message msg2, message msg3, and message msg4 in the common search space, and the number of repetitions for transmission of the dedicated search space, adjusting the number of repetitions for transmission of the PDSCH, which includes adjusting at least one of the number of repetitions for transmission of the PDSCH carrying the message msg2, the number of repetitions for transmission of the PDSCH carrying the message msg4, and the number of repetitions for transmission of the PDSCH carrying downlink signaling and data in the connected state, adjusting the number of repetitions for transmission of the PUSCH, which includes adjusting at least one of the number of repetitions for transmission of the PUSCH carrying the message msg3, and the number of repetitions for transmission of the PUSCH carrying uplink signaling and data in the connected state, and adjusting the number of repetitions for transmission of the uplink control information (UCI), which comprises adjusting at least one of the number of repetitions for transmission of the PUSCH carrying downlink transmission ACK and/or NACK, and the number of repetitions for transmission of the PUCCH carrying downlink transmission ACK and/or NACK.

Optionally, the adjusting the MCS configuration of the resource of the UE corresponding to the coverage classification, includes at least one of the following, adjusting the MCS configuration of the PDSCH, which includes adjusting at least one of the MCS configuration of the PDSCH carrying the message msg2, the MCS configuration of the PDSCH carrying the message msg4, and the MCS configuration of the PDSCH carrying the downlink signaling and data in the connected state, and adjusting the MCS configuration of the PUSCH, which includes adjusting at least one of: the MCS configuration of the PUSCH carrying the message msg3, and the MCS configuration of the PDSCH carrying the uplink signaling and data in the connected state.

Optionally, the receiving information transmitted by the second network device includes at least one of the following, receiving the information related to the second network device transmitted by a service management and orchestration (SMO), and receiving the information related to the second network device transmitted by the near-real-time RAN intelligent controller (Near-RT RIC), wherein the information related to the second network device is obtained by the Near-RT RIC from the second network device.

Optionally, the transmitting the first resource configuration to the second network device includes one of the following, transmitting the first resource configuration to the second network device, transmitting the first resource configuration to the Near-RT RIC, wherein the first resource configuration is transmitted to the second network device by the Near-RT RIC, or transmitting the first resource configuration to the second network device through the Near-RT RIC.

Optionally, the first network device is a non-real-time RAN intelligent controller (Non-RT RIC) or a near-real-time RAN intelligent controller (Near-RT RIC).

The technical solutions provided by the embodiments of this disclosure have at least the following beneficial effects, through predicting or calculating the service distribution related information of the user equipment during the second period after the first period, it may realize dynamic configurations of different coverage classifications in the cell, save energy consumption, and improve system capacity and performance at the same time.

In order to describe the methods provided in the embodiments of the disclosure in more detail, the following will fully describe the solutions of the disclosure through a plurality of optional embodiments.

Alternative Embodiment 1

The embodiment of the disclosure provides still another information processing method, which is used in a calculation and control unit, and the method may include the following operations.

In operation 1, the network device is responsible for collecting data and reporting it to the calculation and control unit.

Optionally, the collected data is mainly regular measurement information and configuration information of the network device. Where, the conventional measurement information may include signal strength data, service data and performance data.

Signal strength data, which refers to the signal strength parameters reported by the UE, such as measured RSRP information.

Service data, which refers to cache changes of each UE counted by network device, such as uplink cache information and downlink cache information.

Performance data, which refers to the access performance data of each coverage level calculated by the network device, including the number of messages successfully received in the random access process, the number of preamble codes (Msg1), and the number of contention resolutions (Msg4) during the statistical period.

Where, the configuration information includes RSRP threshold configuration used for dividing coverage level, and resource configuration parameters corresponding to respective coverage levels.

The resource configuration parameters corresponding to respective coverage levels may include physical random access channel (PRACH) resource configuration parameters and scheduling resource configuration parameters. The PRACH resource configuration parameters may include PRACH period, the number of frequency domain subcarriers, and so son, the scheduling resource configuration parameters may include the number of repetitions for transmission for PDCCH, PDSCH, PUSCH and MCS configuration parameters.

In operation 2, the external server may transmit the external data to the calculation and control unit through the open interface.

Optionally, the external data mainly includes the location information of the IoT terminal and the feature information of the IoT service. The location information of the IoT terminal includes the location parameter provided by the positioning server and flight trajectory parameters, etc., the feature information of the IoT service includes the IoT service period and periodic reporting time provided by the service server, and so on.

In operation 3, the calculation and control unit may analyze the measured data and external data to obtain the time-varying distribution of IoT services under respective RSRPs.

Optionally, the calculation and control unit analyzes the measurement data and external data, including, by using the reported cache information and IoT service information, it is possible to obtain the time-varying distribution of IoT terminals (hereinafter referred to as 'IoT service terminals') that have services to be transmitted and need to access to network devices.

Optionally, by using external location information, it is possible to further obtain the time distribution of IoT service terminals under respective RSRPs.

By using the reported access performance data and configuration information, it is possible to obtain the capacity performance reference of the system under different RACH configurations.

In operation 4, the calculation and control unit may predict the IoT service terminal distribution in the next time period.

Optionally, in operation 4, it may use the time distribution of IoT service terminals under respective RSRPs obtained in operation 3 to predict the time distribution of IoT service terminals under respective RSRPs in the next time period.

In operation 5, the calculation and control unit may form optimized wireless resources and transmission parameters based on the predicted IoT service terminal distribution.

Optionally, in operation 5, it may use the predicted IoT service terminal distribution under respective RSRPs obtained in operation 4 to cluster RSRP thresholds of different coverage levels.

Optionally, based on obtained the RSRP thresholds, it is possible to calculate the number of repetitions of uplink control information (e.g., PDCCH/PDSCH/PUSCH/UCI) and modulation and coding scheme (MCS) configuration of the IoT terminal under respective CLs.

Specifically, the adjusting of the number of repetitions for transmission of the physical downlink control channel may include adjusting the number of repetitions of message msg2, message msg3, and message msg4 in the common search space, and the number of repetitions of the dedicated search space.

The adjusting of the number of repetitions of the physical downlink shared channel and the MCS configuration may include adjusting the number of repetitions of the physical downlink shared channel that carries msg2 messages/msg4 messages, and carries downlink signaling and data in the connected state and adjusting the MCS configuration.

The adjusting of the number of repetitions of the physical uplink shared channel and the adjusting of the MCS configuration may include adjusting the number of repetitions of the physical uplink shared channel that carries the msg3 message, and carries the uplink signaling and data in the connected state, and adjusting the MCS configuration.

Optionally, the adjustment of the number of repetitions and the MCS configuration may be performed when the number of coverage levels (CLs) and thresholds change, to adjust the number of repetitions and MCS value for each coverage level, the adjustment of the number of repetitions and the MCS configuration may be performed after the number of CL coverage levels and thresholds are determined, to adjust the number of repetitions and MCS value for each coverage level at finer granularity.

Optionally, the number of IoT terminals under respective coverage levels may be obtained based on the obtained RSRP threshold in combination with the distribution of IoT service terminals under respective RSRPs.

Optionally, the optimal random access channel (RACH) configuration parameter under respective coverage levels may be obtained based on the number of IoT terminals under respective coverage levels in combination with the access performance capacity reference obtained in operation 3.

In operation 6, the calculation and control unit may transmit the optimized radio resources and transmission parameters to the network device, and the network device performs the parameter updating and configuration.

Optionally, for operation 4, the calculation and control unit may use at least one of an artificial intelligence (AI) model and a machine learning (ML) model to predict the service distribution in the next time period, which involves using historical data (for example, data from the past year) to train the AI model, and the distribution of the IoT service capacity over time under different RSRPs in the next period is predicted based on the distribution characteristics of the most recent N (>=1) periods. For example, the predicted requirement capacity distribution under the $i^{th}$ RSRP in the next period T is as the following Equation 1:

$$\text{Capacity\_RSRP}_i(t) \ (0 < t < T) \quad \text{Equation 1}$$

Optionally, for operation 5, the calculation and control unit may form optimized wireless resources and transmission parameters based on the predicted IoT service terminal distribution, which specifically includes the following operations.

In operation 5-1, estimating the classification configuration parameters of the CL in the system, which include the RSRP threshold and the number of CLs.

Based on the predicted IoT service terminal distribution, the method of variance analysis is used to obtain the number of coverage levels and the corresponding RSRP threshold.

In operation 1, based on the AI prediction result obtained in operation 4, an Equation 2 is used to calculate the sum of capacity requirements under the $i^{th}$ RSRP within the prediction period T, Equation 2 is as follows:

$$\text{Capacity\_RSRP}_i(T) = \tfrac{2}{T}\text{Capacity\_RSRP}_i(t) \quad \text{Equation 2}$$

Then, the distribution of the required capacity within the period T is obtained.

Figure 8:
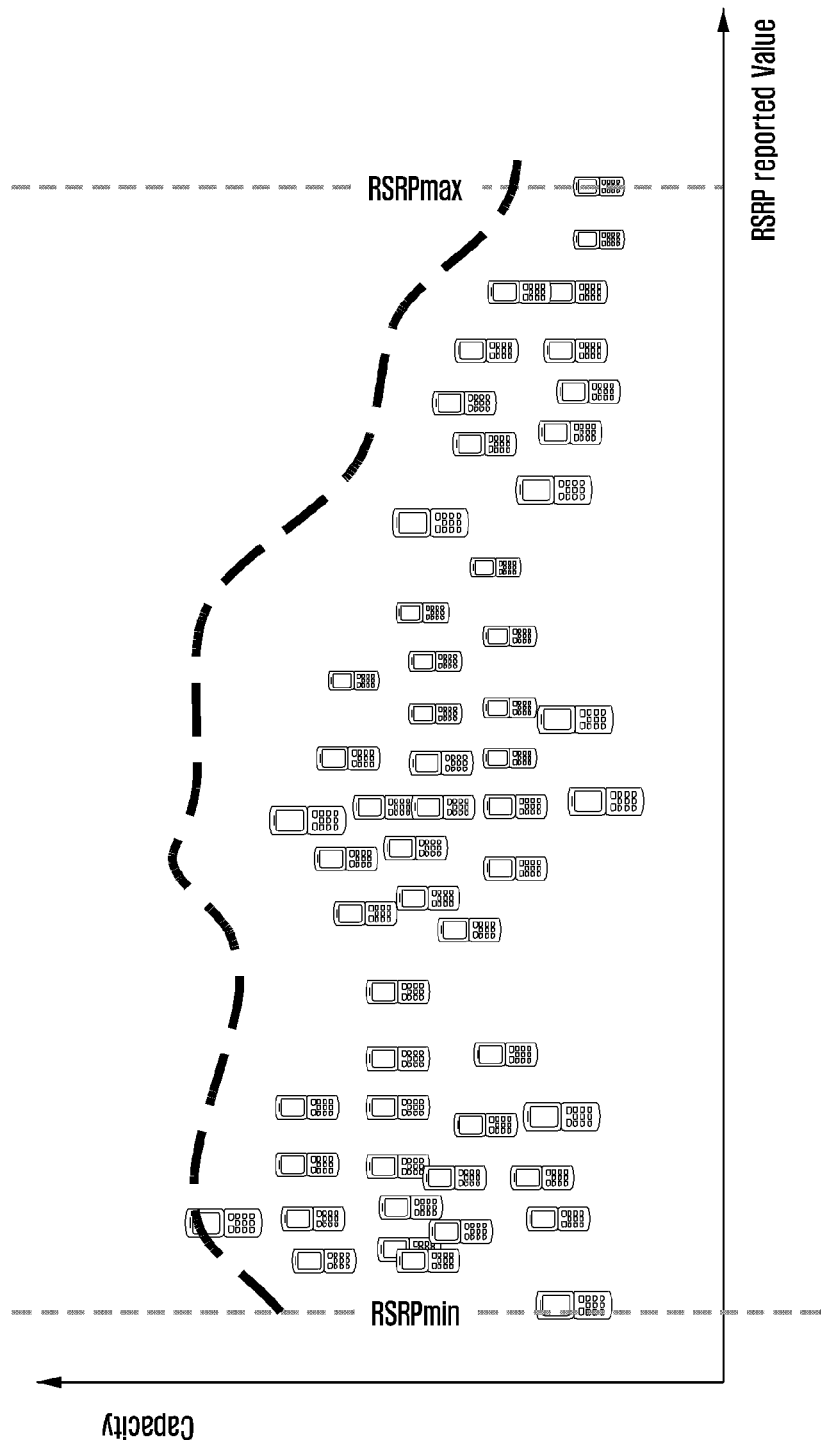
FIG. 8 is a schematic diagram of capacity distribution corresponding to reference signal receiving power (RSRP) according to an embodiment of the disclosure.

FIG. 8 is a schematic diagram of capacity distribution corresponding to RSRP according to an embodiment of the disclosure.

Referring to FIG. 8, the X-axis represents RSRP value, and the Y-axis represents the capacity corresponding to respective RSRPs within the prediction period T.

Figure 9:
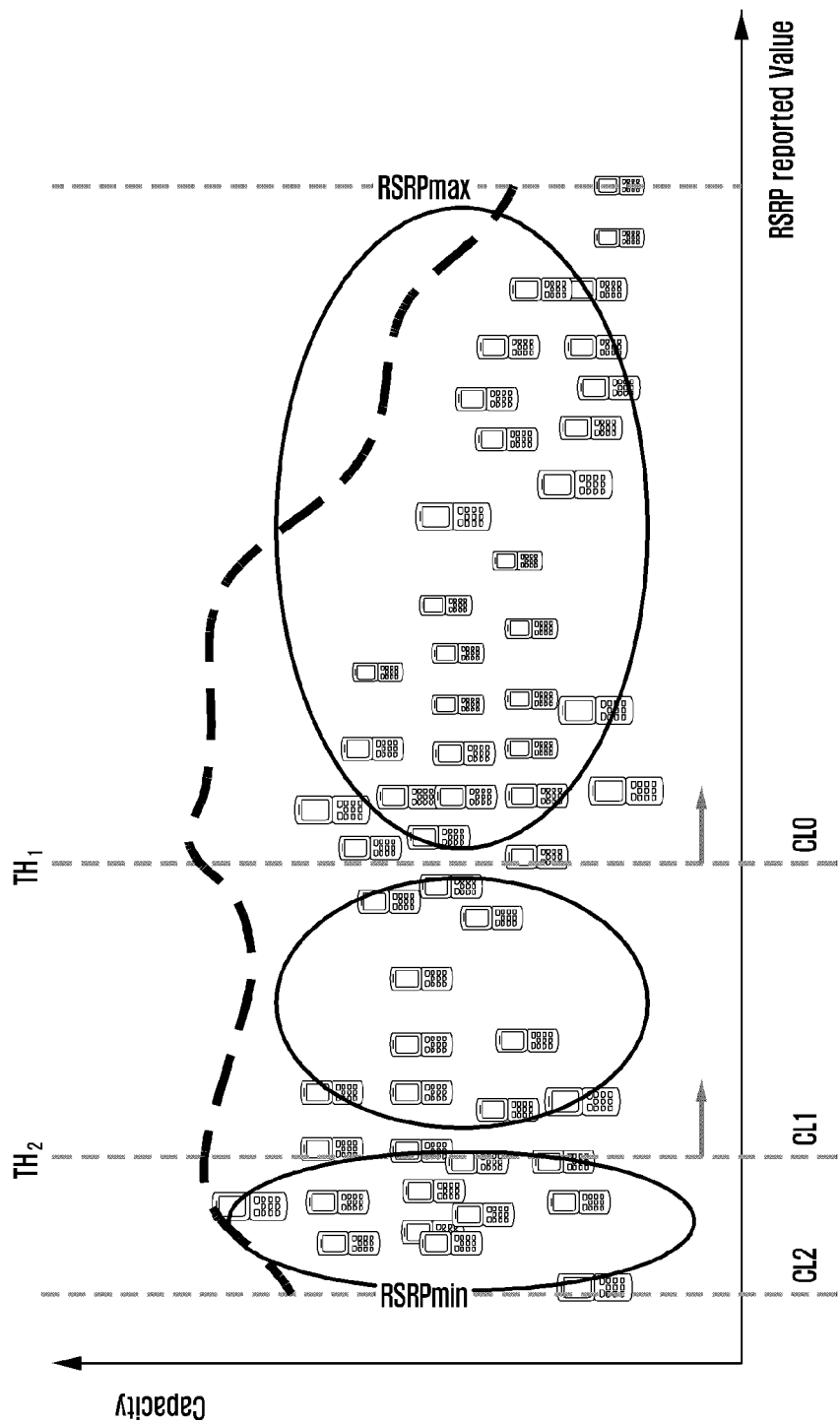
FIG. 9 is a schematic diagram of an RSRP sliding window according to an embodiment of the disclosure.

FIG. 9 is a schematic diagram of an RSRP sliding window according to an embodiment of the disclosure.

In operation 2, referring to FIG. 9, through a sliding window, the RSRP distribution range within the period T is divided into m regions. The set number of sliding windows depends on the maximum number of coverage levels supported by the system. If the maximum number of coverage levels supported by the system is M (for example, which is 3 in the current NBIOT system, 3 is taken as an example for analysis in this case), then M−1 sliding windows are used for division, and m=1~M.

Figure 10:
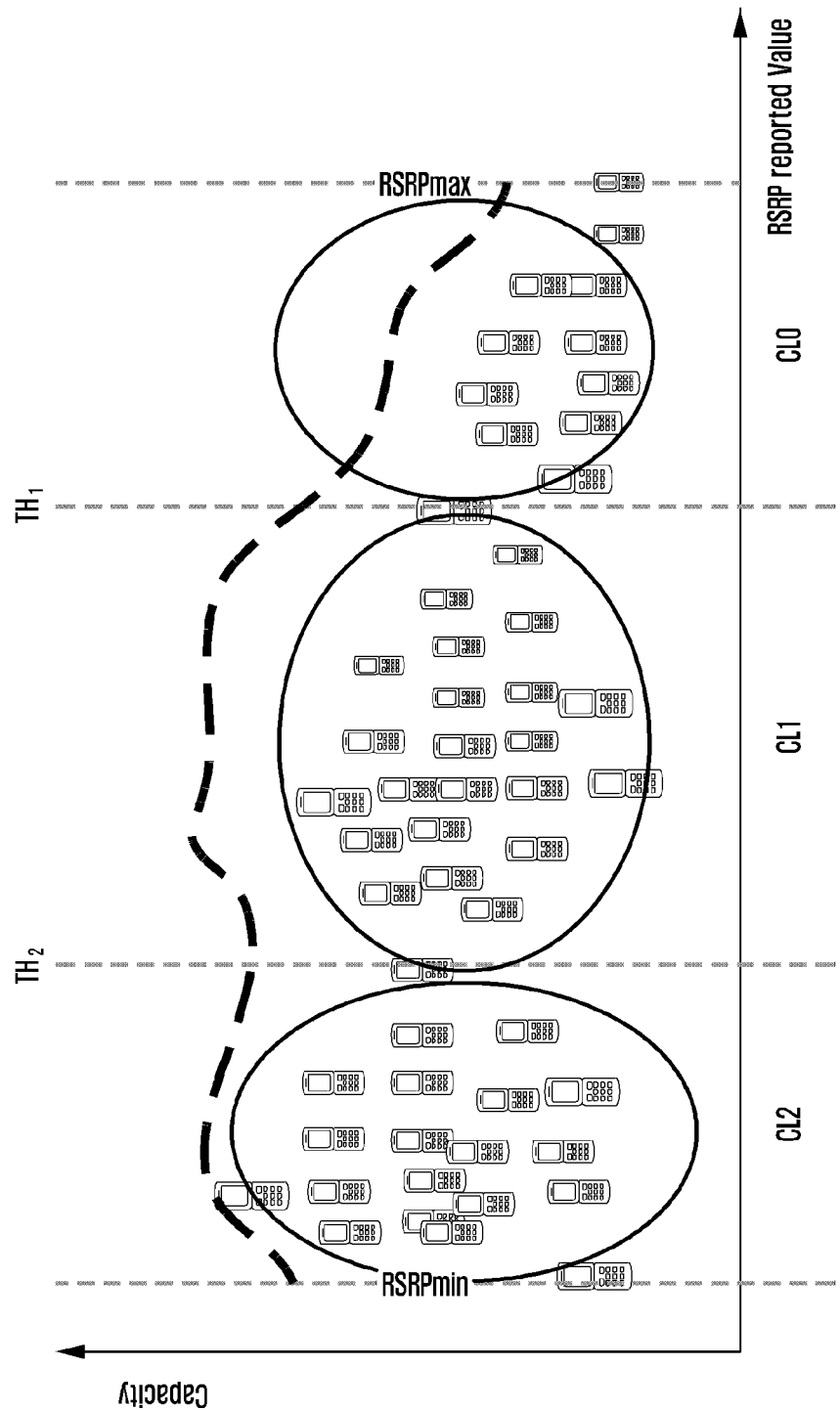
FIG. 10 is a schematic diagram of a system capacity distribution according to an embodiment of the disclosure.

FIG. 10 is a schematic diagram of a system capacity distribution according to an embodiment of the disclosure.

In operation 3, referring to FIG. 10, variance analysis is performed on the m divided regions obtained by each sliding of the sliding window in operation 2, it may perform corresponding weighting processing by taking into account the influence of capacity distribution, the weighted variance for the $i^{th}$ region is the following Equation 3:

$$\sigma^2_{CL_i} = \sum_{i=1}^{N_i} \frac{c(r_i)}{\sum_{i=1}^{N_i} c(r_i)} \left( r_i - \frac{1}{N_i}\sum_{i=1}^{N_i} r_i \right)^2 \quad \text{Equation 3}$$

Where, CLi indicates the $i^{th}$ coverage level, i=1~M, $r_i$ indicates the RSRP value of the IoT service terminal, of which the range is [RSRPmin, RSRPmax], C(r) indicates the capacity function, Ni indicates the overall value of RSRP in the $i^{th}$ coverage level, M indicates the maximum number of coverage levels supported by the system.

In operation 4, values for RSRP $TH_1 \& TH_2 \& \ldots \& TH_{M-1}$ are selected so that the discrete variance corresponding to the system is the smallest in the divided area, as shown in Equation 4, Equation 4 represents the minimum value for the sum of M weighted variances.

$$\arg\min \sum_{i=1}^{M} \sigma^2_{CL_i} \quad \text{Equation 4}$$

In operation 5, based on the values for RSRP $TH_1 \& TH_2 \& \ldots \& TH_{M-1}$ obtained in operation 4, obtaining the system configuration of the RSRP threshold.

Optionally, NB-IoT supports up to 3 coverage levels.

Figure 11A:
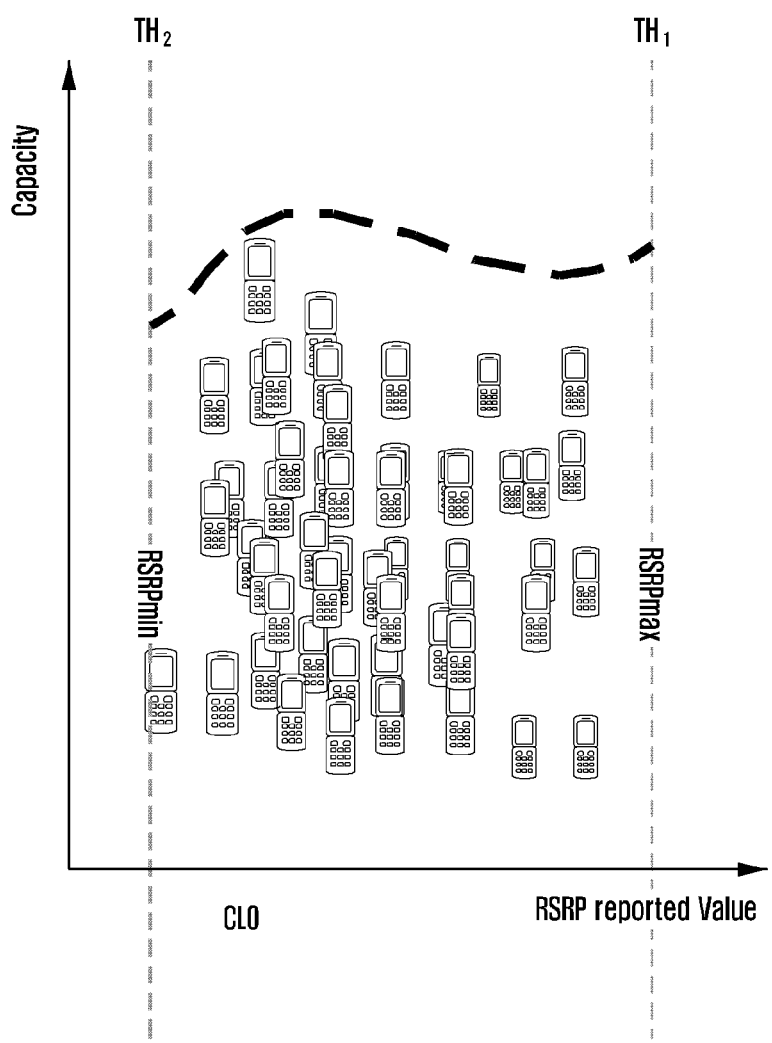
FIG. 11A is a schematic diagram of different RSRP thresholds according to an embodiment of the disclosure.
Figure 11B:
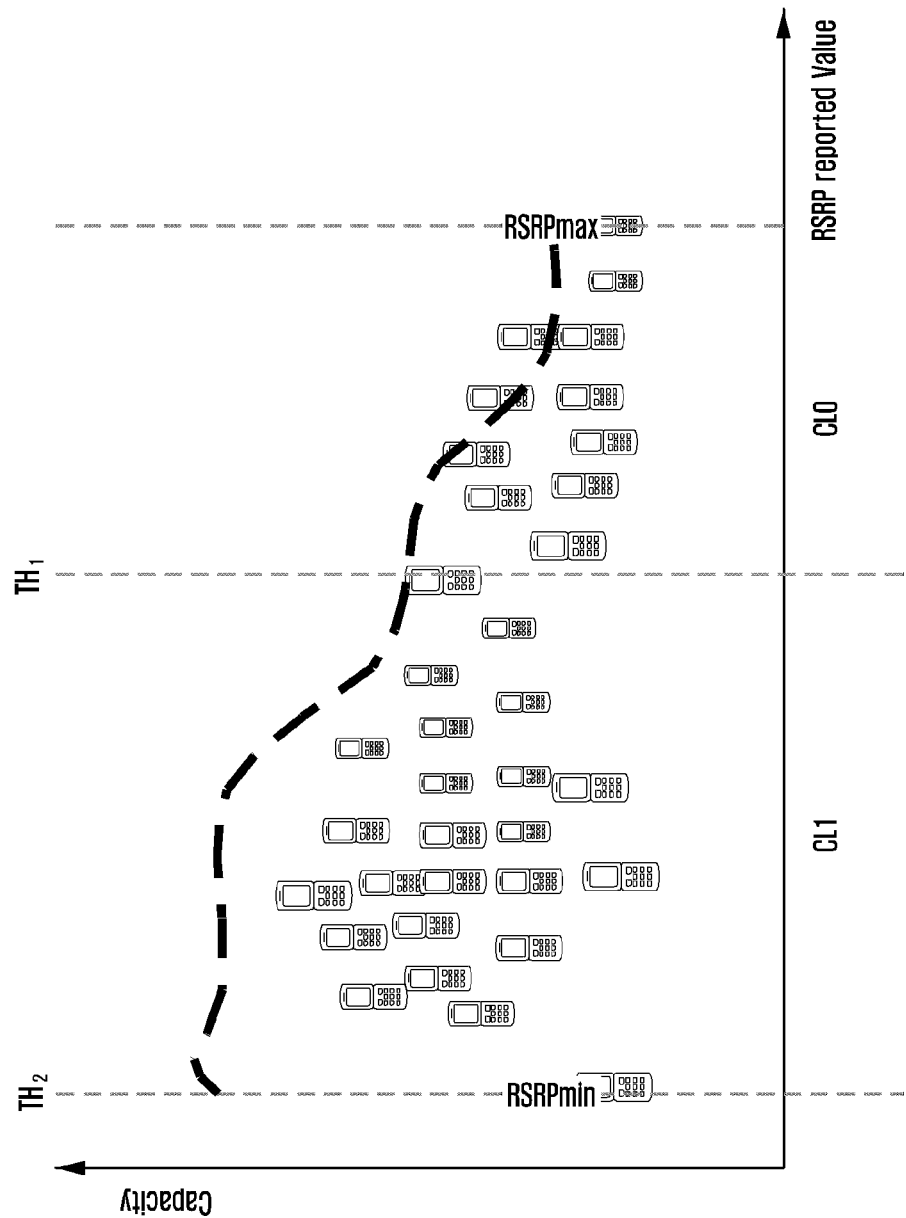
FIG. 11B is a schematic diagram of different RSRP thresholds according to an embodiment of the disclosure.
Figure 11C:
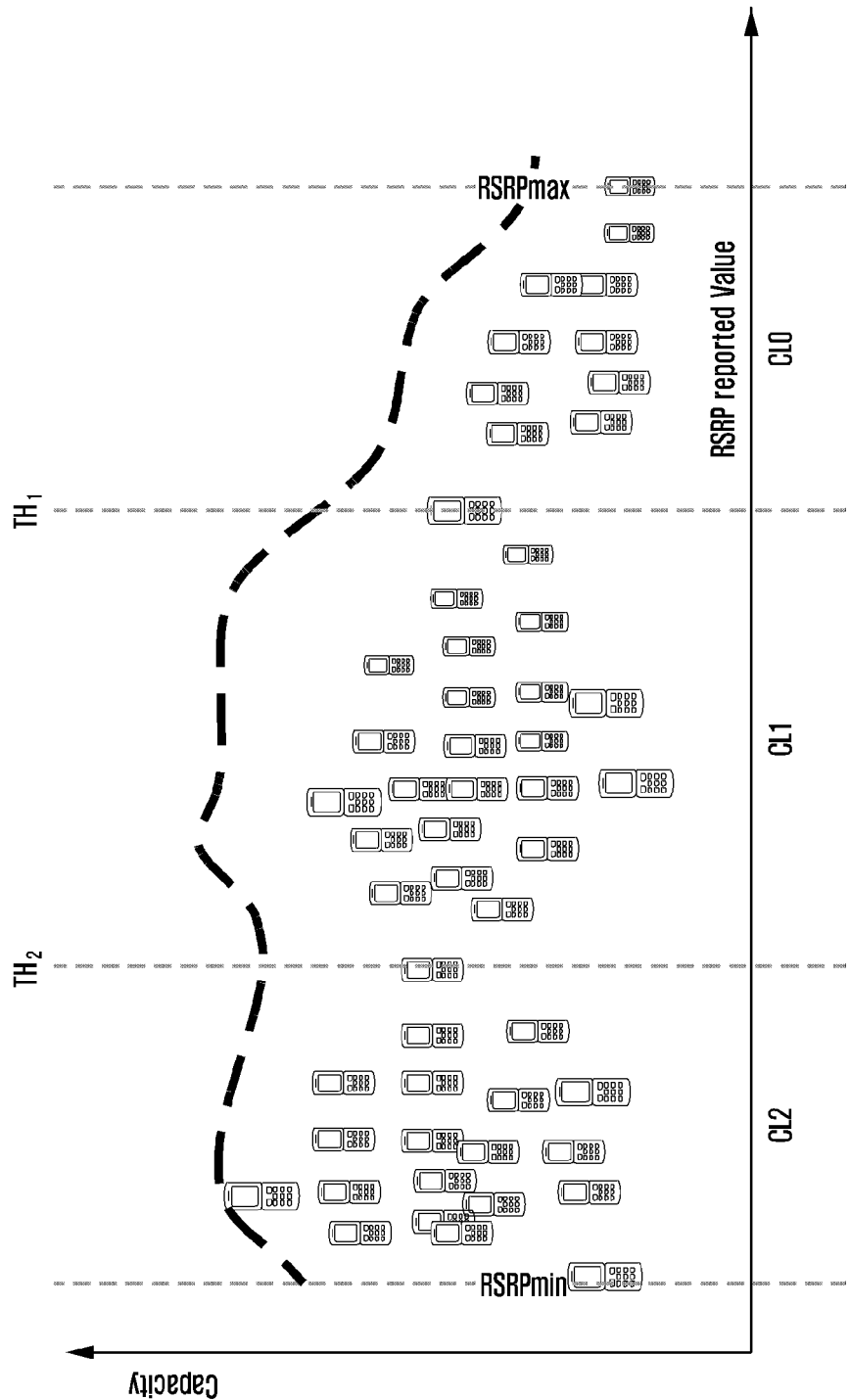
FIG. 11C is a schematic diagram of different RSRP thresholds according to an embodiment of the disclosure.

FIGS. 11A, 11B, and 11C are schematic diagrams of different RSRP thresholds according to various embodiments of the disclosure.

The RSRP $TH_1 \& TH_2$ values obtained in operation 4 may be divided into three situations as shown in FIGS. 11A, 11B, and 11C.

Referring to FIG. 11A, when $TH_1$=RSRPmax and $TH_2$=RSRPmin, the variance is smallest, then it may be considered that the RSRP distribution of all IoT terminals has the smallest variance under the condition of not dividing the range, so there is no need to configure RSRP thresholds, and the cell has only 1 coverage level.

Referring to FIG. 11B, when $TH_2$=RSRPmin, $TH_1$!=RSRPmin, the variance is smallest, then it may be determined that it only needs to configure one threshold of $TH_1$, and the cell is divided into 2 coverage levels.

Referring to FIG. 11C, when $TH_2$!=RSRPmin, $TH_1$!=$TH_2$, and TH1!=RSRPmax, the variance is smallest, then it may be determined that the thresholds are $TH_1$ and $TH_2$, and the cell is divided into 3 coverage levels.

In operation 5-2-1, calculating the configuration of data parameters under different CLs, including the number of repetitions for transmission and the MCS value.

In operation 1, estimating the distribution of the minimum RSRP value of IoT services in different CL ranges over time. Based on the RSRP threshold obtained above, the range of RSRP values in different CLs in the next period may be obtained.

Figure 12:
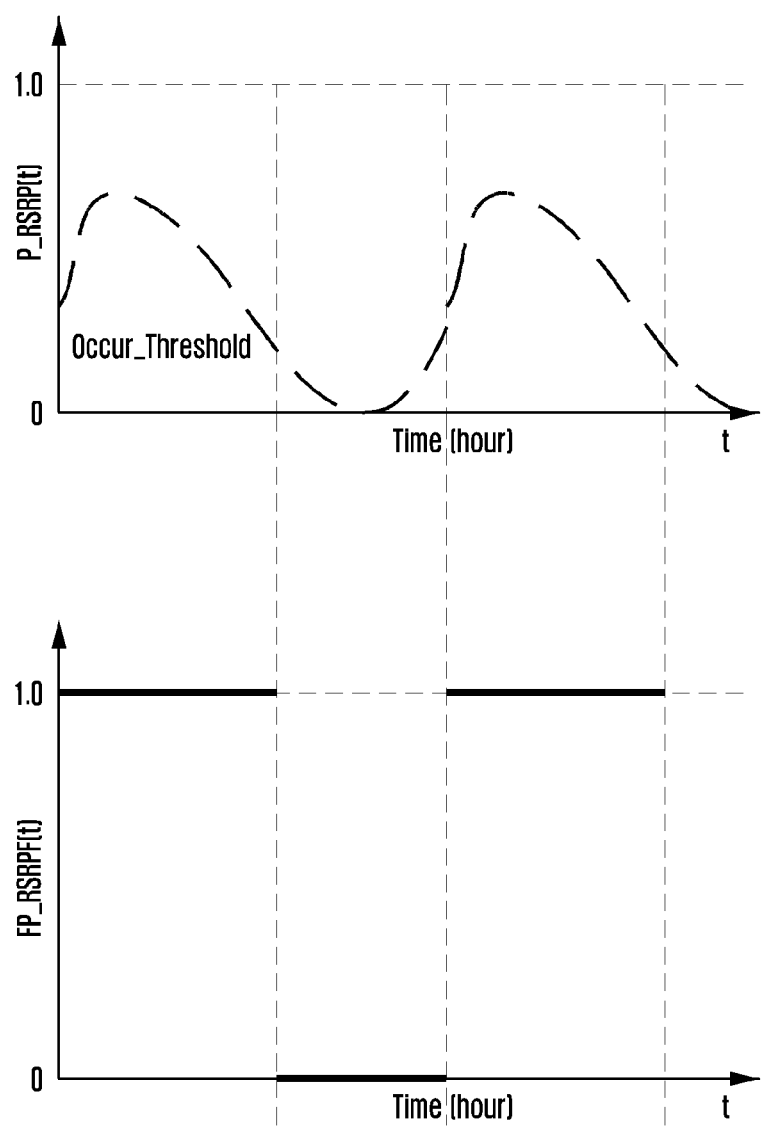
FIG. 12 is a schematic diagram of an RSRP distribution probability according to an embodiment of the disclosure.

FIG. 12 is a schematic diagram of RSRP distribution probability according to an embodiment of the disclosure.

Optionally, referring to FIG. 12, the AI-based prediction may obtain the capacity requirement distribution under respective RSRPs, as shown in Equation 1:

$$\text{Capacity\_RSRP}_i(t) \ (0 < t < T) \quad \text{Equation (1)}$$

Optionally, when Capacity_$RSRP_i(t_1)$=0 or Capacity_$RSRP_i(t_1)$<Capacity_Threshold, then at time $t_1$, the probability of IoT services occurring under RSRPi is zero (or very small), and there will be no data transmission, then the probability of corresponding RSRP existing is 0, otherwise the probability of corresponding RSRP existing is 1.

Optionally, through the analysis of all RSRPs in the CL range at each time t within the time period T, the RSRP set with the probability of all RSRPs existing in the CL range is obtained, and then at each time t in the period T, the minimum RSRP value corresponding to the system is obtained, which refers to the distribution of the minimum RSRP value in CL over time.

Figure 13:
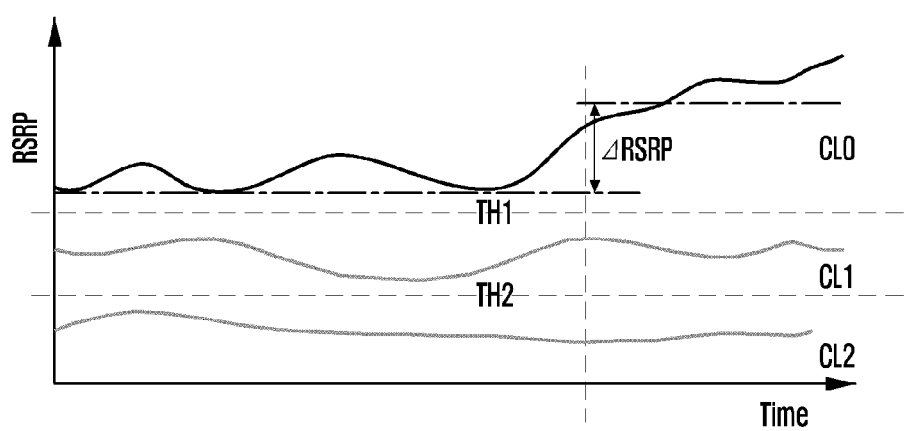
FIG. 13 is a schematic diagram of a distribution of minimum RSRP for respective coverage levels according to an embodiment of the disclosure.

FIG. 13 is a schematic diagram of a distribution of minimum RSRP for respective coverage levels according to an embodiment of the disclosure.

Optionally, referring to FIG. 13, the distribution of the minimum RSRP value under respective CLs of the system over time may be obtained.

In operation 2, analyzing the fluctuation features of the minimum RSRPmin(t) value over time in respective CLs. The calculation duration is the minimum RSRP change in the two time periods $t_1$ and $t_2$ before and after $t_{d1}$ and $t_{d2}$, respectively, as shown in Equation 5:

$$RSRP = RSRP_{min}(t_2) - RSRP_{min}(t_1) \quad \text{Equation 5}$$

In operation 3, based on RSRP, estimating the change in the number of data retransmissions and MCS configuration within the time period $t_2$. The change in the number of repetitions is defined as Rep, and the change in code modulation is defined as ΔMCS.

Figure 14:
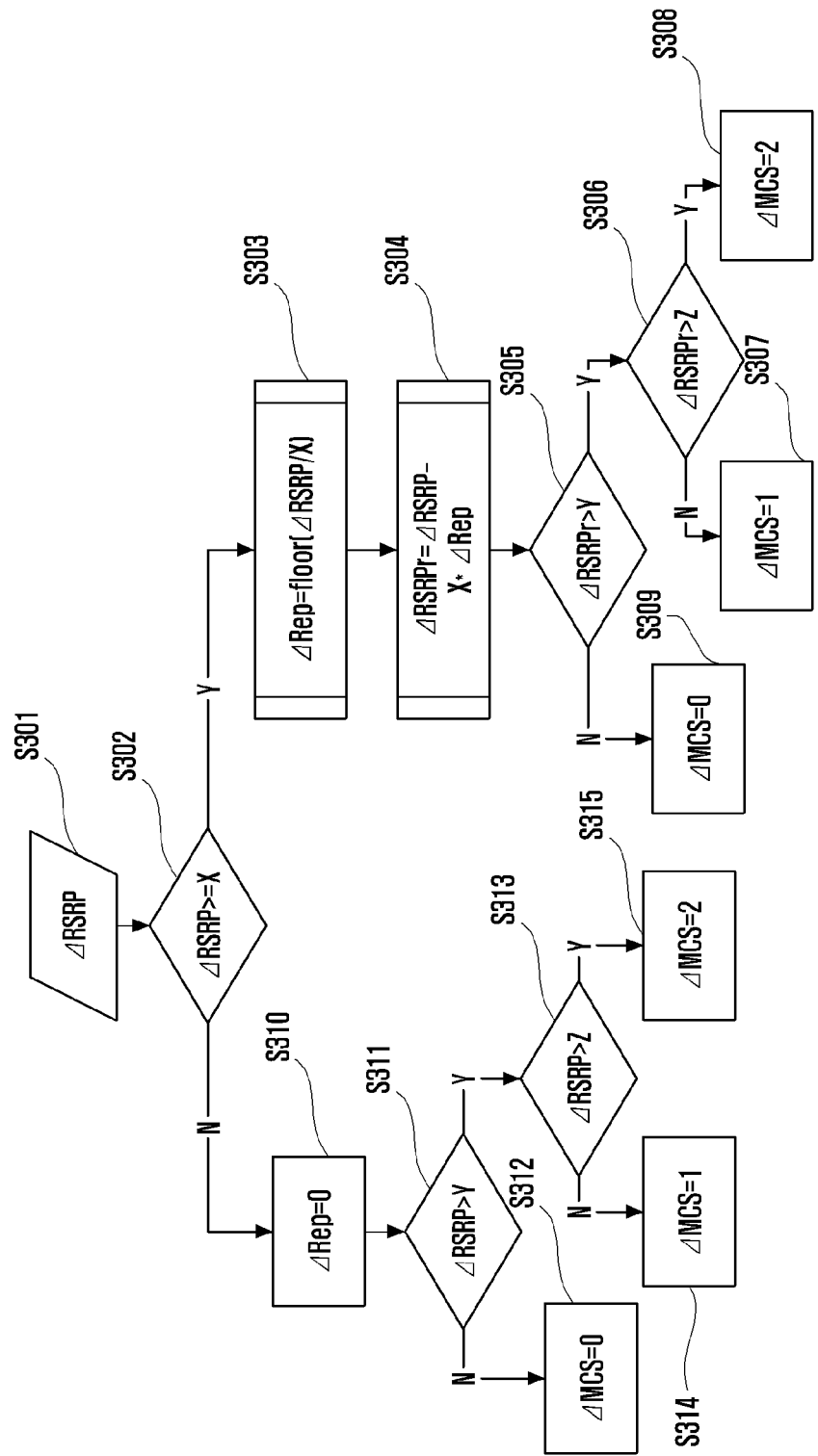
FIG. 14 is a schematic diagram of calculating a number of repetitions for transmission and an MCS based on an RSRP according to an embodiment of the disclosure.

FIG. 14 is a schematic diagram of calculating a number of repetitions for transmission and an MCS based on RSRP according to an embodiment of the disclosure.

Referring to FIG. 14, a possible related algorithm is shown, where X, Y, and Z values depend on a performance of a device and can be pre-configured.

In operation S301, obtaining RSRP, and the RSRP obtained in operation S301 is rounded to obtain an integer difference.

In operation S302, determining whether RSRP is not less than XdB, when ΔRSRP is not less than XdB, the change in the number of repetitions for transmission is as follows:

In operation S303, ΔRep=floor(ΔRSRP/X).

After adjusting the number of repetitions, the difference of remaining RSRPs is as follows:

In operation S304, ΔRSRPr=ΔRSRP−X*ΔRep.

In operation S305, determining whether ΔRSRPr is greater than YdB, when ΔRSRPr is less than YdB, then operation S309, MCS configuration will not be changed, ΔMCS=0, when ΔRSRPr is greater than YdB, then S306.

In operation S306, determining whether ΔRSRPr is greater than ZdB, when ΔRSRPr is greater than YdB but less than ZdB, then operation S307, MCS configuration change is ΔMCS=1, when ΔRSRPr is greater than ZdB, then operation S308, MCS configuration change is ΔMCS=2.

In operation S302, determining whether RSRP is not less than XdB, if ΔRSRP is less than XdB, the number of repetitions for transmission does not change, operation S310 ΔRep=0, MCS configuration change is:

In operation S311, determining whether ΔRSRPr is greater than YdB, when ΔRSRP is less than YdB, then S312, MCS configuration will not be changed, ΔMCS=0.

In operation S313, determining whether ΔRSRPr is greater than ZdB, when ΔRSRP is greater than YdB but less than ZdB, then S314, MCS configuration change is ΔMCS=1, when ΔRSRP is greater than ZdB, then operation S315, MCS configuration change is ΔMCS=2.

In operation 4, based on the number of data retransmissions $RepN_{um1}$ and $MCS_1$ in the time period $t_1$, configuring the number of data retransmissions $RepN_{um2}$ and $MCS_2$ in the time period $t_2$, as shown in Equations 6 and 7:

$$RepNum_2 = RepNum_1 + Rep \quad \text{Equation 6}$$

$$MCS_2 = MCS_1 + MCS \quad \text{Equation 7}$$

In operation 5-2-2, calculating the parameter configuration of RACH under different CLs, including the number of repetitions for transmission of random access preamble, the number of subcarriers, and the period.

In operation 1, estimating the time-varying distribution of IoT service capacity requirements over time in different CL ranges.

First, according to the RSRP threshold obtained above, the range of RSRP values in different CLs in the next period may be obtained.

The required capacity distribution under respective RSRPs obtained based on AI prediction is shown in Equation 1:

$$\text{Capacity\_RSRP}_i(t) \ (0 < t < T) \quad \text{Equation 1}$$

In the period T, the distribution characteristics of the total required capacity of the IoT service under CLx over time is shown in Equation 8:

$$\text{Capacity}_{CLx\_}RSRP(t) = \Sigma_i \text{Capacity\_RSRP}_i(t) \quad \text{Equation 8}$$

Figure 15:
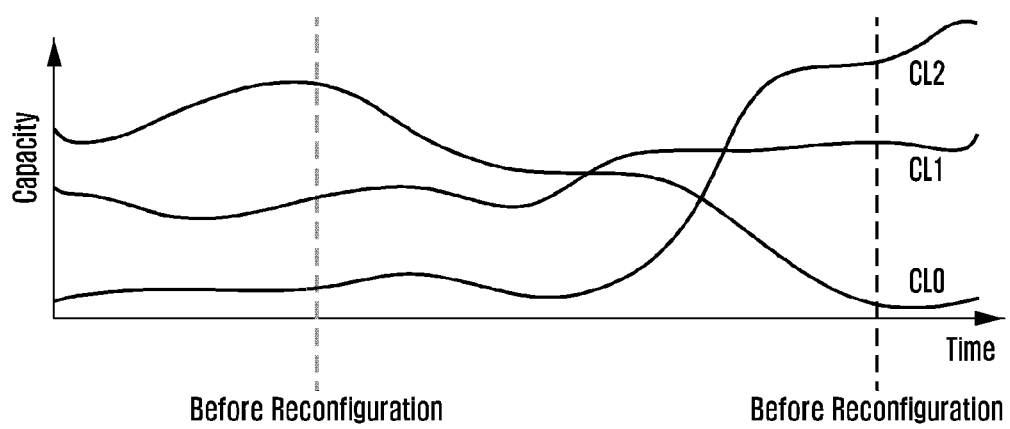
FIG. 15 is a schematic diagram of capacity time-varying distribution of respective CLs according to an embodiment of the disclosure.

FIG. 15 is a schematic diagram of capacity time-varying distribution of respective CLs according to an embodiment of the disclosure.

Referring to FIG. 15, the distribution of the capacity requirements of IoT services under respective CLs of a system over time may be obtained.

In operation 2, analyzing the fluctuation features of IoT capacity requirement over time in each CL. The calculation duration is the change of the capacity requirement in the two time periods $t_1$ and $t_2$ before and after $t_{d1}$ and $t_{d2}$, respectively, as shown in Equation 9:

$$\Delta\text{Capacity} = \text{Capacity}_{CLx\_RSRP(t_2)} - \text{Capacity}_{CLx\_RSRP(t_1)} \quad \text{Equation 9}$$

In operation 3, determining whether to reconfigure RACH resources of CL based on Δ Capacity. If Δ Capacity is greater than the threshold Δ Capacity_Threshold, it is considered that the current IoT capacity increases, and the existing RACH resources cannot meet the access requirements, and RACH resources need to be reconfigured, otherwise, the RACH resource configuration does not change.

In operation 4, determining the resource configuration of RACH in CL.

Based on the previously obtained capacity performance reference under different RACH configurations, it may estimate the RACH resource configuration that meets the CapacityCLx_RSRP($t_2$) capacity requirement in the time period t2, which includes the number of repetitions, the period, and the number of subcarriers.

The capacity performance reference gives the system's access success rate or system's access capacity value under different RACH resource configurations (the number of repetitions, period, the number of subcarriers) and the number of users with access requirements.

According to the estimated required capacity Capacity-CLx_RSRP(t2), the configuration that allows the highest system access success rate under the required capacity is selected from the capacity references as the RACH configuration in the time period $t_2$.

Alternative Embodiment 2

Figure 16A:
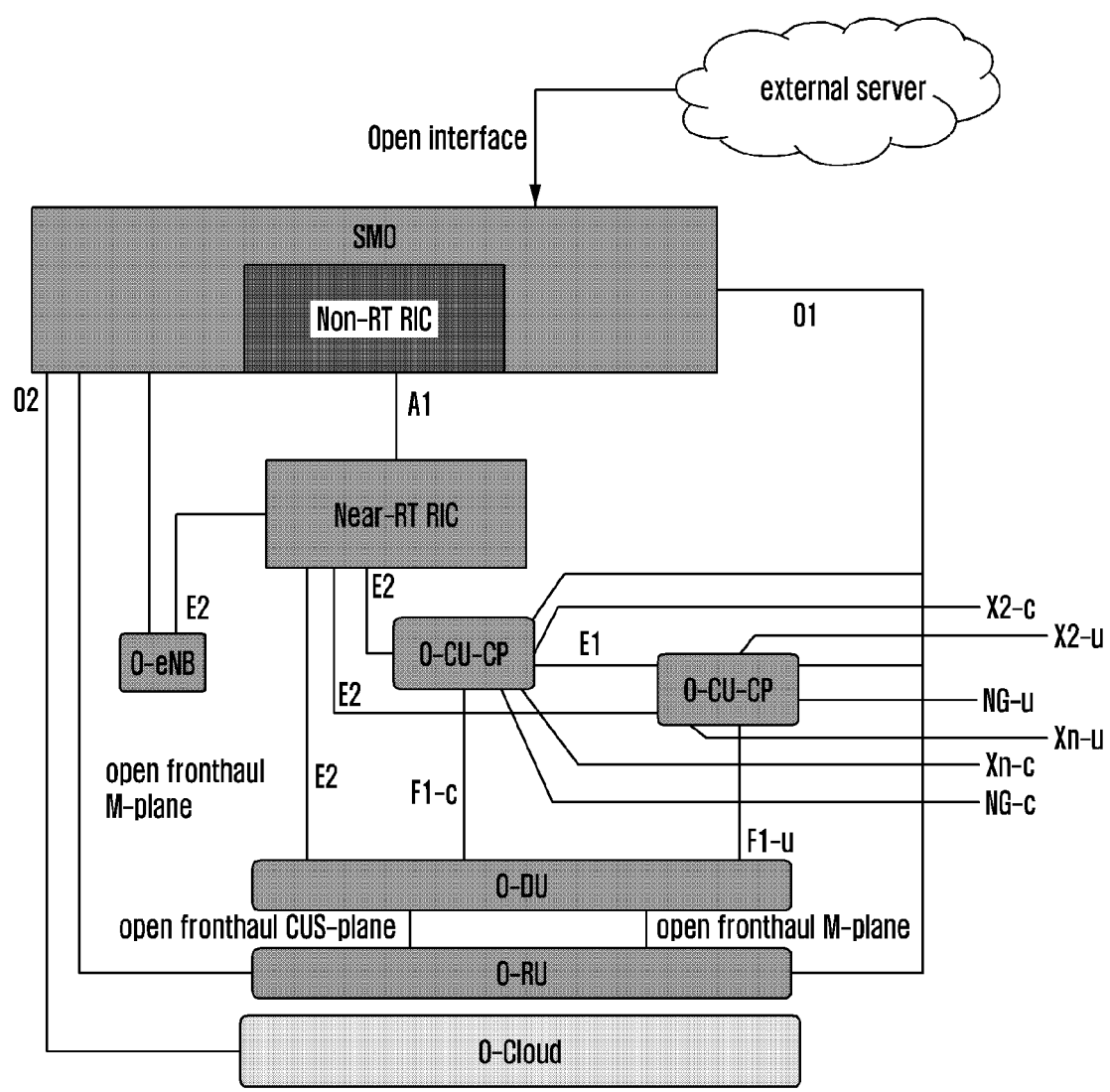
FIG. 16A is a schematic diagram of a system framework corresponding to information processing according to an embodiment of the disclosure.
Figure 16B:
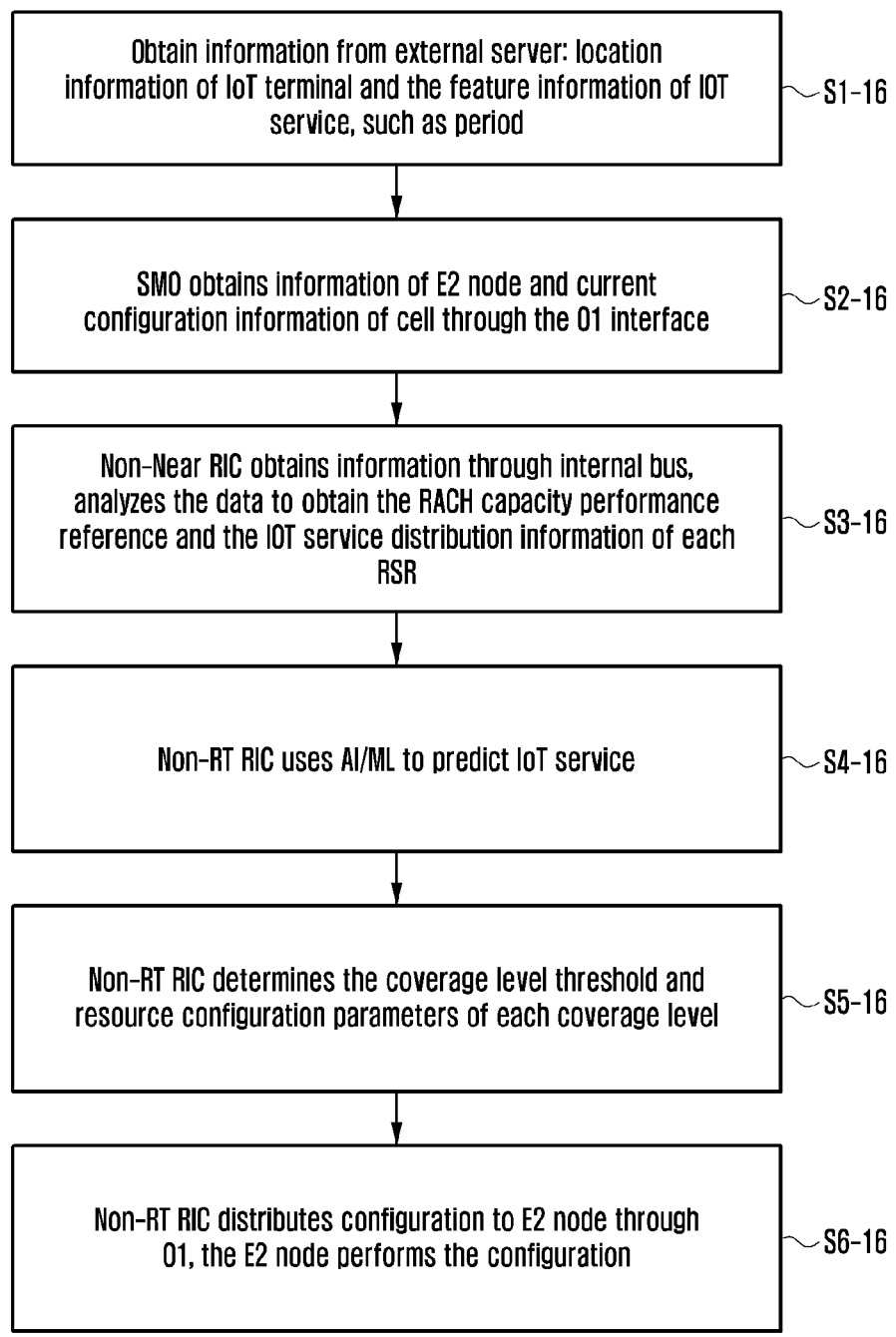
FIG. 16B is a schematic diagram of a principle flow of information processing according to an embodiment of the disclosure.

FIGS. 16A and 16B show a principle flow of information processing under an O-RAN system and modules and interfaces in the corresponding O-RAN system framework according to various embodiments of the disclosure.

Referring to FIGS. 16A and 16B, in operation S1-16, an SMO module collects the location information of a terminal and the feature information of an IoT service (such as the periodic characteristic of the service) from an application server. The above information is used to realize the estimation and prediction of IoT coverage characteristics and service feature in the cell.

The location of IoT users is mostly static (for example, meter reading service) or the running trajectory is regular (for example, high-voltage power line inspection service). Operators may obtain relevant information from vertical industries and store it in the operation server in advance.

IoT services generally have periodic regularities. For example, the humidity detection service detects and reports the humidity indicators of the surrounding environment every fixed time interval. Operators can also store the relevant requirement information of vertical industries in the operation server in advance.

SMO may obtain the configuration information about the terminals and services of vertical industries (such as location and periodicity of service occurrence) stored in the server in advance from the running server through the public interface.

In operation S2-16, the SMO receives information from the O-eNB or O-DU through the O1 interface. The information may include the measurements about RSRP and BSR reported by the IoT terminal, and information about the base station measurement statistics and configuration, the base station measurement statistics and configuration information may include the number of Msg1s received in each CL, the number of Msg4s received in each CL, and the UE downlink BO size, the current cell configuration information may include RACH configuration information (number of subcarrier resources for each CL, the number of repetitions of the preamble code, period), the MCS value of the uplink transmission of each CL, the number of repetitions of the uplink transmission of each CL, the number of repetitions for transmission of the Ack/NACK for Msg4 of each CL, the number of repetitions for transmission of Ack/NACK for the PDSCH of each CL, the MCS value of the downlink transmission of each CL, the number of repetitions of the downlink transmission of each CL, the number of repetitions of the CSS transmission of each CL, the number of repetitions of the USS transmission of each CL, and the RSRP threshold corresponding to the CL in the cell.

In operation S3-16, the SMO transmits the received measurements to Non-RT RIC via the internal bus. The Non-RT RIC analyzes the measurement and statistical results, which involves using user BO and vertical industry preset period or time settings to obtain the periodic characteristics of IoT services under the coverage of respective RSRPs, involves using the number of Msg1 and Msg4 received in each CL and the corresponding RACH configuration information to analyze the capacity performance reference under different RACH configurations. This capacity reference gives different RACH configurations (the number of repetitions, period, the number of subcarriers), the access success rate or the access capacity value of the system under any number of users with access requirements.

In operation S4-16, the Non-RT RIC uses AI/ML to predict the service distribution in the next time period, which involves Non-RT RIC using historical data (such as the data of the past year) to train the AI model to obtain an AI model suitable for IoT service in a cell. It involves using the trained AI model in combining with the service period distribution characteristics obtained in operation S3-16 and the actual measurement data in the last N (>=1) periods to predict the distribution of the IoT service capacity over time under different RSRPs in the next period.

In operation S5-16, the Non-RT RIC dynamically configures cell radio resources and transmission parameters based on the distribution characteristics of IoT services in the cell, which includes clustering IoT terminals in the same cell by using the capacity weighted variance analysis method, which is realized particularly through estimating and setting different RSRP thresholds. Further, for IoT users in the same cluster, the fluctuation features of the coverage characteristics over time are estimated, and the number of repetitions required for data transmission and the change of MCS are dynamically estimated based on the fluctuation features, so as to obtain the number of repetitions of data transmission and the optimal configuration of MCS for the same type of IoT users in different time periods. On the other hand, in order to ensure the access performance of the same type of IoT users, it may estimate the capacity requirement distribution of the same type of user IoT services in different time periods, and use the capacity performance reference under different RACH configurations obtained in operation S3-16 to estimate the best RACH resource and transmission parameter configuration in different time periods (including the number of RACH subcarriers, period, and the number of repetitions).

In operation S6-16, it may transmit the resource and transmission parameter configuration obtained in operation S5-16 to SMO through the internal bus interface Non-RT RIC. Next, SMO transmits the relevant parameter configuration to the O-eNB or O-DU by using the O1 interface. Finally, the O-eNB or O-DU completes the update of resource configuration parameters.

Figure 17:
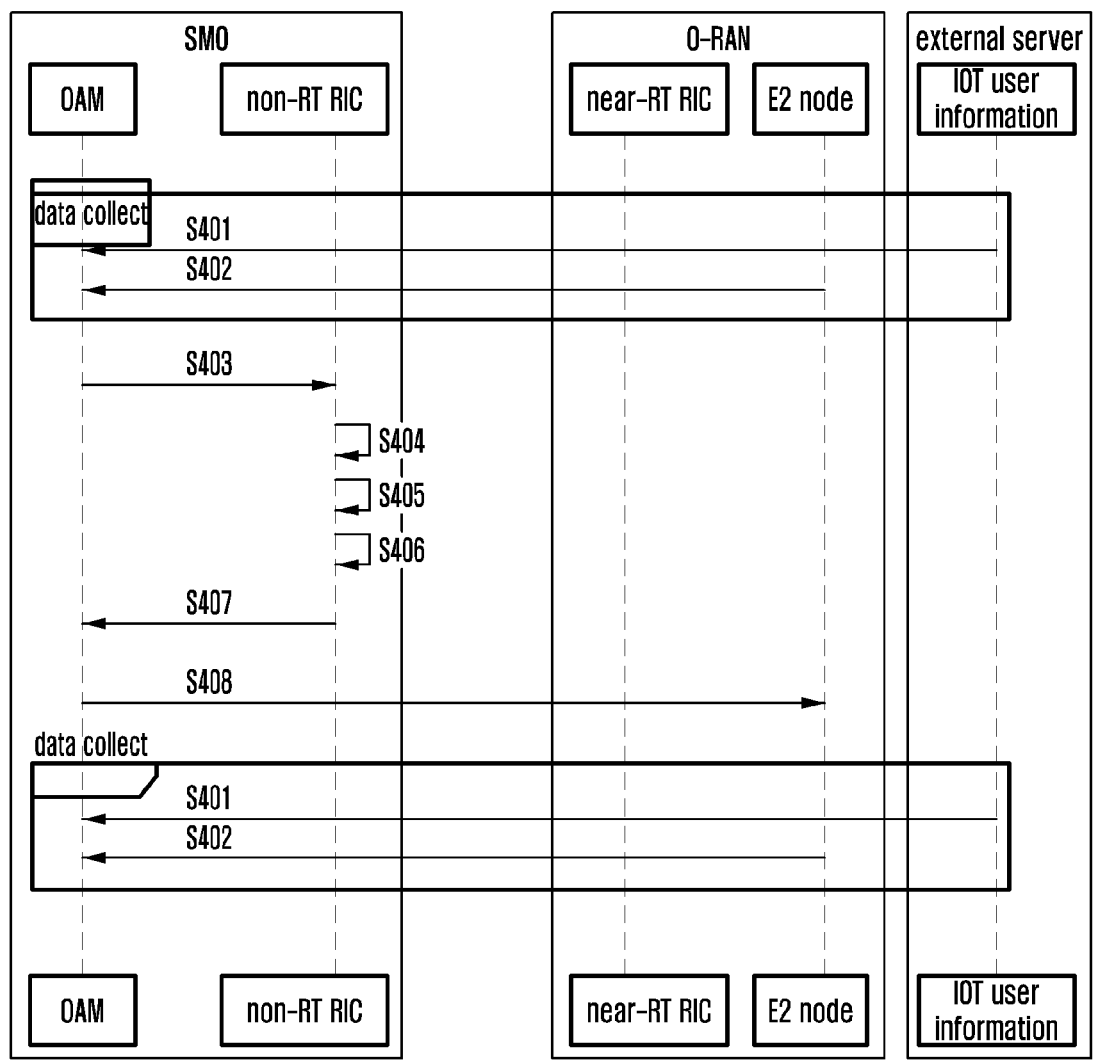
FIG. 17 is a schematic diagram of an implementation flow of information processing according to an embodiment of the disclosure.

FIG. 17 is a schematic diagram of an implementation flow of information processing according to an embodiment of the disclosure.

Referring to FIG. 17, optionally, a principle flow of information processing is shown.

In operation S401, the OAM receives data information transmitted by an external server.

Optionally, the data information may include location information of the IoT terminal, and feature information of the IoT service, such as the time and period of the service occurring.

In operation S402, the OAM receives measurement and configuration information from the E2 node through the O1 interface, which includes RSRP measurement value, data size in the terminal buffer, RACH-related configuration and performance information, data and control channel and other cell configuration information.

In operation S403, the OAM extracts and transmits the data to the Non-RT RIC.

In operation S404, the Non-RT RIC analyzes and obtains the coverage characteristics, period characteristics and capacity performance of the IoT service.

In operation S405, the Non-RT RIC trains the AI/ML model and predicts the RSRP-level capacity distribution.

In operation S406, the Non-RT RIC estimates and determines the service coverage level and transmission and resource configuration parameters.

In operation S407, the Non-RT RIC transmits the configuration information of the IoT service to the OAM through the internal bus.

In operation S408, the OAM delivers the configuration information of the cell IoT service to the E2 node through the O1 interface.

Alternative Embodiment 3

Figure 18A:
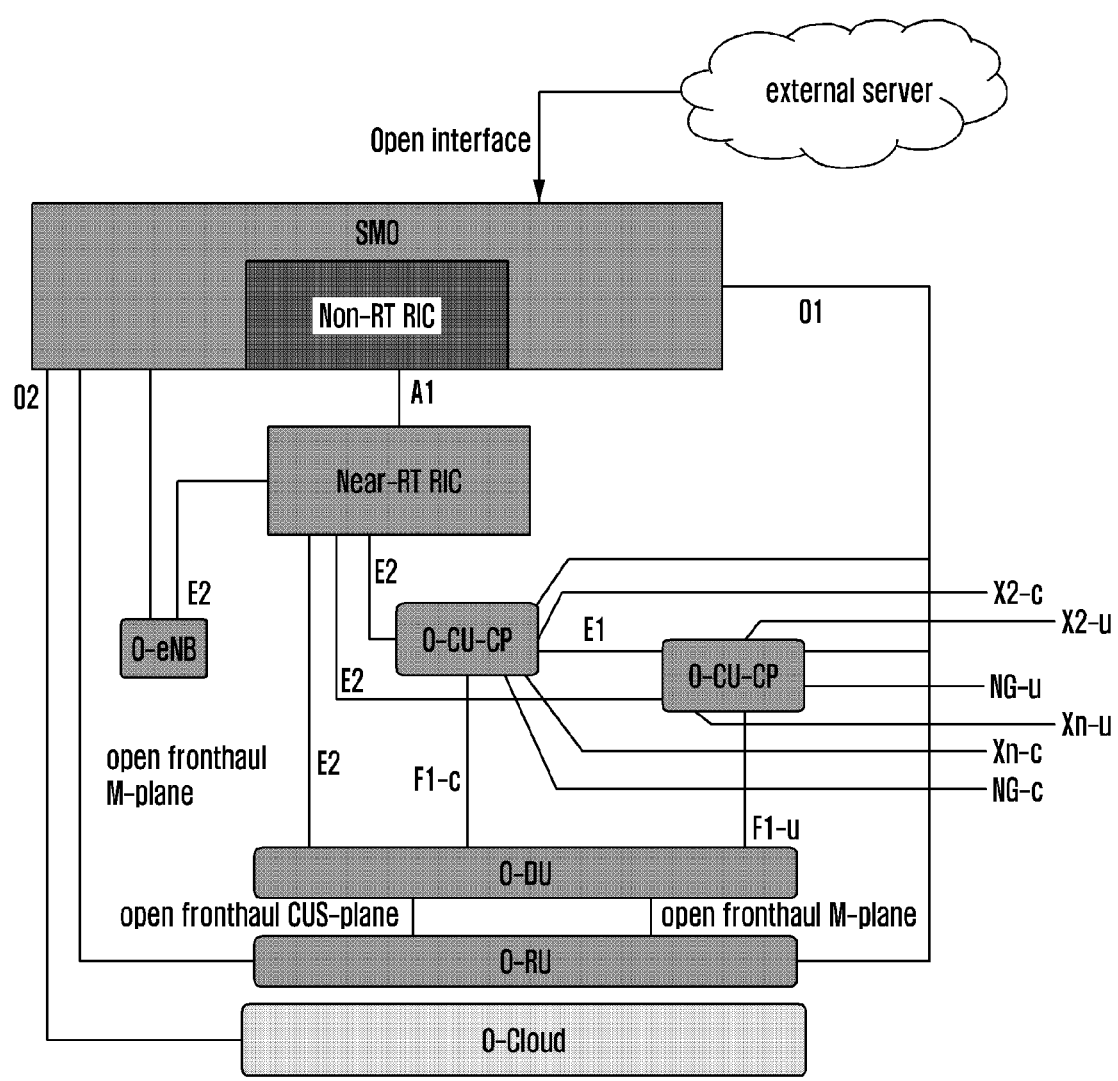
FIG. 18A is a schematic diagram of a system framework corresponding to information processing according to an embodiment of the disclosure.
Figure 18B:
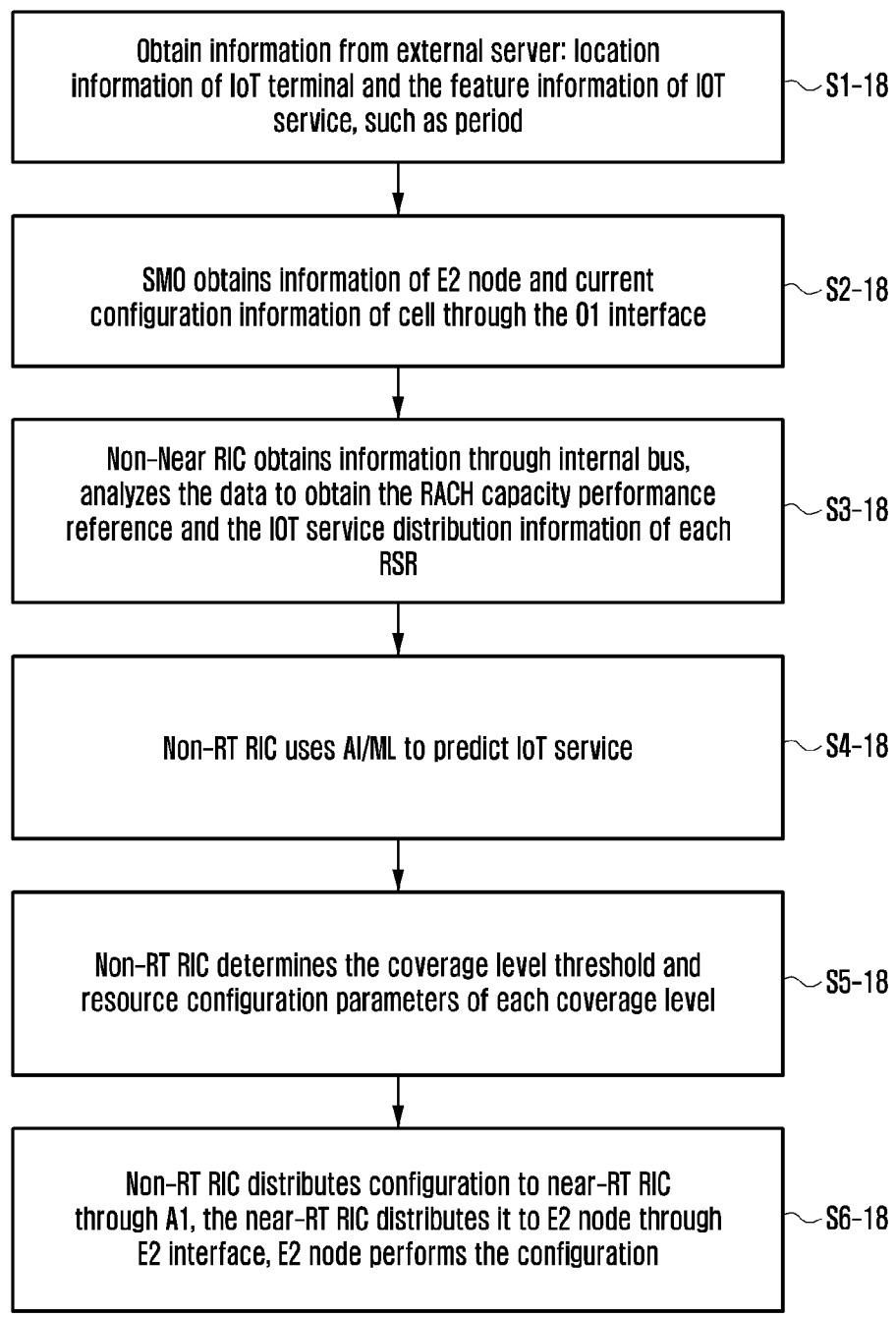
FIG. 18B is a schematic diagram of a principle flow of information processing according to an embodiment of the disclosure.

FIGS. 18A and 18B show a principle flow of information processing under an O-RAN system and modules and interfaces in a corresponding O-RAN system framework according to various embodiments of the disclosure. Compared with the embodiment 2, the embodiment 3 has different transmission interface for the configuration parameters.

Referring to FIGS. 18A and 18B, operations S1-18, S2-18, S3-18, S4-18, and S5-18 are same as the corresponding operations S1-16, S2-16, S3-16, S4-16, and S5-16 in the embodiment 2.

In operation S6-18, it may transmit the resource and transmission parameter configuration results obtained by Non-RT RIC in operation S5-18 to Near-RT RIC through the AI interface, then, it is transmitted to the O-eNB or O-DU by using the E2 interface. Finally, the O-eNB or O-DU completes the update of resource configuration parameters.

Figure 19:
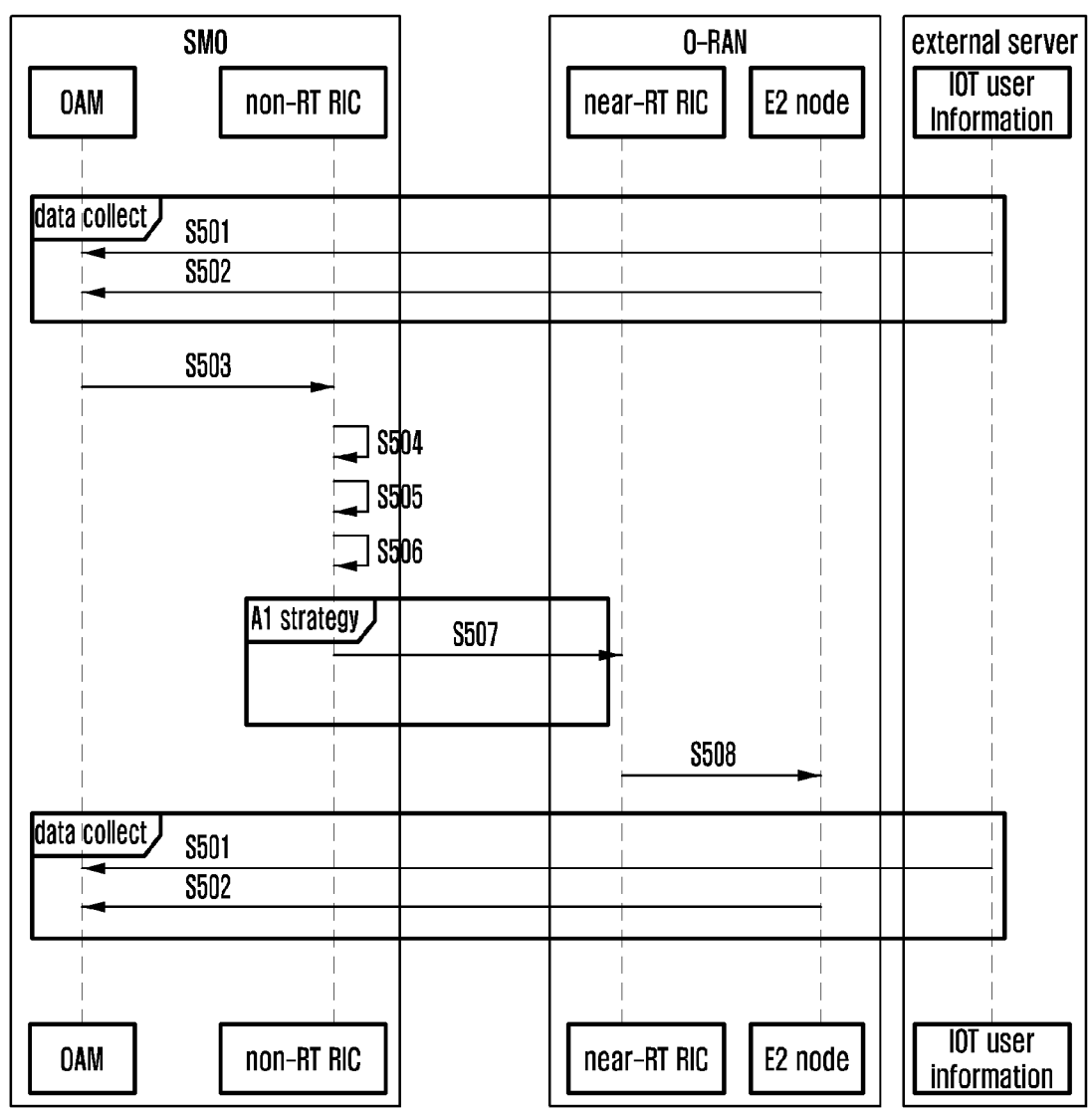
FIG. 19 is a schematic diagram of an implementation flow of information processing according to an embodiment of the disclosure.

FIG. 19 is a schematic diagram of an implementation flow of information processing according to an embodiment of the disclosure.

Referring to FIG. 19, optionally, a principle flow of information processing is shown.

In operation S501, the OAM receives data information transmitted by an external server.

Optionally, the data information may include location information of the IoT terminal, and feature information of the IoT service, such as the time and period of the service occurrence.

In operation S502, the OAM receives measurement and configuration information from the E2 node through the O1 interface, which includes RSRP measurement value, data size in the terminal buffer, RACH-related configuration and performance information, data and control channel and other cell configuration information.

In operation S503, the OAM extracts and transmits the data to Non-RT RIC.

In operation S504, the Non-RT RIC analyzes and obtains the coverage characteristics, period characteristics and capacity performance of IoT services.

In operation S505, the Non-RT RIC trains the AI/ML model and predicts the RSRP-level capacity distribution.

In operation S506, the Non-RT RIC estimates and determines the service coverage level and transmission and resource configuration parameters.

In operation S507, the Non-RT RIC delivers the configuration of the cell IoT service to the Near-RT RIC through the A1 interface.

In operation S508, the Near-RT RIC delivers the configuration information of the cell IoT service through the E2 interface.

Alternative Embodiment 4

Figure 20A:
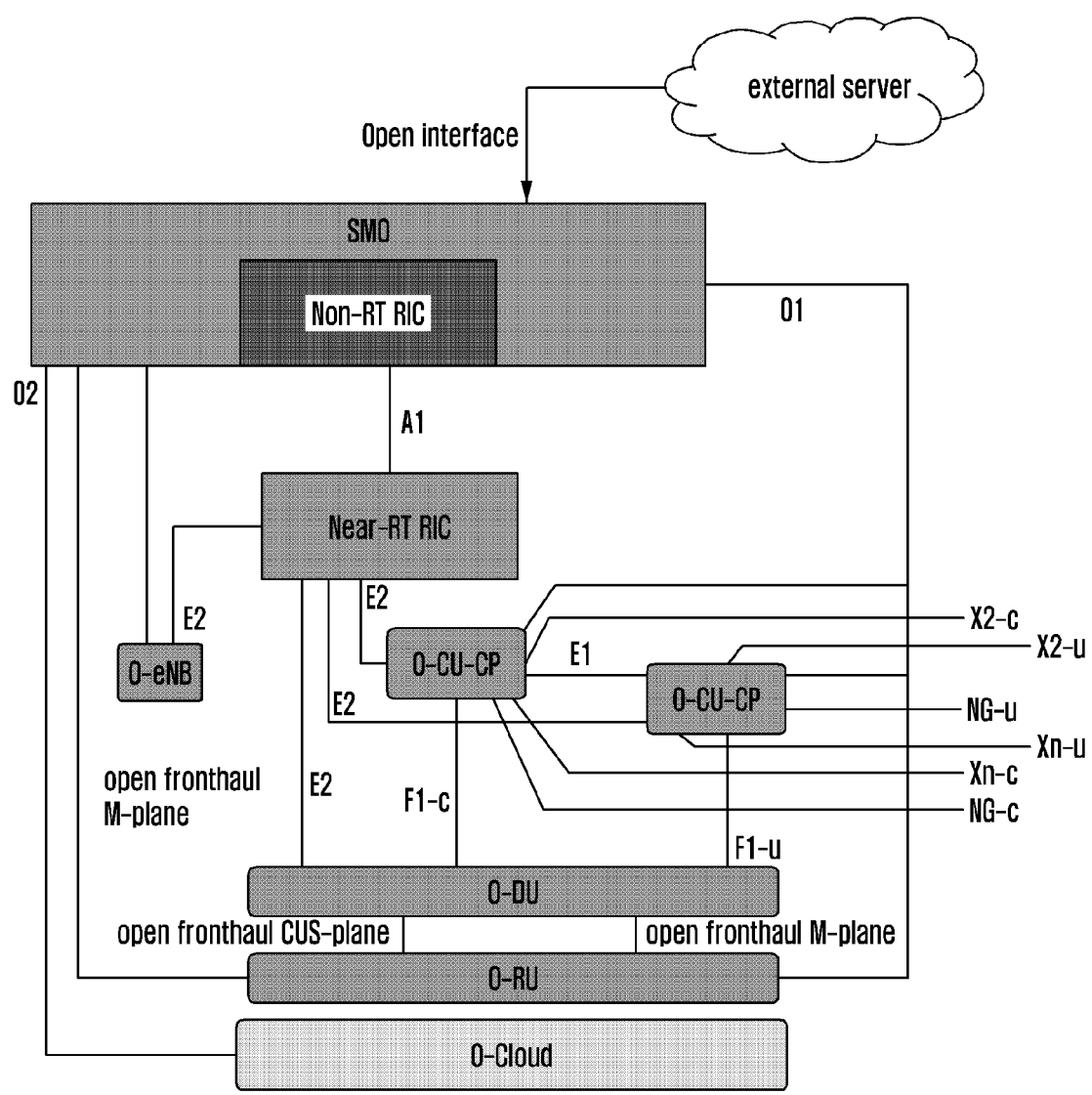
FIG. 20A is a schematic diagram of a system framework corresponding to information processing according to an embodiment of the disclosure.
Figure 20B:
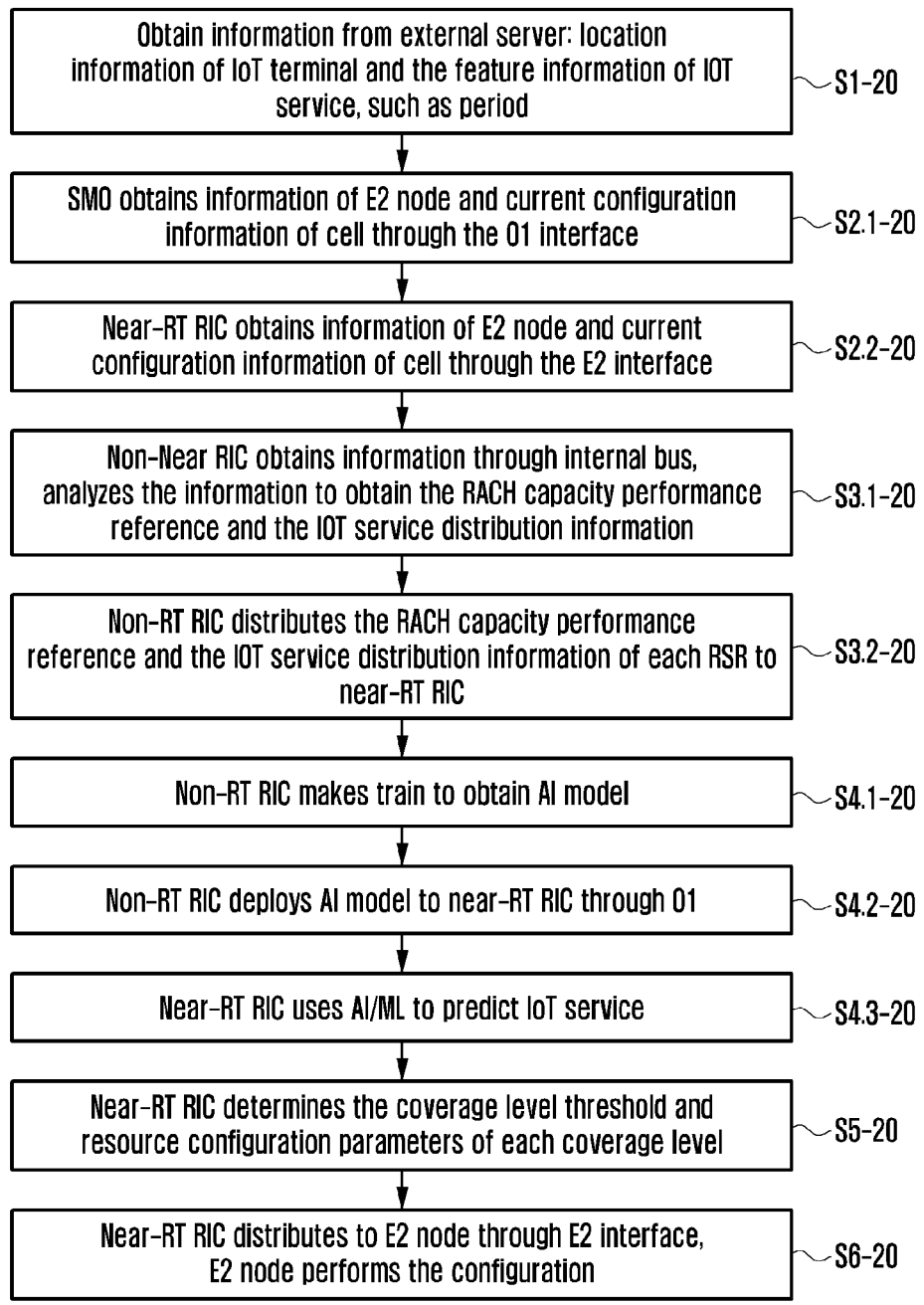
FIG. 20B is a schematic diagram of a principle flow of information processing according to an embodiment of the disclosure.

FIGS. 20A and 20B show a principle flow of information processing under the O-RAN system and the modules and interfaces in the corresponding O-RAN system framework according to various embodiments of the disclosure.

Referring to FIGS. 20A and 20B, in operation S1-20, the SMO module collects the location information of the terminal and the feature information of the IoT service from the application server, such as the periodic characteristic of the service. The above information is used to realize the estimation and prediction of IoT coverage characteristics and service characteristics in the cell.

The location of IoT users is mostly static (for example, meter reading service) or the running trajectory is regular (for example, high-voltage power line inspection service). Operators may obtain relevant information from vertical industries and store it in the operation server in advance.

IoT services generally have periodic regularities. For example, the humidity detection service detects and reports the humidity indicators of the surrounding environment every fixed time interval. Operators can also store the relevant requirement information of vertical industries in the operation server in advance.

SMO may obtain the configuration information of terminals and services from vertical industries (such as location and periodicity of service occurrence) stored in the server in advance from the running server through the public interface.

In operation S2.1-20, SMO receives information from O-eNB or O-DU through O1 interface, which includes measurements about RSRP and BSR reported by IoT terminal, and base station measurement statistics and configuration information, where the base station measurement statistics and configuration information include the number of Msg1 received in each CL, the number of Msg4 received in each CL, the UE downlink BO size, the current cell configuration information may include RACH configuration information (number of subcarrier resources for each CL, the number of repetitions of the preamble code, period), the MCS value of the uplink transmission of each CL, the number of repetitions of the uplink transmission of each CL, the number of repetitions for transmission of the Ack/NACK for Msg4 of each CL, the number of repetitions for transmission of Ack/NACK for the PDSCH of each CL, the MCS value of the downlink transmission of each CL, the number of repetitions of the downlink transmission of each CL, the number of repetitions of the CSS transmission of each CL, the number of repetitions of the US S transmission of each CL, and the RSRP threshold corresponding to the CL in the cell.

In operation S2.2-20, the Near-RT RIC receives information from O-eNB or O-DU through the E2 interface, which includes the measurements about RSRP and BSR reported by the IoT terminal, and base station measurement statistics and configuration information. The base station measurement statistics and configuration information may include UE downlink BO size, the current cell configuration information, the MCS value of the uplink transmission of each CL, the number of repetitions of the uplink transmission of each CL, the number of repetitions for transmission of the Ack/NACK for Msg4 of each CL, the number of repetitions for transmission of Ack/NACK for the PDSCH of each CL, the MCS value of the downlink transmission of each CL, the number of repetitions of the downlink transmission of each CL, the number of repetitions of the CSS transmission of each CL, the number of repetitions of the USS transmission of each CL, and the RSRP threshold corresponding to the CL in the cell.

In operation S3.1-20, the SMO transmits the received measurements to Non-RT RIC via the internal bus. The Non-RT RIC analyzes the measurement and statistical results, which involves using user BO and vertical industry preset period or time settings to obtain the periodic characteristics of IoT services under the coverage of respective RSRPs, involves using the number of Msg1 and Msg4 received in each CL and the corresponding RACH configuration information to analyze the capacity performance reference under different RACH configurations. This capacity reference gives different RACH configurations (the number of repetitions, period, the number of subcarriers), the access success rate or the access capacity value of the system under any number of users with access requirements.

In operation S3.2-20, the Non-RT RIC transfers the analyzed period characteristics of IOT services under the coverage of each RSRP and the capacity performance reference results under different RACH configurations to Near-RT RIC through the A1 interface.

In operation S4.1-20, the Non-RT RIC uses long-term historical data (such as the data of the past year) to train the AI model to obtain an AI model suitable for the IoT service in the cell.

In operation S4.2-20, the Non-RT RIC deploys the trained AI model suitable for the IoT service to the Near-RT RIC through the O1 interface.

In operation S4.3-20, the Near-RT RIC uses the AI/ML model to predict the service distribution in the next time period, which involves using the trained AI model in combining with the service period distribution characteristics obtained in operation S3.2-20 and the actual measurement data in the last N (>=1) periods to predict the distribution of the IoT service capacity over time under different RSRPs in the next period.

In operation S5-20, the Non-RT RIC dynamically configures cell radio resources and transmission parameters based on the distribution characteristics of IoT services in the cell, which includes clustering IoT terminals in the same cell by using the capacity weighted variance analysis method, which is realized particularly through estimating and setting different RSRP thresholds. Further, for IoT users in the same cluster, the fluctuation features of the coverage characteristics over time are estimated, and the number of repetitions required for data transmission and the change of MCS are dynamically estimated based on the fluctuation features, so as to obtain the number of repetitions of data transmission and the optimal configuration of MCS for the same type of IoT users in different time periods. On the other hand, in order to ensure the access performance of the same type of IoT users, it may estimate the capacity requirement distribution of the same type of user IoT services in different time periods, and use the capacity performance reference under different RACH configurations obtained in operation S3.2-20 to estimate the best RACH resource and transmission parameter configuration in different time periods (including the number of RACH subcarriers, period, and the number of repetitions).

In operation S6-20, the Near-RT RIC transmits configuration information about wireless resources and transmission parameters to O-eNB or O-DU through the E2 interface, and O-eNB or O-DU completes the update of resource configuration parameters.

Figure 21:
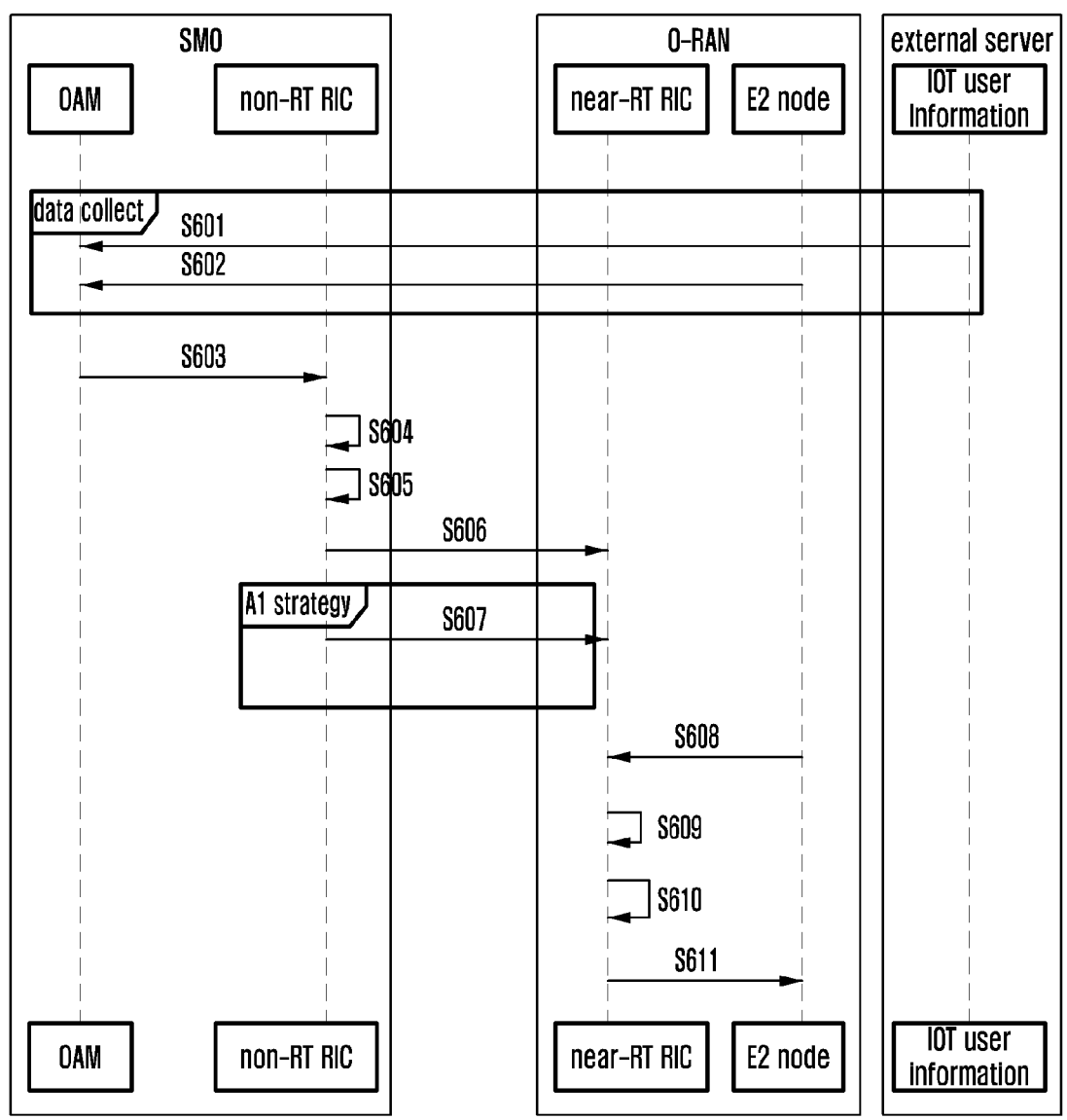
FIG. 21 is a schematic diagram of an implementation flow of information processing according to an embodiment of the disclosure.

FIG. 21 is a schematic diagram of an implementation flow of information processing according to an embodiment of the disclosure.

Referring to FIG. 21, optionally, a principle flow of information processing is shown.

In operation S601, the OAM receives data information transmitted by an external server.

Optionally, the data information may include location information of the IoT terminal, and feature information of the IoT service, such as the time and period of the service occurring.

In operation S602, the OAM receives measurement and configuration information from the E2 node through the O1 interface, which includes RSRP measurement value, data size in the terminal buffer, RACH-related configuration and performance information, data and control channel and other cell configuration information.

In operation S603, the OAM extracts and transmits the data to the Non-RT RIC.

In operation S604, the Non-RT RIC analyzes and obtains the coverage characteristics, period characteristics and capacity performance of IoT services.

In operation S605, the Non-RT RIC uses long-term historical measurement data to train AI/ML models.

In operation S606, the Non-RT RIC transmits AI/ML model to near-RT RIC through O1 interface.

In operation S607, the Non-RT RIC transmits the service characteristic and performance information obtained by analysis to the near-RT RIC through the AI interface.

In operation S608, the Near-RT RIC receives the measurement and configuration information from the E2 node through the E2 interface, which includes RSRP measurement value, data size in terminal buffer, RACH-related configuration and performance information, data and control channel and other cell configuration information.

In operation S609, the Near-RT RIC trains the AI/ML model and predicts the RSRP-level capacity distribution.

In operation S610, the Near-RT RIC estimates and determines the service coverage level and transmission and resource configuration parameters.

In operation S611, the Near-RT RIC delivers the configuration information of the cell IoT service through the E2 interface.

Alternative Embodiment 5

Figure 22A:
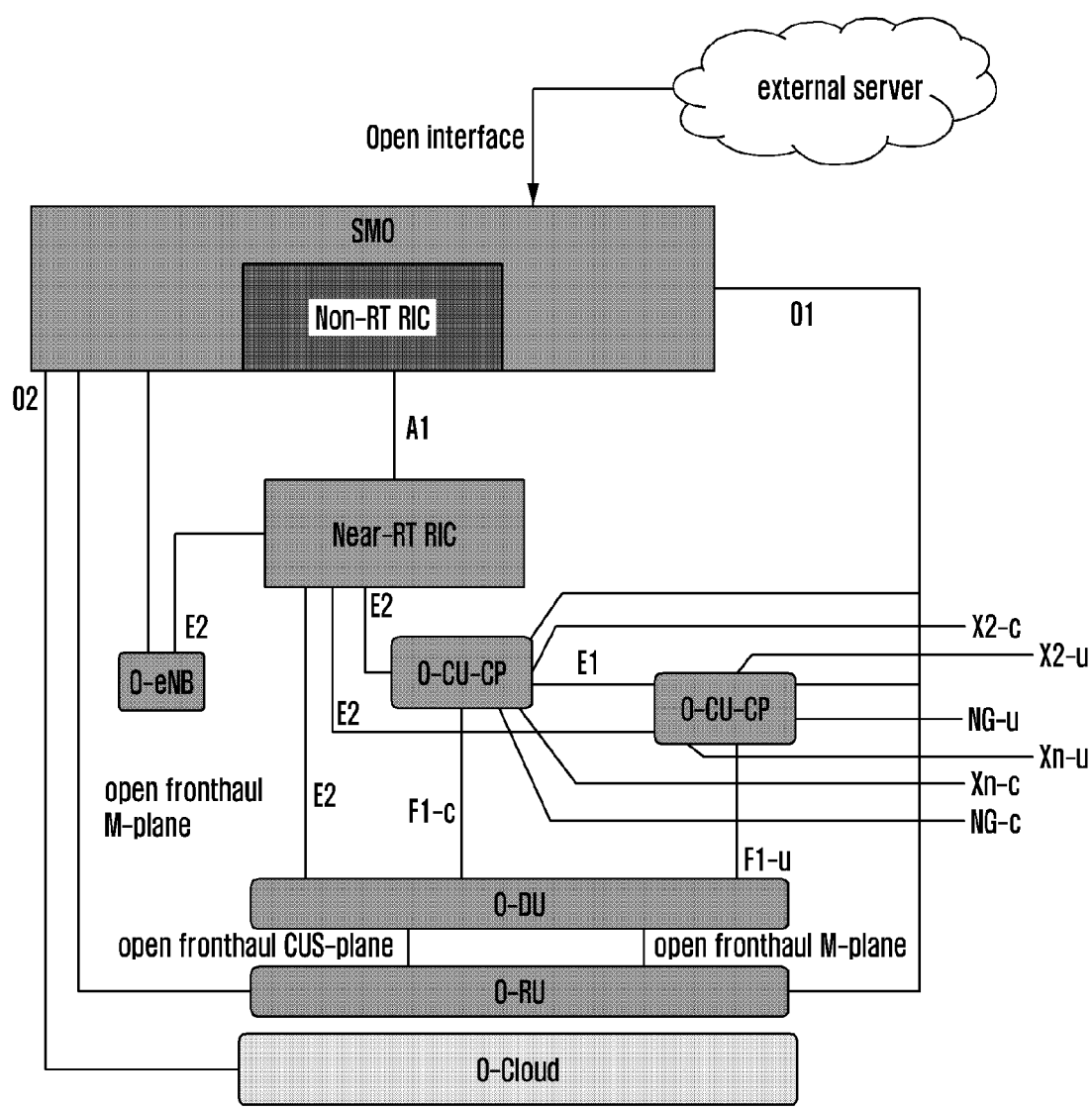
FIG. 22A is a schematic diagram of a system framework corresponding to information processing according to an embodiment of the disclosure.
Figure 22B:
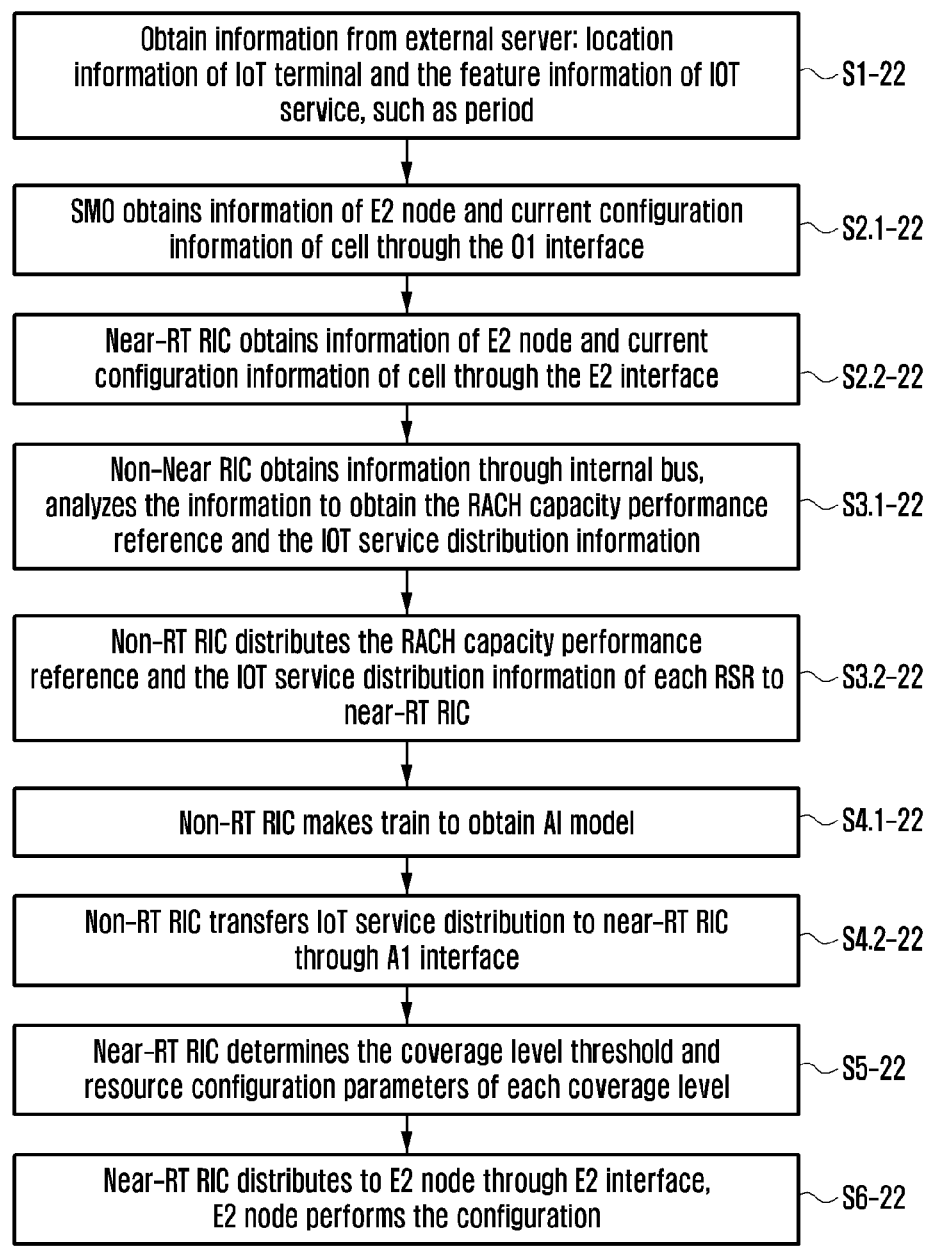
FIG. 22B is a schematic diagram of a principle flow of information processing according to an embodiment of the disclosure.

FIGS. 22A and 22B show a principle flow of information processing under an O-RAN system and corresponding modules and interfaces in an O-RAN system framework according to various embodiments of the disclosure.

Referring to FIGS. 22A and 22B, in operation S1-22, the SMO module collects the location information of the terminal and the feature information of the IoT service from the application server, such as the periodic characteristic of the service. The above information is used to realize the estimation and prediction of IoT coverage characteristics and service characteristics in the cell.

The location of IoT users is mostly static (for example, meter reading service) or the running trajectory is regular (for example, high-voltage power line inspection service). Operators may obtain relevant information from vertical industries and store it in the operation server in advance.

IoT services generally have periodic regularities. For example, the humidity detection service detects and reports the humidity indicators of the surrounding environment every fixed time interval. Operators can also store the relevant requirement information of vertical industries in the operation server in advance.

SMO may obtain the configuration information of terminals and services from vertical industries (such as location and periodicity of service occurrence) stored in the server in advance from the running server through the public interface.

In operation S2.1-22, SMO receives information from O-eNB or O-DU through O1 interface, which includes measurements about RSRP and BSR reported by IoT terminal, and base station measurement statistics and configuration information, where the base station measurement statistics and configuration information include the number of Msg1 received in each CL, the number of Msg4 received in each CL, the UE downlink BO size, the current cell configuration information may include RACH configuration information (number of subcarrier resources for each CL, the number of repetitions of the preamble code, period), the MCS value of the uplink transmission of each CL, the number of repetitions of the uplink transmission of each CL, the number of repetitions for transmission of the Ack/NACK for Msg4 of each CL, the number of repetitions for transmission of Ack/NACK for the PDSCH of each CL, the MCS value of the downlink transmission of each CL, the number of repetitions of the downlink transmission of each CL, the number of repetitions of the CSS transmission of each CL, the number of repetitions of the US S transmission of each CL, and the RSRP threshold corresponding to the CL in the cell.

In operation S2.2-22, the Near-RT RIC receives information from O-eNB or O-DU through the E2 interface, which includes the MCS value of the uplink transmission of each CL, the number of repetitions of the uplink transmission of each CL, the number of repetitions for transmission of the Ack/NACK for Msg4 of each CL, the number of repetitions for transmission of Ack/NACK for the PDSCH of each CL, the MCS value of the downlink transmission of each CL, the number of repetitions of the downlink transmission of each CL, the number of repetitions of the CSS transmission of each CL, the number of repetitions of the USS transmission of each CL, and the RSRP threshold corresponding to the CL in the cell.

In operation S3.1-22, the SMO transmits the received measurements to Non-RT RIC via the internal bus. The Non-RT RIC analyzes the measurement and statistical results, which involves using user BO and vertical industry preset period or time settings to obtain the periodic characteristics of IoT services under the coverage of respective RSRPs, involves using the number of Msg1 and Msg4 received in each CL and the corresponding RACH configuration information to analyze the capacity performance reference under different RACH configurations. This capacity reference gives different RACH configurations (the number of repetitions, period, the number of subcarriers), the access success rate or the access capacity value of the system under any number of users with access requirements. Where, the periodic characteristics of IoT services covered by each RSRP will be transferred to the AI prediction processing link within the Non-RT RIC.

In operation S3.2-22, the Non-RT RIC transfers the analyzed capacity performance reference results under different RACH configurations to the Near-RT RIC through the A1 interface.

In operation S4.1-22, the Non-RT RIC uses long-term historical data (such as the data of the past year) to train the AI model to obtain an AI model suitable for the IoT service in the cell. And the Non-RT RIC uses the trained AI model in combining with the service period distribution characteristics obtained in operation S3.1-22 and the actual measurement data collected in operation S2.1-22 in the last N ($>=1$) periods to predict the distribution of the IoT service capacity over time under different RSRPs in the next period.

In operation S4.2-22, the Non-RT RIC uses the A1 interface to transfer the predicted distribution information of IoT service capacity over time under different RSRPs to Near-RT RIC.

In operation S5-22, the Non-RT RIC dynamically configures cell radio resources and transmission parameters based on the distribution characteristics of IoT services in the cell, which includes clustering IoT terminals in the same cell by using the capacity weighted variance analysis method, which is realized particularly through estimating and setting different RSRP thresholds. Further, for IoT users in the same cluster, the fluctuation features of the coverage characteristics over time are estimated, and the number of repetitions required for data transmission and the change of MCS are dynamically estimated based on the fluctuation features, so as to obtain the number of repetitions of data transmission and the optimal configuration of MCS for the same type of IoT users in different time periods. On the other hand, in order to ensure the access performance of the same type of IoT users, it may estimate the capacity requirement distribution of the same type of user IoT services in different time periods, and use the capacity performance reference under different RACH configurations obtained in operation S3.2-22) to estimate the best RACH resource and transmission parameter configuration in different time periods (including the number of RACH subcarriers, period, and the number of repetitions).

In operation S6-22, the Near-RT RIC transmits configuration information about wireless resources and transmission parameters to O-eNB or O-DU through the E2 interface, and O-eNB or O-DU completes the update of resource configuration parameters.

Figure 23:
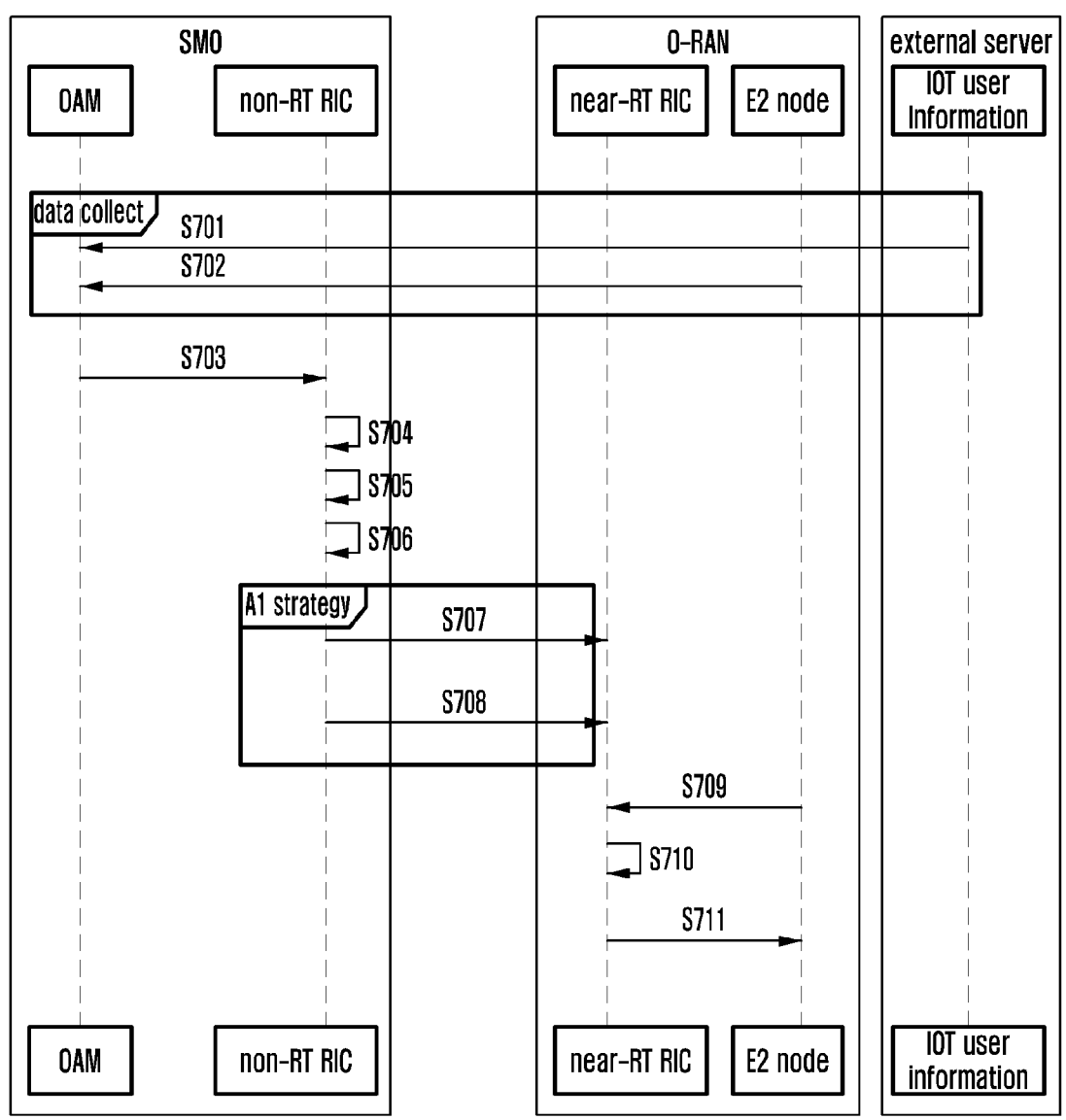
FIG. 23 is a schematic diagram of an implementation flow of information processing according to an embodiment of the disclosure.

FIG. 23 is a schematic diagram of an implementation flow of information processing according to an embodiment of the disclosure.

Referring to FIG. 23, optionally, a principle flow of information processing is shown.

In operation S701, the OAM receives data information transmitted by an external server.

Optionally, the data information may include the location information of the IoT terminal, and feature information of the IoT service, such as the time and period when the service occurring.

In operation S702, the OAM receives measurement and configuration information from the E2 node through the O1 interface, which includes RSRP measurement value, data size in the terminal buffer, RACH-related configuration and performance information, data and control channel and other cell configuration information.

In operation S703, the OAM extracts and transmits the data to Non-RT RIC. In operation S704, Non-RT RIC analyzes and obtains the coverage characteristics, period characteristics and capacity performance of IoT services.

In operation S705, the Non-RT RIC uses long-term historical measurement data to train AI/ML models.

In operation S706, the Non-RT RIC trains the AI/ML model and predicts the RSRP-level capacity distribution.

In operation S707, the Non-RT RIC transmits the analyzed service characteristics and performance information to the near-RT RIC through the A1 interface.

In operation S708, the Non-RT RIC transmits the predicted capacity distribution information to the near-RT RIC through the A1 interface.

In operation S709, the Near-RT RIC receives the configuration information from the E2 node through the E2 interface, which includes RACH-related configuration, cell configuration information such as data and control channels, etc.

In operation S710, the Near-RT RIC estimates and determines the service coverage level and transmission and resource configuration parameters.

In operation S711, the Near-RT RIC delivers the configuration information of the cell IoT service through the E2 interface.

Alternative Embodiment 6

Figure 24A:
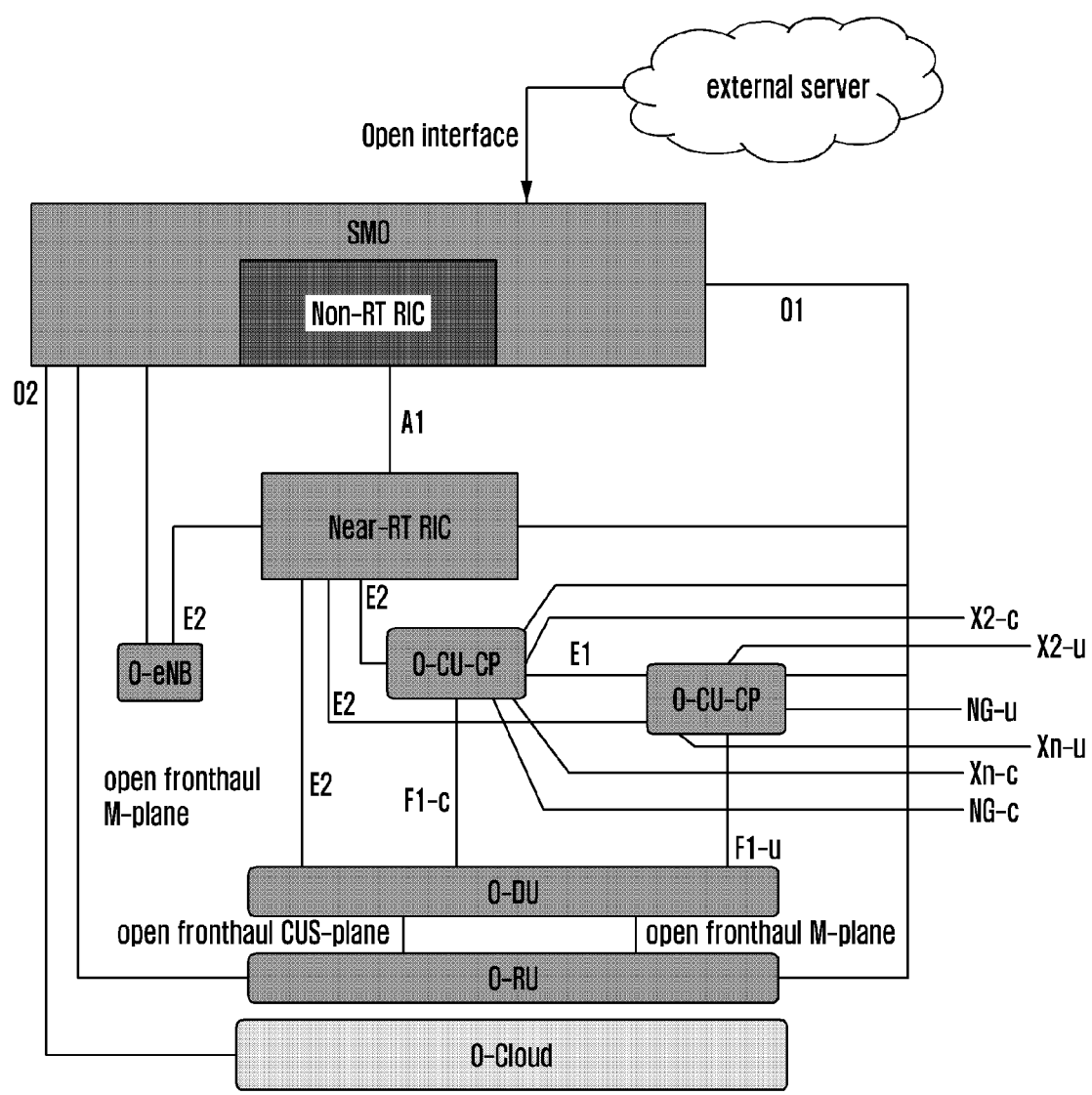
FIG. 24A is a schematic diagram of a system framework corresponding to information processing according to an embodiment of the disclosure.
Figure 24B:
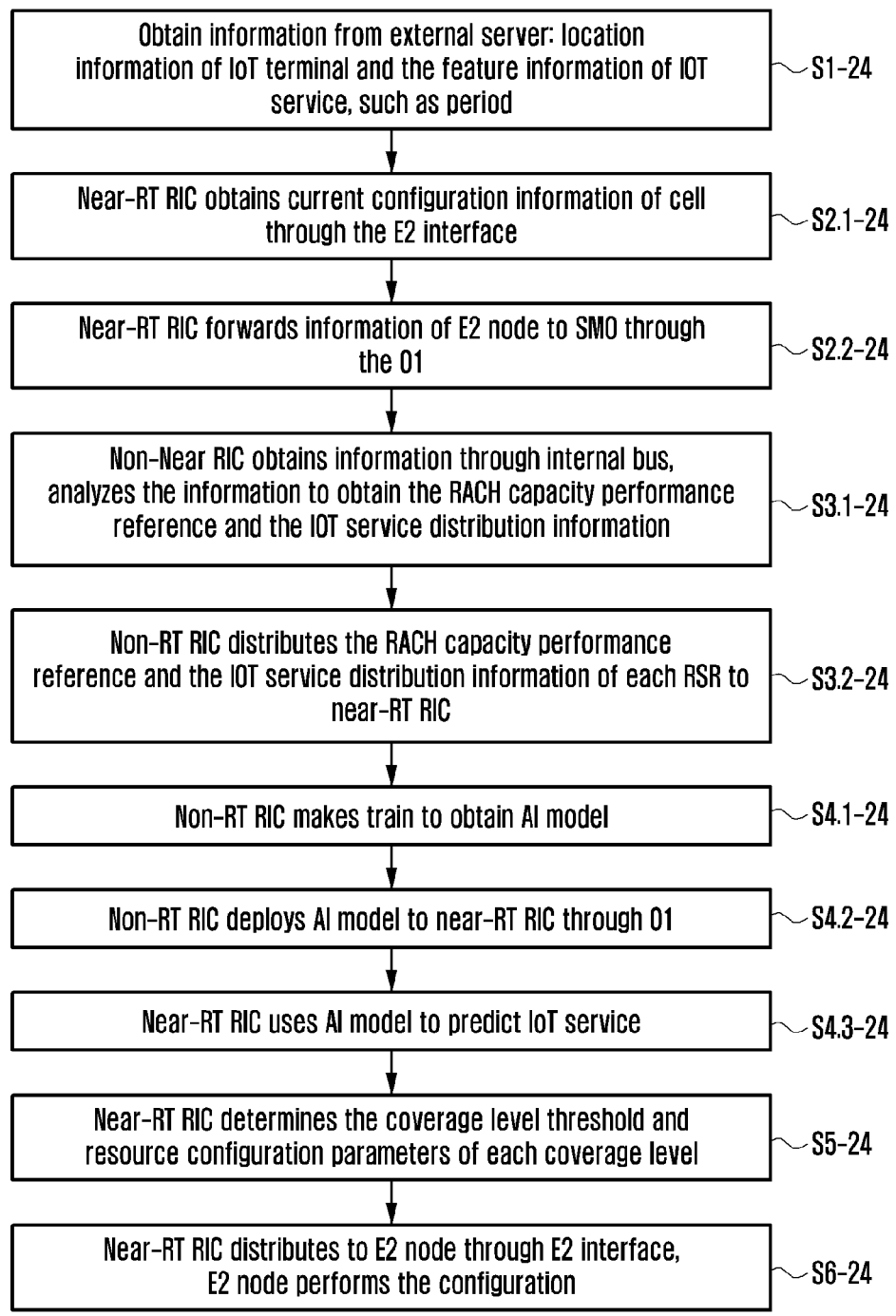
FIG. 24B is a schematic diagram of a principle flow of information processing according to an embodiment of the disclosure.

FIGS. 24A and 24B show a principle flow of information processing under an O-RAN system and corresponding modules and interfaces in the O-RAN system framework according to various embodiments of the disclosure.

Referring to FIGS. 24A and 24B, in operation S1-24, the SMO module collects the location information of the terminal and the feature information of the IoT service from the application server, such as the periodic characteristic of the service. The above information is used to realize the estimation and prediction of IoT coverage characteristics and service characteristics in the cell.

The location of IoT users is mostly static (for example, meter reading service) or the running trajectory is regular (for example, high-voltage power line inspection service). Operators may obtain relevant information from vertical industries and store it in the operation server in advance.

IoT services generally have periodic regularities. For example, the humidity detection service detects and reports the humidity indicators of the surrounding environment every fixed time interval. Operators can also store the relevant requirement information of vertical industries in the operation server in advance.

SMO may obtain the configuration information of terminals and services from vertical industries (such as location and periodicity of service occurrence) stored in the server in advance from the running server through the public interface.

In operation S2.1-24, the Near-RT RIC receives information from O-eNB or O-DU through E2 interface, which includes measurements about RSRP and BSR reported by IoT terminal, and base station measurement statistics and configuration information, which includes the number of Msg1 received in each CL, the number of Msg4 received in each CL, the UE downlink BO size, the current cell configuration information may include RACH configuration information (number of subcarrier resources for each CL, the number of repetitions of the preamble code, period), the MCS value of the uplink transmission of each CL, the number of repetitions of the uplink transmission of each CL, the number of repetitions for transmission of the Ack/NACK for Msg4 of each CL, the number of repetitions for transmission of Ack/NACK for the PDSCH of each CL, the MCS value of the downlink transmission of each CL, the number of repetitions of the downlink transmission of each CL, the number of repetitions of the CSS transmission of each CL, the number of repetitions of the USS transmission of each CL, and the RSRP threshold corresponding to the CL in the cell.

In operation S2.2-24), the Near-RT RIC forwards the information from O-eNB or O-DU and configuration to SMO through O1 interface.

In operation S3.1-24, the SMO transmits the received and configured information to Non-RT RIC through the internal bus. The Non-RT RIC analyzes the measurement and statistical results, which involves using user BO and vertical industry preset period or time settings to obtain the periodic characteristics of IoT services under the coverage of respective RSRPs, involves using the number of Msg1 and Msg4 received in each CL and the corresponding RACH configuration information to analyze the capacity performance reference under different RACH configurations. This capacity reference gives different RACH configurations (the number of repetitions, period, the number of subcarriers), the access success rate or the access capacity value of the system under any number of users with access requirements.

In operation S3.2-24), the Non-RT RIC transfers the analyzed period characteristics of IoT services under the coverage of each RSRP and the capacity performance reference results under different RACH configurations to Near-RT RIC through the A1 interface.

In operation S4.1-24, the Non-RT RIC uses long-term historical data (such as the data of the past year) to train the AI model to obtain an AI model suitable for the IoT service in the cell.

In operation S4.2-24, the Non-RT RIC deploys the trained AI model suitable for the IoT service to the Near-RT RIC through the O1 interface.

In operation S4.3-24, the Near-RT RIC uses the AI/ML model to predict the service distribution in the next time period, which involves using the trained AI model in combining with the service period distribution characteristics obtained in operation S3.2-24 and the actual measurement data in the last N (>=1) periods to predict the distribution of the IoT service capacity over time under different RSRPs in the next period.

In operation S5-24, the Non-RT RIC dynamically configures cell radio resources and transmission parameters based on the distribution characteristics of IoT services in the cell, which includes clustering IoT terminals in the same cell by using the capacity weighted variance analysis method, which is realized particularly through estimating and setting different RSRP thresholds. Further, for IoT users in the same cluster, the fluctuation features of the coverage characteristics over time are estimated, and the number of repetitions required for data transmission and the change of MCS are dynamically estimated based on the fluctuation features, so as to obtain the number of repetitions of data transmission and the optimal configuration of MCS for the same type of IoT users in different time periods. On the other hand, in order to ensure the access performance of the same type of IoT users, it may estimate the capacity requirement distribution of the same type of user IoT services in different time periods, and use the capacity performance reference under different RACH configurations obtained in operation S3.2-24 to estimate the best RACH resource and transmission parameter configuration in different time periods (including the number of RACH subcarriers, period, and the number of repetitions).

In operation S6-24, the Near-RT RIC transmits configuration information about wireless resources and transmission parameters to O-eNB or O-DU through the E2 interface, and O-eNB or O-DU completes the update of resource configuration parameters.

Figure 25:
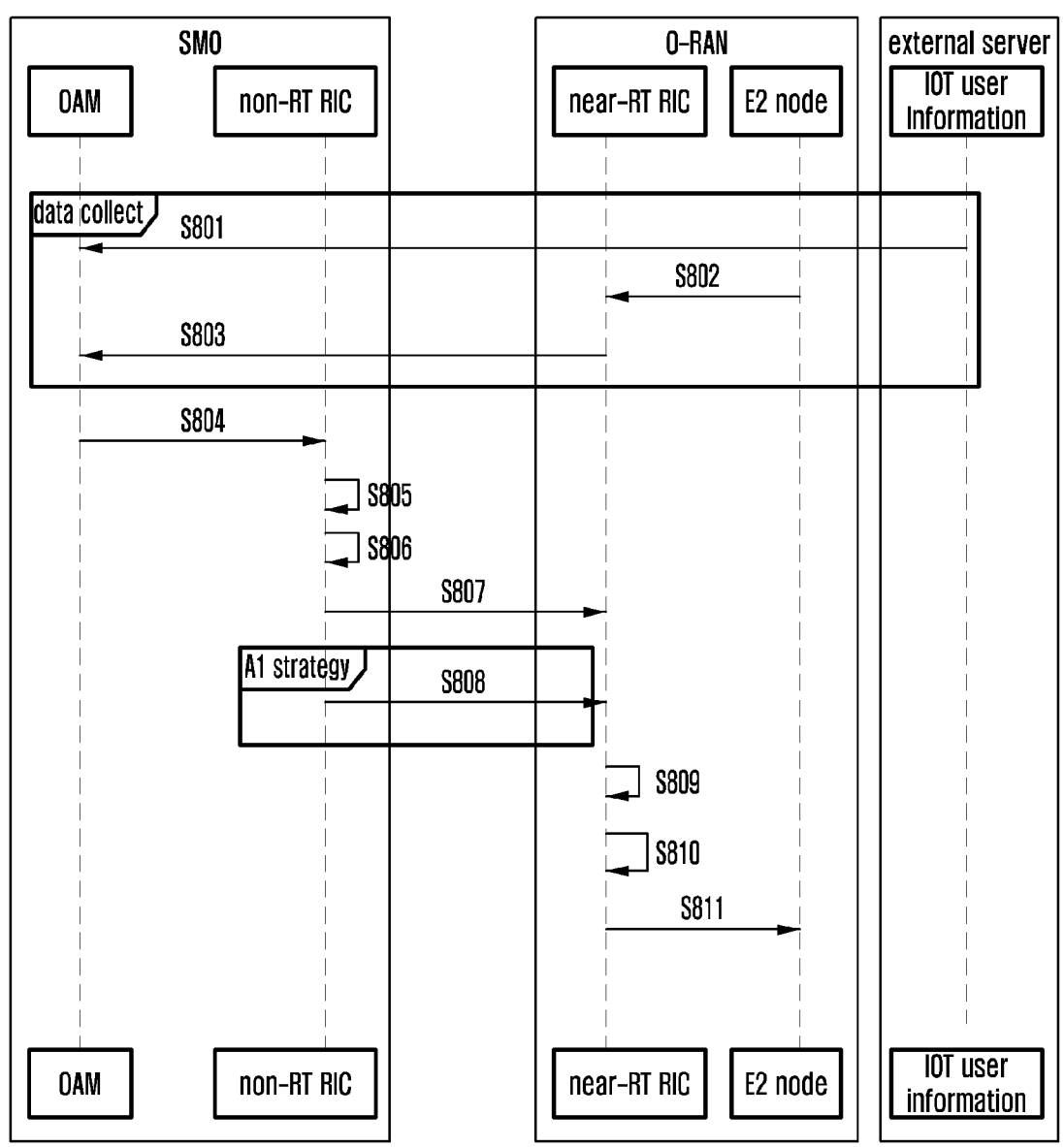
FIG. 25 is a schematic diagram of an implementation flow of information processing according to an embodiment of the disclosure.

FIG. 25 is a schematic diagram of an implementation flow of information processing according to an embodiment of the disclosure.

Referring to FIG. 25, optionally, a principle flow of information processing is shown.

In operation S801, the OAM receives data information transmitted by an external server.

Optionally, the data information may include the location information of the IoT terminal, and feature information of the IoT service, such as the time and period when the service occurring.

In operation S802, the near-RT RIC receives measurement and configuration information from the E2 node through the E2 interface.

In operation S803, the OAM receives the measurement information from the E2 node transmitted by the near-RT RIC through the O1 interface.

In operation S804, the OAM extracts and transmits the data to Non-RT RIC.

In operation S805, the Non-RT RIC analyzes the coverage characteristics, period characteristics and capacity performance of IoT services.

In operation S806, the Non-RT RIC uses long-term historical measurement data to train AI/ML models.

In operation S807, the Non-RT RIC transmits AI/ML model to near-RT RIC through O1 interface.

In operation S808, the Non-RT RIC transmits the service characteristic and performance information obtained by analysis through the A1 interface.

In operation S809, the Near-RT RIC trains AI/ML models and predicts RSRP-level capacity distribution.

In operation S810, the Near-RT RIC estimates and determines the service coverage level and transmission and resource configuration parameters.

In operation S811, the Near-RT RIC delivers the configuration information of the cell IoT service through the E2 interface.

It should be noted that the following messages need to be introduced in order to implement the embodiments of the application described above:

A1 interface, downlink direction, 1) if data analysis and prediction are implemented in Non-RT RIC, and the final resource configuration parameters are estimated (embodiment 1 and embodiment 2), then the optimized configuration parameter values are transferred to the Near-RT RIC (embodiment 2). At this time, the configuration parameters that need to be provided by the A1 interface may include the RSRP threshold corresponding to each CL, and the RACH resource configuration under respective CLs (the number of subcarriers, period, and the number of repetitions), each CL downlink data transmission parameter configuration (MCS, the number of repetitions of data channel, the number of repetitions of control channel), each CL uplink data transmission parameter configuration (MCS, the number of repetitions of data channel, the number of repetitions of feedback information), 2) if AI/ML prediction is implemented in Near-RT RIC (embodiment 3 and embodiment 5), the parameters that need to be provided by the A1 interface may include the periodic characteristics of IoT services under the coverage of respective RSRPs and capacity performance reference results under different RACH configurations, and 3) if AI/ML prediction is implemented in None-RT RIC, but the estimation processing of the configuration is implemented in Near-RT RIC (embodiment 4), the parameters provided by the A1 interface may include capacity performance reference results under different RACH configurations, and information on the distribution of IOT service capacity over time under different RSRPs predicted by AI.

E2 interface, downlink direction, if the Near-RT RIC receives the configuration information from the A1 interface or performs data estimation processing in the Near-RT RIC to obtain the final system configuration information, the downlink direction of the E2 interface needs to be able to provide the following parameters, which include RSRP threshold corresponding to each CL, RACH resource configuration (the number of subcarriers, period, and the number of repetitions) under respective CLs, and downlink data transmission parameter configuration for each CL (MCS, the number of repetitions of data channel, the number of repetitions of control channel), the uplink data transmission parameter configuration of each CL (MCS, the number of repetitions of data channel, the number of repetitions of the feedback information).

E2 interface, uplink direction, 1), if AI/ML prediction is implemented in Near-RT RIC (embodiment 3 and embodiment 5), the parameters that need to be provided by the E2 interface may include the measurements about RSRP and BSR reported by the IoT terminal, and base station measurement statistics and configuration information, which includes UE downlink BO size, current cell configuration information, including the MCS value of the uplink transmission of each CL, the number of repetitions of the uplink transmission of each CL, the number of repetitions for transmission of the Ack/NACK for Msg4 of each CL, the number of repetitions for transmission of Ack/NACK for the PDSCH of each CL, the MCS value of the downlink transmission of each CL, the number of repetitions of the downlink transmission of each CL, the number of repetitions of the CSS transmission of each CL, the number of repetitions of the USS transmission of each CL, and the RSRP threshold corresponding to the CL in the cell, and 2) if AI/ML prediction is implemented in None-RT RIC, but the configured estimation processing is implemented in Near-RT RIC (embodiment 4), the parameters that need to be provided in the uplink direction of the E2 interface may include the MCS value of the uplink transmission of each CL, the number of repetitions of the uplink transmission of each CL, the number of repetitions for transmission of the Ack/NACK for Msg4 of each CL, the number of repetitions for transmission of Ack/NACK for the PDSCH of each CL, the MCS value of the downlink transmission of each CL, the number of repetitions of the downlink transmission of each CL, the number of repetitions of the CSS transmission of each CL, the number of repetitions of the USS transmission of each CL, and the RSRP threshold corresponding to the CL in the cell.

O1 interface, uplink direction, it needs to support the reporting of related measurement data, which includes measurements about RSRP and BSR reported by IoT terminal, and base station measurement statistics and configuration information, which involves the number of Msg1 received in each CL, the number of Msg4 received in each CL, the UE downlink BO size, the current cell configuration information may include RACH configuration information (number of subcarrier resources for each CL, the number of repetitions of the preamble code, period), the MCS value of the uplink transmission of each CL, the number of repetitions of the uplink transmission of each CL, the number of repetitions for transmission of the Ack/NACK for Msg4 of each CL, the number of repetitions for transmission of Ack/NACK for the PDSCH of each CL, the MCS value of the downlink transmission of each CL, the number of repetitions of the downlink transmission of each CL, the number of repetitions of the CSS transmission of each CL, the number of repetitions of the USS transmission of each CL, and the RSRP threshold corresponding to the CL in the cell.

O1 interface, downlink direction, the obtained resource and transmission parameter configuration are transmitted to SMO through the internal bus interface Non-RT RIC. The SMO transmits related parameter configurations to the O-eNB or O-DU through uses the O1 interface. The parameters that need to be provided in the downlink direction of the O1 interface may include the RSRP threshold corresponding to each CL, the RACH resource configuration under respective CLs (the number of subcarriers, the period and the number of repetitions), and the downlink data transmission parameter configuration of each CL (MCS, the number of repetitions of data channel, the number of repetitions of control channel), each CL uplink data transmission parameter configuration (MCS, the number of repetitions of data channel, the number of repetitions of feedback information).

Optionally, in order to support the embodiments of this disclosure, the following IE is added to the interface:

1. IOT_RACH_Configurations, which is defined as in Table 1:

TABLE 1

| message unit/ group name | optional/ required | range | message unit/ parameter | semantic description |
|---|---|---|---|---|
| >RACH configuration parameter list | required | SEQUENCE (SIZE (1 ... M) OF IOT_PRACH_Parameters | 36.331 6.7, 6.3 | RACH configuration parameter list |
| >RSRP threshold | optional | SEQUENCE (SIZE(1 ... M-1)) of RSRP-Range | 36.331 6.7, 6.3 | RSRP thresholds for respective coverage level |
| >PRACH configuration | required | | 36.331 6.7, 6.3 | |
| >>PRACH period | required | ENUM{40, 80, 160, 240, 320, 640, 1280, 2560} | 36.331 6.7, 6.3 | PRACH resource period |
| >>the number of repetitions for transmission of preamble | required | ENUM{1, 2, 4, 8, 16, 32, 64, 128} | 36.331 6.7, 6.3 | the number of repetitions taken per preamble |
| >>PRACH the number of subcarriers | required | ENUM{12, 24, 36, 48} | 36.331 6.7, 6.3 | frequency domain resource available to PRACH |

This structure is configured for reporting and distributing, which involves interfaces O1, E2, and A1.

2. IOT_DL_Configurations, which is defined as in Table 2:

TABLE 2

| message unit/ group name | optional/ required | range | message unit/ parameter | semantic description |
|---|---|---|---|---|
| >IoT downlink configuration | required | SEQUENCE (SIZE (1 ... M) OF IOT_DL_Parameters | 36.331 6.7, 6.3 | downlink configuration parameter list |
| >IoT downlink configuration parameter | required | | 36.331 6.7, 6.3 | downlink configuration parameters for respective coverage level |
| >downlink MCS | optional | INTEGER(0 ... 13) | 36.331 6.7, 6.3 | downlink PDSCH MCS |
| >>the number of repetitions of downlink | optional | ENUM{1, 2, 4, 8, 16, 32, 64, 128, 192, 256, 384, 512, 768, 1024, 1536, | 36.331 6.7, 6.3 | the number of repetitions of PDSCH |

TABLE 2-continued

| message unit/ group name | optional/ required | range | message unit/ parameter | semantic description |
|---|---|---|---|---|
| >>the number of repetitions of PDCCH for msg2 | required | ENUM{1, 2, 4, 8, 16, 32, 64, 128, 256, 512, 1024, 2048} | 36.331 6.7, 6.3 | the number of repetitions of PDCCH for msg2 |
| >>the number of repetitions of PDCCH for USS | optional | ENUM{1, 2, 4, 8, 16, 32, 64, 128, 256, 512, 1024, 2048} | 36.331 6.7, 6.3 | the number of repetitions of PDCCH for USS |

This structure is configured for reporting and distributing, which involves interfaces O1, E2, and A1.

3. IOT_UL_Configuations, which is defined as in Table 3:

TABLE 3

| message unit/ group name | optional/ required | range | message unit/parameter | semantic description |
|---|---|---|---|---|
| >IoT uplink configuration | required | SEQUENCE (SIZE (1 . . . M) OF IOT_UL_Parameters | 36.331 6.7, 6.3 | uplink configuration parameter list |
| >IoT uplink configuration parameter | optional | | 36.331 6.7, 6.3 | uplink configuration parameters for respective coverage level |
| >uplink MCS | optional | INTEGER(0 . . . 13) | 36.331 6.7, 6.3 | uplink PDSCH MCS |
| >>the number of repetitions of uplink | optional | ENUM{1, 2, 4, 8, 16, 32, 64, 128} | 36.331 6.7, 6.3 | the number of repetitions of uplink PUSCH |
| >>the number of repetitions of ACK/NACK for msg2 | required | ENUM{1, 2, 4, 8, 16, 32, 64, 128} | 36.331 6.7, 6.3 | the number of repetitions of PDCCH for msg2 |
| >>the number of repetitions of ACK/NACK | optional | ENUM{1, 2, 4, 8, 16, 32, 64, 128} | 36.331 6.7, 6.3 | the number of repetitions of msg 4 UCI |
| >>the number of repetitions of PUCCH | optional | ENUM{1, 2, 4, 8, 16, 32, 64, 128} | 36.331 6.3 | the number of repetitions of PUCCH |

The technical solutions provided by the embodiments of this disclosure have at least the following beneficial effects, by invoking Non-RT RIC or Near-RT RIC to predict the service distribution related information of IoT terminals, it may achieve the dynamic configuration of different coverage levels (CLs) in the cell, save energy consumption, and improve system capacity and performance at the same time.

An embodiment of the disclosure also provides an information processing apparatus, which is used in a first network device.

Figure 26:
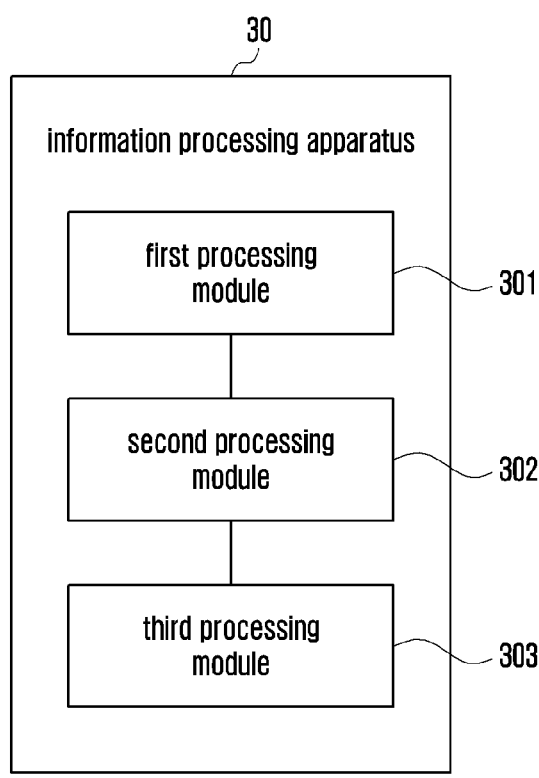
FIG. 26 is a schematic structural diagram of an information processing apparatus according to an embodiment of the disclosure.

FIG. 26 is a schematic structural diagram of an information processing apparatus according to an embodiment of the disclosure.

Referring to FIG. 26, the schematic structural diagram of an apparatus is shown. An information processing apparatus 30 includes a first processing module 301, a second processing module 302, and a third processing module 303.

The first processing module 301 is configured to receive information related to the second network device. The second processing module 302 is configured to determine the first resource configuration corresponding to the coverage classification related to the second network device based on the information. The third processing module 303 is configured to transmit the first resource configuration to the second network device.

Optionally, the second processing module 302 is specifically configured to determine a service distribution related information of a user equipment (UE) respectively corresponding to coverage characteristic during a first period based on the information, wherein the UE is included in the second network device, based on the service distribution related information of the UE during the first period, predict or calculate the service distribution related information of the UE during a second period after the first period to determine the service distribution related information of the UE during the second period, determine the first resource configuration corresponding to the coverage classification related to the second network device based on the service distribution related information of the UE during the second period, the coverage classification includes at least one of a coverage level and a coverage domain class.

Optionally, the first processing module 301 is further configured to receive service information transmitted by an external server, wherein the service information includes location information of the UE and feature information of the UE, the location information includes at least one of location parameters of the UE provided by a positioning server and flight trajectory parameters provided by the positioning server, the feature information includes at least one of service period and periodic reporting time.

The second processing module 302 is specifically configured to determine the service distribution related information of the UE respectively corresponding to the coverage characteristic during the first period based on the information and the service information.

Optionally, the information includes at least one of measurement information of the second network device and configuration information of the second network device, the measurement information includes at least one of signal strength data, service data, and performance data, the configuration information includes at least one of coverage classification threshold configuration used for dividing coverage classification, and resource configuration parameters corresponding to the coverage classification, the coverage classification threshold configuration is a coverage characteristic index value that is used to divide the coverage area into different coverage classifications.

Optionally, the second processing module 302 is specifically configured to determine, based on the service data and the service information, the distribution information of the UE that has a service to be transmitted and need to access the second network device during the first period, and determine, based on the performance data and the configuration information, an access capacity of the random access channel (RACH) corresponding to different configuration information, and the service distribution related information includes the distribution information and the access capacity of the RACH corresponding to the different configuration information.

Optionally, the second processing module 302 is specifically configured to input the service distribution related information of the UE during N service periods into a preset prediction model, predict the service distribution related information of the UE during the second period after the first period through the prediction model, and obtain capacity distribution of the service over time corresponding to the coverage feature within a first service period (i.e., the N+1 service period) after the N service periods, wherein the first period includes N service periods, the second time period includes the first service period, and the service distribution related information of the UE during the first period is used to characterize the capacity distribution of the service over time corresponding to the coverage feature within the N service periods, and the service distribution related information of the UE during the second period is used to characterize the capacity distribution of the service over time corresponding to the coverage feature within the first service period, the N is a positive integer.

Optionally, the second processing module 302 is specifically configured to determine the coverage classification thresholds respectively to the coverage classification based on the service distribution related information of the UE during the second period, and determine the first resource configuration corresponding to the coverage classification related to the second network device based on the service distribution related information of the UE during the second period and the coverage classification threshold respectively corresponding to the coverage classifications.

Optionally, the second processing module 302 is specifically configured to determine, based on the coverage classification threshold respectively corresponding to the coverage classifications, the number of repetitions for transmission of resources of the UEs respectively corresponding to the coverage classifications, the modulation and coding scheme (MCS) configuration of the resource, the resource includes at least one of a physical downlink control channel (PDCCH), a physical downlink shared channel (PDSCH), a physical uplink shared channel (PUSCH), and uplink control information (UCI), based on the service distribution related information of the UE during the second period and the coverage classification threshold respectively corresponding to the coverage classifications, determine the number of the coverage classifications and the number of the UEs respectively corresponding to the coverage classifications, and based on the number of the UEs respectively corresponding to the coverage classifications and the access capacity of the RACH corresponding to the configuration information of the second network device, determine a second resource configuration of the RACH respectively corresponding to the coverage classifications, wherein the first resource configuration corresponding to the coverage classification includes the coverage classification threshold of the UE respectively corresponding to the coverage classification, the number of repetitions for transmission of the resource, the MCS configuration of the resource, and the second resource configuration of the RACH respectively corresponding to the coverage classifications, and wherein the second resource configuration of the RACH includes at least one of the number of repetitions for transmission of a random access preamble, the number of RACH subcarriers, and the RACH period.

Optionally, when the number of the coverage classifications and the coverage classification threshold respectively corresponding to the coverage classification change, adjusting the number of repetitions for transmission of the resource of the UE corresponding to the coverage classification and the modulation and coding scheme (MCS) configuration of the resource, or after determining the number of the coverage classifications and the coverage classification threshold respectively corresponding to the coverage classification, adjusting the number of repetitions for transmission of the resource of the UE corresponding to the coverage classification and the modulation and coding scheme (MCS) configuration of the resource.

Optionally, the adjusting the number of repetitions for transmission of the resource of the UE corresponding to the coverage classification, includes at least one of the following, adjusting the number of repetitions for transmission of the PDCCH, which includes adjusting the number of repetitions for transmission of at least one of message msg2, message msg3, and message msg4 in the common search space, and the number of repetitions for transmission of the dedicated search space, adjusting the number of repetitions for transmission of the PDSCH, which includes adjusting at least one of: the number of repetitions for transmission of the PDSCH carrying the message msg2, the number of repetitions for transmission of the PDSCH carrying the message msg4, and the number of repetitions for transmission of the PDSCH carrying downlink signaling and data in the connected state, adjusting the number of repetitions for transmission of the PUSCH, which includes adjusting at least one of: the number of repetitions for transmission of the PUSCH carrying the message msg3, and the number of repetitions for transmission of the PUSCH carrying uplink signaling and data in the connected state, and adjusting the number of repetitions for transmission of the uplink control information (UCI), which comprising adjusting at least one of the number of repetitions for transmission of the PUSCH carrying downlink transmission ACK and/or NACK, and the number of repetitions for transmission of the PUCCH carrying downlink transmission ACK and/or NACK.

Optionally, the adjusting the MCS configuration of the resource of the UE corresponding to the coverage classification, includes at least one of the following, adjusting the MCS configuration of the PDSCH, which includes adjusting at least one of the MCS configuration of the PDSCH carrying the message msg2, the MCS configuration of the PDSCH carrying the message msg4, and the MCS configuration of the PDSCH carrying the downlink signaling and data in the connected state, and adjusting the MCS configuration of the PUSCH, which includes adjusting at least one of the MCS configuration of the PUSCH carrying the message msg3, and the MCS configuration of the PDSCH carrying the uplink signaling and data in the connected state.

Optionally, the first processing module 301 is specifically configured to receive information transmitted by the second network device, which includes at least one of the following, receiving the information related to the second network device transmitted by a service management and orchestration (SMO), receiving the information related to the second network device transmitted by the near-real-time RAN intelligent controller (Near-RT RIC), wherein the information related to the second network device is obtained by the Near-RT RIC from the second network device.

Optionally, the third processing module 303 is specifically configured to transmit the first resource configuration to the second network device, which includes one of the following, transmitting the first resource configuration to the second network device, transmitting the first resource configuration to the Near-RT RIC, wherein the first resource configuration is transmitted to the second network device by the Near-RT RIC, or transmitting the first resource configuration to the second network device through the Near-RT RIC.

Optionally, the first network device is a non-real-time RAN intelligent controller (Non-RT RIC) or a near-real-time RAN intelligent controller (Near-RT RIC).

The technical solutions provided by the embodiments of this disclosure have at least the following beneficial effects, through predicting or calculating the service distribution related information of the user equipment during the second period after the first period, it may realize dynamic configurations of different coverage classifications in the cell, save energy consumption, and improve system capacity and performance at the same time.

An embodiment of the disclosure also provides an electronic device.

Figure 27:
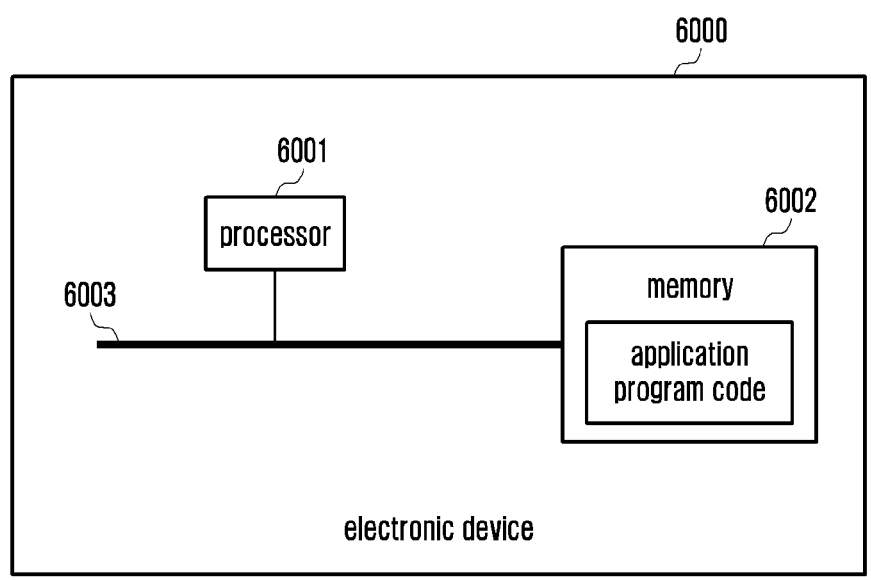
FIG. 27 is a schematic structural diagram of an electronic device according to an embodiment of the disclosure.

FIG. 27 is a schematic structural diagram of an electronic device according to an embodiment of the disclosure.

Referring to FIG. 27, a structural diagram of an electronic device is shown. An electronic device 6000 includes at least one processor 6001, a memory 6002, and a bus 6003. The at least one processor 6001 is electrically connected to the memory 6002, the memory 6002 is configured to store at least one computer-executable instruction, and the at least one processor 6001 is configured to execute the at least one computer-executable instruction, so as to execute the operations of any information processing method provided by the embodiment or any optional implementation of the disclosure.

Further, the at least one processor 6001 may be field-programmable gate array (FPGA) or other devices with logic processing capabilities, such as microcontroller unit (MCU), central processing unit (CPU).

The application of the embodiments of this disclosure has at least the following beneficial effects, achieving the dynamic configuration of different coverage levels, saving energy consumption, and improving system capacity and performance at the same time.

An embodiment of the disclosure also provides another computer-readable storage medium storing a computer program. The computer program is used to, when executed by a processor, implement the operations of any information processing method provided by any one of embodiments or any one of implementations of the disclosure.

The computer-readable storage medium provided by the embodiments of this disclosure includes, but is not limited to, any type of disk (including floppy disk, hard disk, optical disk, compact disk read-only memory (CD-ROM), and magneto-optical disk), read-only memory (ROM), random access memory (RAM), erasable programmable read-only memory (EPROM), electrically erasable programmable read-only memory (EEPROM), flash memory, magnetic card or light card. That is, a readable storage medium includes any medium that stores or transmits information in a readable form by a device (for example, a computer).

The application of the embodiments of this disclosure has at least the following beneficial effects, achieving the dynamic configuration of different coverage levels, saving energy consumption, and improving system capacity and performance at the same time.

Those skilled in the art can understand that computer program instructions can be used to implement each block in these structural diagrams and/or block diagrams and/or flow diagrams and combinations of blocks in these structural diagrams and/or block diagrams and/or flow diagrams. Those skilled in the art can understand that these computer program instructions can be provided to processors of general-purpose computers, professional computers, or other programmable data processing methods for implementation, so that the computer or other programmable data processing method processors can execute this structure diagram and/or block diagram and/or flow diagram disclosed in the application or the schemes specified in multiple boxes.

Those skilled in the art can understand that the various operations, methods, and steps, measures, and solutions in the process that have been discussed in this disclosure can be alternated, changed, combined, or deleted. Further, various operations, methods, and other steps, measures, and solutions in the process that have been discussed in this disclosure can also be alternated, changed, rearranged, decomposed, combined, or deleted.

While the disclosure has been shown and described with reference to various embodiments thereof, it will be understood by those skilled in the art that various changes in form and details may be made therein without departing from the spirit and scope of this disclosure as defined by the appended claims and their equivalents.

What is claimed is:

1. A method performed by a radio access network (RAN) intelligent controller (RIC), the method comprising:
receiving, from at least one of a base station or an external server, first information related to coverage levels of the base station and second information related to terminals, the first information and the second information being identified by the at least one of the terminals, the base station, or the external server during a first period;
determining service distribution information of a cell of the base station serving the terminals based on the first information and the second information, the service distribution information including distribution information of the terminals distributed based on the coverage levels;
based on the service distribution information, determining a coverage level configuration for use during a second period, the coverage level configuration including at least one of a number of coverage levels of the cell or a threshold to classify coverage levels, and a resource configuration corresponding to each of the coverage levels of the cell; and transmitting the coverage level configuration and the resource configuration to the base station.

2. The method of claim 1, wherein the service distribution information further includes:

distribution information of service delays distributed based on the coverage levels, distribution information of service throughput capacities distributed based on the coverage levels, or distribution information of service occurrences distributed based on the coverage levels.

3. The method of claim 1, wherein the second information related to the terminals includes a reception signal strength identified by the terminals during the first period, location information related to the terminals identified by the external server during the first period, and feature information related to the terminals including a service period and periodic reporting time identified by the external server during the first period.

4. The method of claim 1, wherein the first information related to the coverage levels of the base station includes a coverage level configuration including a threshold to classify coverage levels identified by the base station during the first period and a resource configuration corresponding to each of the coverage levels identified by the base station during the first period.

5. The method of claim 1, wherein the determining of the service distribution information of the cell of the base station serving the terminals based on the first information and the second information comprises:

determining the distribution information of the terminals distributed based on the coverage levels during the first period; and determining an access capacity of a random access channel (RACH) related to the base station.

6. The method of claim 1, further comprising:

based on the service distribution information, predicting service distribution information of the cell of the base station during the second period after the first period by:

inputting the service distribution information of the cell of the base station during N service periods included in the first period into a trained model;

predicting the service distribution information of the cell of the base station during the second period after the first period through the trained model; and obtaining distribution information of the terminals within a first service period after the N service periods included in the first period, and wherein the N being a positive integer, wherein the second period comprises the first service period, wherein the service distribution information of the cell of the base station during the first period is used to characterize distribution information of the terminals within the N service periods, and wherein the service distribution information of the cell of the base station during the second period is used to characterize the distribution information of the terminals within the first service period.

7. The method of claim 6, further comprising:

based on the service distribution information of the cell of the base station during the second period, determining the coverage level configuration for use during the second period; and determining the resource configuration corresponding to each of the coverage levels based on the service distribution information of the cell of the base station during the second period and the coverage level configuration for use during the second period.

8. The method of claim 7, wherein the determining of the resource configuration corresponding to each of the coverage levels comprises:

based on the threshold to classify the coverage levels, determining a number of repetitions for transmission of resources of the terminals corresponding to each of the coverage levels, a modulation and coding scheme (MCS) configuration of a resource corresponding to each of the coverage levels, the resource including at least one of a physical downlink control channel (PDCCH), a physical downlink shared channel (PDSCH), a physical uplink shared channel (PUSCH), or uplink control information (UCI);

based on the service distribution information of the cell of the base station during the second period and the threshold to classify the coverage levels, determining the number of coverage levels and a number of the terminals corresponding to each of the coverage levels; and based on the number of the terminals corresponding to each of the coverage levels and an access capacity of a random access channel (RACH) related to base station, determining another resource configuration of the RACH corresponding to each of the coverage levels, wherein the resource configuration corresponding to each of the coverage levels includes the number of repetitions for transmission of the resource corresponding to each of the coverage levels, the MCS configuration of the resource corresponding to each of the coverage levels, and the other resource configuration of the RACH corresponding to each of the coverage levels, and wherein the other resource configuration of the RACH corresponding to each of the coverage levels includes at least one of a number of repetitions for transmission of a random access preamble, a number of RACH subcarriers, or an RACH period.

9. The method of claim 8, further comprising:

in response to changing the number of the coverage levels and the threshold to classify the coverage levels, adjusting the number of repetitions for transmission of the resource and the MCS configuration of the resource; or after determining the number of the coverage levels and the threshold to classify the coverage levels, adjusting the number of repetitions for transmission of the resource and the MCS configuration of the resource.

10. The method of claim 9, wherein the adjusting of the number of repetitions for transmission of the resource comprises at least one of the following:

adjusting a number of repetitions for transmission of the PDCCH, which comprises adjusting a number of repetitions for transmission of at least one of message 2 (msg2), message 3 (msg3), or message 4 (msg4) in a common search space, and a number of repetitions for transmission of a dedicated search space;

adjusting a number of repetitions for transmission of the PDSCH, which comprises adjusting at least one of a number of repetitions for transmission of a PDSCH carrying the msg2, a number of repetitions for transmission of a PDSCH carrying the msg4, or a number of repetitions for transmission of a PDSCH carrying downlink signaling and data in a connected state;

adjusting a number of repetitions for transmission of the PUSCH, which comprises adjusting at least one of a number of repetitions for transmission of the PUSCH carrying the msg3, or a number of repetitions for transmission of a PUSCH carrying uplink signaling and data in the connected state; or adjusting a number of repetitions for transmission of the UCI, which comprises adjusting at least one of a number of repetitions for transmission of a PUSCH carrying downlink transmission acknowledgment (ACK) and/or negative acknowledgment (NACK), or a number of repetitions for transmission of a PUCCH carrying downlink transmission ACK and/or NACK.

11. The method of claim 9, wherein the adjusting of the MCS configuration of the resource comprises at least one of:

adjusting an MCS configuration of the PDSCH, which comprises adjusting at least one of the MCS configuration of the PDSCH carrying a msg2, the MCS configuration of the PDSCH carrying a msg4, or the MCS configuration of the PDSCH carrying downlink signaling and data in a connected state; or adjusting an MCS configuration of the PUSCH, which comprises adjusting at least one of the MCS configuration of the PUSCH carrying a msg3, or the MCS configuration of the PUSCH carrying signaling and data in the connected state.

12. The method of claim 1, wherein the
RIC is one of a near-real-time RIC (near-RT RIC) and a non-RT RIC.

13. The method of claim 1, wherein the
base station comprises open radio access network (O-RAN) control unit control plane (O-CU-CP), O-RAN control unit user plane (O-CU-UP), and O-RAN data unit (O-DU).

14. The method of claim 1, wherein the terminals are internet of things (IoT) terminals.

15. A device of a radio access network (RAN) intelligent controller (RIC), comprising:

at least one processor; and memory storing instructions which, when executed by the at least one processor individually and/or collectively, cause the device to:

receive, from at least one of a base station or an external server, first information related to coverage levels of the base station and second information related to terminals, the first information and the second information being identified by the at least one of the terminals, the base station, or the external server during a first period, determine service distribution information of a cell of the base station serving the terminals based on the first information and the second information, the service distribution information including distribution information of the terminals distributed based on the coverage levels, based on the service distribution information, determine a coverage level configuration for use during a second period, the coverage level configuration including at least one of a number of coverage levels of the cell or a threshold to classify coverage levels, and a resource configuration corresponding to each of the coverage levels of the cell, and transmit the coverage level configuration and the resource configuration to the base station.

16. The device of claim 15, wherein the
service distribution information further includes:
distribution information of service delays distributed based on the coverage levels, distribution information of service throughput capacities distributed based on the coverage levels, or distribution information of service occurrences distributed based on the coverage levels.

17. The device of claim 15, wherein the second information related to the terminals includes a reception signal strength identified by the terminals during the first period, location information related to the terminals identified by the external server during the first period, and feature information related to the terminals including a service period and periodic reporting time identified by the external server during the first period.

18. The device of claim 15, wherein the first information related to the coverage levels of the base station includes a coverage level configuration including a threshold to classify coverage levels identified by the base station during the first period and a resource configuration corresponding to each of coverage levels identified by the base station during the first period.

19. The device of claim 15,
wherein the instructions, when executed by the at least one processor individually and/or collectively, cause the device to:
based on the service distribution information, predict service distribution information of the cell of the base station during the second period after the first period by:
inputting the service distribution information of the cell of the base station during N service periods included in the first period into a trained model;
predicting the service distribution information of the cell of the base station during the second period after the first period through the trained model; and
obtaining distribution information of the terminals within a first service period after the N service periods included in the first period,
wherein the N being a positive integer,
wherein the second period comprises the first service period,
wherein the service distribution information of the cell of the base station during the first period is used to characterize distribution information of the terminals within the N service periods, and
wherein the service distribution information of the cell of the base station during the second period is used to characterize the distribution information of the terminals within the first service period.

20. The device of claim 15,
wherein the RIC is one of a near-real-time RIC (near-RT RIC) and a non-RT RIC,
wherein the base station comprises open radio access network (O-RAN) control unit control plane (O-CU-CP), O-RAN control unit user plane (O-CU-UP), and O-RAN data unit (O-DU), and
wherein the terminals are internet of things (IoT) terminals.

* * * * *